United States Patent
Sultan et al.

(10) Patent No.: US 10,851,288 B2
(45) Date of Patent: *Dec. 1, 2020

(54) METHOD FOR FRACTURING A SUBTERRANEAN GEOLOGICAL FORMATION WITH AN EMULSIFIED ACID

(71) Applicant: King Fahd University of Petroleum and Minerals, Dhahran (SA)

(72) Inventors: Abdullah S. Sultan, Dhahran (SA); Ziad Sidaoui, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/564,623

(22) Filed: Sep. 9, 2019

(65) Prior Publication Data

US 2019/0390104 A1    Dec. 26, 2019

Related U.S. Application Data

(63) Continuation of application No. 15/908,898, filed on Mar. 1, 2018, now Pat. No. 10,450,502.

(60) Provisional application No. 62/480,839, filed on Apr. 3, 2017.

(51) Int. Cl.
| | | |
|---|---|---|
| *E21B 43/26* | (2006.01) | |
| *C09K 8/74* | (2006.01) | |
| *C09K 8/70* | (2006.01) | |

(52) U.S. Cl.
CPC .............. *C09K 8/74* (2013.01); *C09K 8/70* (2013.01); *C09K 2208/32* (2013.01); *E21B 43/26* (2013.01)

(58) Field of Classification Search
CPC ........ C09K 8/74; C09K 8/70; C09K 2208/32; E21B 43/26
See application file for complete search history.

(56) References Cited

U.S. PATENT DOCUMENTS

| | | |
|---|---|---|
| 3,948,325 A | 4/1976 | Winston |
| 4,140,640 A | 2/1979 | Scherubel |
| 4,359,391 A | 11/1982 | Salathiel et al. |
| 5,034,140 A | 7/1991 | Gardner |
| 5,797,456 A | 8/1998 | Mokadam |
| 6,534,448 B1 | 3/2003 | Brezinski |
| 8,349,771 B2 | 1/2013 | Seth et al. |
| 8,403,051 B2 | 3/2013 | Huang et al. |
| 9,234,126 B2 | 1/2016 | Karale |

(Continued)

OTHER PUBLICATIONS

Matjaz Finsgar, et al., "Application of corrosion inhibitors for steels in acidic media for the oil and gas industry: A review", Corrosion Science 86 (2014) pp. 17-41.

*Primary Examiner* — Silvana C Runyan
(74) *Attorney, Agent, or Firm* — Oblon, McClelland, Maier & Neustadt, L.L.P.

(57) ABSTRACT

A method of acidizing a subterranean geological formation by injecting an emulsified acid into a wellbore, wherein the emulsified acid includes at least an aqueous phase comprising a hydrochloric acid solution, an oil phase comprising waste oil, and an emulsifier, and wherein the waste oil contains 45-75% by weight of aromatic compounds and preferably contains less than 0.5% by weight of non-hydrocarbon compounds. Various embodiments, and combinations of embodiments, of the emulsified acid and the method of acidizing are provided.

8 Claims, 40 Drawing Sheets

(56) References Cited

U.S. PATENT DOCUMENTS

| | | | |
|---|---|---|---|
| 9,359,544 B2* | 6/2016 | Milne | E21B 43/283 |
| 9,376,611 B2* | 6/2016 | Berry | C09K 8/602 |
| 2006/0260815 A1 | 11/2006 | Dahanayake | |
| 2011/0303414 A1* | 12/2011 | Seth | C09K 8/528 |
| | | | 166/305.1 |
| 2013/0048079 A1 | 2/2013 | Ovalles | |
| 2014/0262231 A1 | 9/2014 | Alam et al. | |

* cited by examiner

METHOD FOR FRACTURING A SUBTERRANEAN GEOLOGICAL FORMATION WITH AN EMULSIFIED ACID

CROSS REFERENCE TO RELATED APPLICATIONS

The present application is a Continuation of Ser. No. 15/908,898, now allowed, having a filing date of Mar. 1, 2018, which claims benefit of priority to U.S. Provisional Application No. 62/480,839, having a filing date of Apr. 3, 2017 and which is incorporated herein by reference in its entirety.

BACKGROUND OF THE INVENTION

Technical Field

The present invention relates to a method of acidizing a subterranean geological formation with an emulsified acid comprising waste oil.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Emulsifiers are commonly used in acid treatment of reservoir rocks around oil wellbores. Often, the pore structure near a wellbore is plugged by either particulates formed in the drilling process, or by precipitation deposits caused by pressure or temperature changes in the wellbore. As a result, permeability is reduced, thus leading to a decrease in oil well productivity. In order to remove these unwanted deposits, acid stimulation is commonly used. Acid reacts with and dissolves portions of the rock matrix, thereby increasing permeability. The effectiveness of the treatment depends on the depth of acid penetration in the formation. For a carbonate matrix, the acid is consumed very quickly, as the rate of mass transfer through the rock matrix is relatively high; however, the acid corrodes the metal parts of the wellbore. Therefore, in such treatments, deep penetration of the acid and reduction of corrosion rate are important considerations.

An emulsified acid is typically utilized in acidizing operations to retard the corrosion rates that affect the metal parts of the wellbore. In such a process, the acid is injected into a formation in the form of a water-in-oil emulsion. Emulsified acids were first introduced by De Groote et al. [De Groote, Melvin, 1933, *Process for increasing the output of oil wells*]. Since then, emulsified acids have been utilized in numerous applications including acidizing oil wells [Al-Anazi, H A, H A Nasr-El-Din, S K Mohamed. 1998. Stimulation of Tight Carbonate Reservoirs Using Acid-in-Diesel Emulsions; Kasza, Piotr, Mariusz Dziadkiewicz, Marek Czupski. 2006. From laboratory research to successful practice: a case study of carbonate formation emulsified acid treatments, Society of Petroleum Engineers], acidizing water disposal wells [Nasr-El-Din, H A, H A Al-Anazi, S K Mohamed. 2000. Stimulation of Water-Disposal Wells Using Acid-in-Diesel Emulsions: Case Histories, *SPE Production & Facilities*, 15 (03): 176-182], and seawater injectors [Mohamed, S K, H A Nasr-El-Din, Y A Al-Furaidan, Acid Stimulation of Power Water Injectors and Saltwater Disposal Wells in a Carbonate Reservoir in Saudi Arabia: Laboratory Testing and Field Results, Society of Petroleum Engineers]. The emulsified acid have also been used for acid fracturing [Bartko, Kirk M, Hisham A Nasr-El-Din, Zillur Rahim et al. Acid fracturing of a gas carbonate reservoir: the impact of acid type and lithology on fracture half length and width. Society of Petroleum Engineers] particularly, in deep gas wells [Nasr-El-Din, Hisham A, Saad Al-Dirweesh, Mathew M Samuel, Development and Field Application of a New, Highly Stable Emulsified Acid, Society of Petroleum Engineers; Nasr-El-Din, Hisham A, Saad M Al-Driweesh, Arthur S Metcalf et al. 2008b. Fracture acidizing: what role does formation softening play in production response, *SPE Production & Operations*, 23 (02): 184-191]. Using an emulsified acid decreases the diffusion rate of the dispersed aqueous acid into the matrix formation (when compared with a purely aqueous acid solution treatment). However, since oil is the external phase, the emulsified acid has lower corrosive characteristics.

Emulsified acids are mainly categorized into two groups based on the size of droplets present therein. Accordingly, some emulsified acids are micro-emulsion acids [Hoefner, M L, H S Fogler. 1985. Effective matrix acidizing in carbonates using microemulsions, *Chem. Eng. Prog.* 81 (5)], while some other are macro-emulsion acids [Al-Anazi, H A, H A Nasr-El-Din, S K Mohamed, 1998, Stimulation of Tight Carbonate Reservoirs Using Acid-in-Diesel Emulsions; Mohamed, S K, H A Nasr-El-Din, Y A Al-Furaidan, Acid Stimulation of Power Water Injectors and Saltwater Disposal Wells in a Carbonate Reservoir in Saudi Arabia: Laboratory Testing and Field Results. Society of Petroleum Engineers; Nasr-El-Din, H A, H A Al-Anazi, S K Mohamed, 2000, Stimulation of Water-Disposal Wells Using Acid-in-Diesel Emulsions: Case Histories, *SPE Production & Facilities*, 15 (03): 176-182; Kasza, Piotr, Mariusz Dziadkiewicz, Marek Czupski. 2006. From laboratory research to successful practice: a case study of carbonate formation emulsified acid treatments, Society of Petroleum Engineers; Nasr-El-Din, Hisham A, Saad M Al-Driweesh, Arthur S Metcalf et al. 2008b. Fracture acidizing: what role does formation softening play in production response, *SPE Production & Operations*, 23 (02): 184-191]. Mollet et al. [Mollet, Hans, Arnold Grubenmann, 2008, *Formulation technology: emulsions, suspensions, solid forms*, John Wiley & Sons] specified that micro-emulsion acids contains droplets with an average size of about 0.01 µm to about 0.1 µm, and macro-emulsion acids contains droplets with an average size of greater than 0.1 µm.

The emulsion should remain stable and should not phase separate until after an acidizing operation is completed. If the emulsified acid breaks during the acidizing operation, the emulsion cannot retard the corrosion rate that affects the metal parts of the wellbore. Hence, the stability of the emulsified acid is an important characteristic during acidizing operations [Al-Anazi, H A, H A Nasr-El-Din, S K Mohamed, 1998, Stimulation of Tight Carbonate Reservoirs Using Acid-in-Diesel Emulsions].

The emulsified acids that are currently used generally include hydrochloric acid emulsified in diesel. In some research studies, xylene was shown to be an effective compound to be used as the oil phase in lieu of diesel [Fattah, Wael A, Hisham A Nasr-El-Din, 2010, Acid Emulsified in Xylene: A Cost-Effective Treatment to Remove Asphalting Deposition and Enhance Well Productivity, *SPE Production & Operations* 25 (02): 151-154]. In that study, the apparent viscosity and the stability of emulsified acid was shown to be dependent on the hydrocarbon phase. Both diesel and xylene are valuable and expensive products, and using them in the preparation of an emulsified acid substantially increases the overall cost of the emulsified acid. In order to develop an effective and inexpensive emulsified acid, an alternative oil phase should be used to have the same effect as diesel and xylene, and without degrading the apparent viscosity and the stability of emulsified acid.

In view of the forgoing, one objective of the present invention relates to a method of acidizing a subterranean geological formation by injecting an emulsified acid into a wellbore present in the subterranean geological formation, wherein the emulsified acid includes at least an aqueous phase comprising hydrochloric acid, an oil phase comprising waste oil, and an emulsifier. The oil phase may contain 45-75% by weight of aromatic compounds and preferably contains less than 0.5% by weight of non-hydrocarbon compounds. An oil phase having a high aromatic content is effective with less than 3.0% by volume of an emulsifier to form an emulsified acid. An apparent viscosity and stability of the emulsified acid is comparable to that of an emulsified acid that contains diesel and/or xylene.

BRIEF SUMMARY OF THE INVENTION

According to a first aspect, the present disclosure relates to a method of acidizing a subterranean geological formation surrounding a wellbore, involving injecting an emulsified acid into the wellbore to acidize the subterranean geological formation, wherein the emulsified acid includes a) 60-80% by volume of an aqueous phase comprising hydrochloric acid, b) 20-40% by volume of an oil phase comprising waste oil, c) 0.1-3.0% by volume of an emulsifier, relative to the total volume of the emulsified acid, wherein the waste oil comprises 45-75% by weight of aromatic compounds, relative to the total weight of the waste oil, wherein the aromatic compounds are at least one selected from the group consisting of a monocyclic aromatic hydrocarbon, a polycyclic aromatic hydrocarbon, and a naphthene aromatic compound.

In one embodiment, the waste oil further includes 20-25% by weight of aliphatic compounds, and 25-30% by weight of cycloaliphatic compounds, relative to the total weight of the waste oil.

In one embodiment, the waste oil does not include a non-hydrocarbon compound selected from the group consisting of a sulfur compound, a nitrogen compound, an oxygen compound, and asphaltene.

In one embodiment, the waste oil further includes up to 0.5% by weight of at least one non-hydrocarbon compound, relative to the total weight of the waste oil, wherein the at least one non-hydrocarbon compound is selected from the group consisting of a sulfur compound, a nitrogen compound, an oxygen compound, and asphaltene.

In one embodiment, the emulsified acid has an apparent viscosity of 500 to 10,000 cP at a temperature of 20 to 100° C.

In one embodiment, the emulsified acid is injected into the wellbore for up to 6 hours in a continuous fashion.

In one embodiment, the emulsified acid contains droplets with an average diameter of 1.0 to 2.5 µm.

In one embodiment, the emulsified acid comprises 0.5-1.5% by volume of the emulsifier, relative to the total volume of the emulsified acid.

In one embodiment, the hydrochloric acid is present in the aqueous phase in a concentration of 5-30% by weight, relative to the total weight of the aqueous phase.

In one embodiment, the aqueous phase further comprises at least one mineral acid selected from the group consisting of nitric acid, sulfuric acid, phosphoric acid, perchloric acid, hydrofluoric acid, hydrobromic acid, hydroiodic acid, and boric acid.

In one embodiment, the emulsifier is at least one selected from the group consisting of an ethoxylated glycol, an ethoxylated phenol, a propoxylated glycol, and a propoxylated phenol.

In one embodiment, the emulsified acid further comprises 0.1-0.5% by volume of a corrosion inhibitor relative to the total volume of the emulsified acid, wherein the emulsified acid contains droplets with an average diameter of 2.5 to 4.0 µm.

According to a second aspect, the present disclosure relates to a method of drilling a subterranean geological formation, involving i) drilling the subterranean geological formation to form a wellbore therein, ii) circulating an emulsified acid in the wellbore, wherein the emulsified acid includes a) 60-80% by volume of an aqueous phase comprising a hydrochloric acid solution, b) 20-40% by volume of an oil phase comprising waste oil, c) 0.1-3.0% by volume of an emulsifier, relative to the total volume of the emulsified acid, wherein the waste oil comprises 45-75% by weight of aromatic compounds, relative to the total weight of the waste oil, wherein the aromatic compounds are at least one selected from the group consisting of a monocyclic aromatic hydrocarbon, a polycyclic aromatic hydrocarbon, and a naphthene aromatic compound.

In one embodiment, the emulsified acid is circulated for up to 6 hours.

According to a third aspect, the present disclosure relates to a method of forming an emulsified acid, involving mixing a first mixture comprising waste oil and an emulsifier with a second mixture comprising a hydrochloric acid solution and stirring, thereby forming the emulsified acid, wherein a volume ratio of the emulsifier to the waste oil in the first mixture is 1:400 to 1:10, wherein the waste oil includes 45-75% by weight of aromatic compounds, relative to the total weight of the waste oil, and wherein the second mixture is mixed with the first mixture in a drop-wise fashion at a mixing rate of 0.5 mL/min to 1.5 mL/min.

In one embodiment, the second mixture further includes a corrosion inhibitor, wherein a volume ratio of the corrosion inhibitor to the hydrochloric acid solution in the second mixture is 1:1,000 to 1:100.

In one embodiment, the waste oil further includes up to 0.5% by weight of non-hydrocarbon compounds relative to the total weight of the waste oil, and the method further involves i) passing the waste oil through a filter with a mesh size of up to 0.5 ii) separating at least a portion of the non-hydrocarbon compounds from the waste oil before the mixing.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
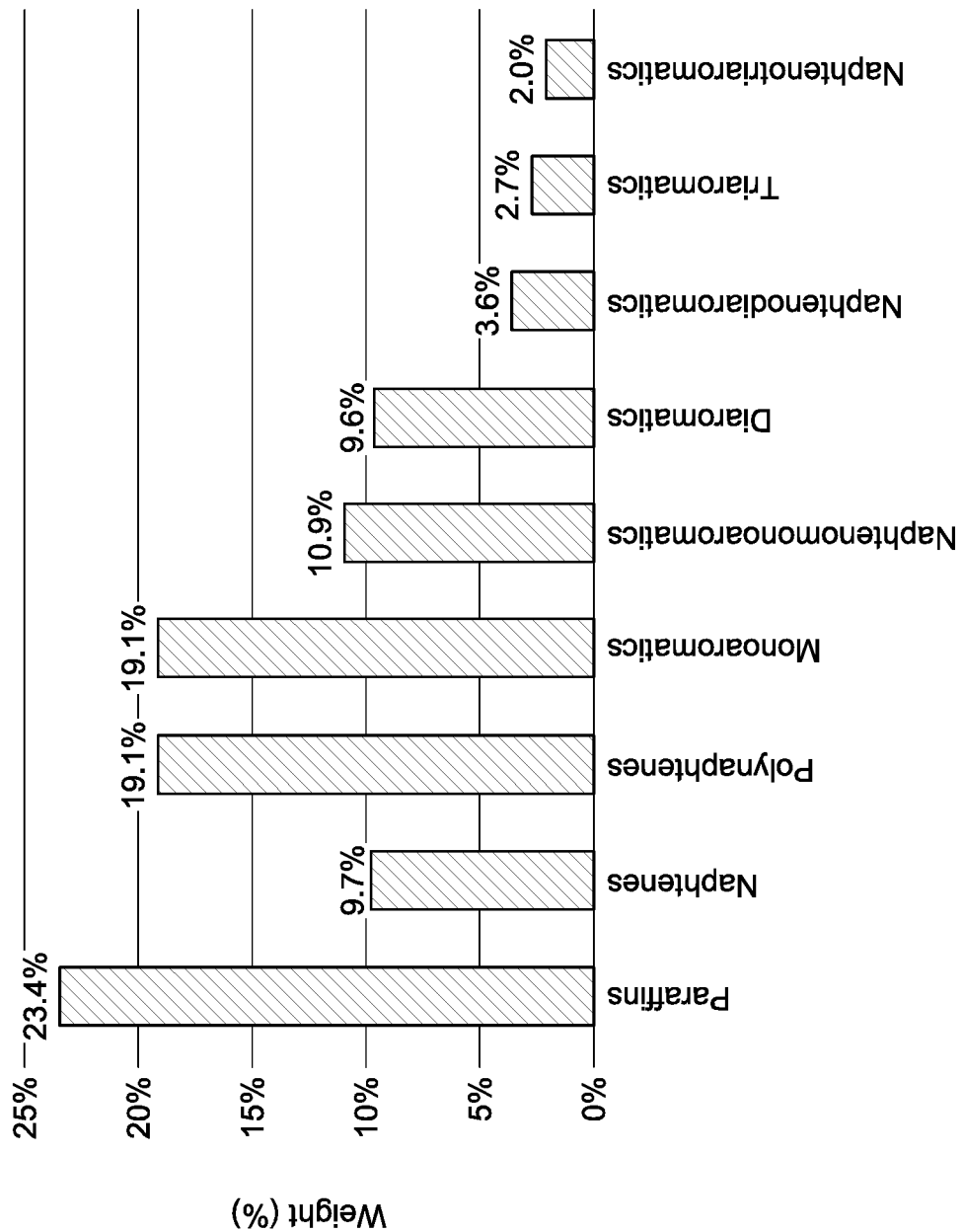
FIG. 1 represents a composition of waste oil of the present disclosure.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a method of acidizing a subterranean geological formation (also referred to as "formation" in this disclosure) surrounding a wellbore by injecting an emulsified acid into the wellbore.

The subterranean geological formation may be a carbonate formation, a sandstone formation, a shale formation, a clay formation, etc. In one embodiment, the subterranean geological formation is a carbonate formation, e.g. limestone or dolostone, which contains carbonate minerals, such as calcite, aragonite, dolomite, etc. In another embodiment, the subterranean geological formation is a sandstone formation, which contains quartz, feldspar, rock fragments, mica and numerous additional mineral grains held together with silica and/or cement. In another embodiment, the subterranean geological formation is a shale formation, which contains clay minerals and quartz. Yet in another embodiment, the subterranean geological formation is a clay formation, which contains chlorite, illite, kaolinite, montmorillonite and smectite.

The subterranean geological formation may have a permeability of 10 μd (micro darcy) to 500 md (milli darcy), preferably 100 μd to 400 md, preferably 200 μd to 300 md, preferably 300 μd to 200 md. In one embodiment, the subterranean geological formation may be a conventional reservoir (e.g. the Berea sandstone) with a permeability of 100 to 200 md, preferably 120 to 180 md (milli darcy), preferably 130 to 170 md, more preferably 140 to 160 md. In another embodiment, the subterranean geological formation may be an unconventional reservoir (e.g. the Scioto sandstone) with a permeability of less than 10 md, preferably 1 to 10 md, preferably 2 to 8 md, more preferably 3 to 6 md. In one embodiment, a well logging tool is employed to determine the permeability of the subterranean geological formation along a depth of the wellbore.

The term "acidizing" as used in this disclosure refers to a process whereby a pressurized fluid, e.g. the emulsified acid, is pumped/injected to the subterranean geological formation through the wellbore, wherein the emulsified acid dissolves sediments and/or mud solids, removes formation residues and/or fragments that inhibit permeability, and/or forms wormholes, in order to restore or enhance a production rate of formation fluids.

Depending on the type of the subterranean geological formation, the emulsified acid may interact differently with the formation to restore or enhance the production rate of formation fluids. For example, in one embodiment, the subterranean geological formation is a sandstone formation, wherein the emulsified acid reacts with soluble substances in the formation to enlarge pore spaces. In one embodiment, the subterranean geological formation is a carbonate formation, wherein the emulsified acid dissolves a portion of the formation.

The emulsified acid may be pumped or injected into the wellbore at a pressure below a fracture pressure of the subterranean geological formation to remove formation damages, residues and/or fragments. Accordingly, in some embodiments, the emulsified acid is injected at a pressure of no more than 5,000, preferably 100 to 3,000 psi, preferably 200 to 2,000 psi, preferably 300 to 1,000 psi. The emulsified acid may be pumped or injected into the wellbore at a pressure above a fracture pressure of the subterranean geological formation (also known as acid fracturing) to remove formation damages and to induce fractures in the formation (i.e. forming wormholes). Accordingly, in some embodiments, the emulsified acid is injected at a pressure of 1,000-30,000 psi, preferably 3,000-20,000 psi, preferably 5,000-10,000 psi.

The emulsified acid may be injected at various flow rates, depending on a total volume of the wellbore. For example, in some embodiments, the emulsified acid is injected at a flow rate of 1-2,000 L/min, preferably 50-500 L/min. A total volume of the emulsified acid that is injected may vary in the range from about 1,000 to 500,000 L, preferably 20,000 to 300,000 L.

In one embodiment, injecting the emulsified acid may be carried out by disposing a nozzle on one end of a tube or a pipe that transfers the emulsified acid to a downhole of the wellbore. Said nozzle may have various shapes and geometries, as known to those skilled in the art. For example, in one embodiment, the nozzle is a perforated tube with a capped end and perforations are circumferentially oriented along the perforated tube to create a radial flow of the emulsified acid. In certain embodiments, the emulsified acid is injected through coiled tubing, as known to those skilled in the art, which is located inside the wellbore to selectively acidize certain spots in the wellbore.

Acidizing the subterranean geological formation with the emulsified acid may recover at least 10%, preferably at least 20%, preferably 30-70%, preferably 40-60% of the permeability of the formation that surrounds the wellbore. For example, in one embodiment, the subterranean geological formation has a permeability of 100 to 200 md, preferably 120 to 180 md, wherein after acidizing the formation with the emulsified acid, the permeability gets a value in the range of 120 to 300 md, preferably 150 to 250 md.

The emulsified acid of this disclosure is an emulsion that preferably includes at least an aqueous phase, an oil phase, and an emulsifier, wherein the aqueous phase is dispersed (or emulsified) in the oil phase (i.e. a water-in-oil emulsion). In view of that, the emulsified acid includes 60-80% by volume, preferably 65-75% by volume, preferably about 68-72% by volume of the aqueous phase; 20-40% by volume, preferably 25-35% by volume, preferably about 28-32% by volume of the oil phase; and 0.1-3.0% by volume, preferably 0.3-2.0% by volume, preferably 0.5-1.5% by volume of the emulsifier, each relative to the total volume of the emulsified acid.

Figure 39:
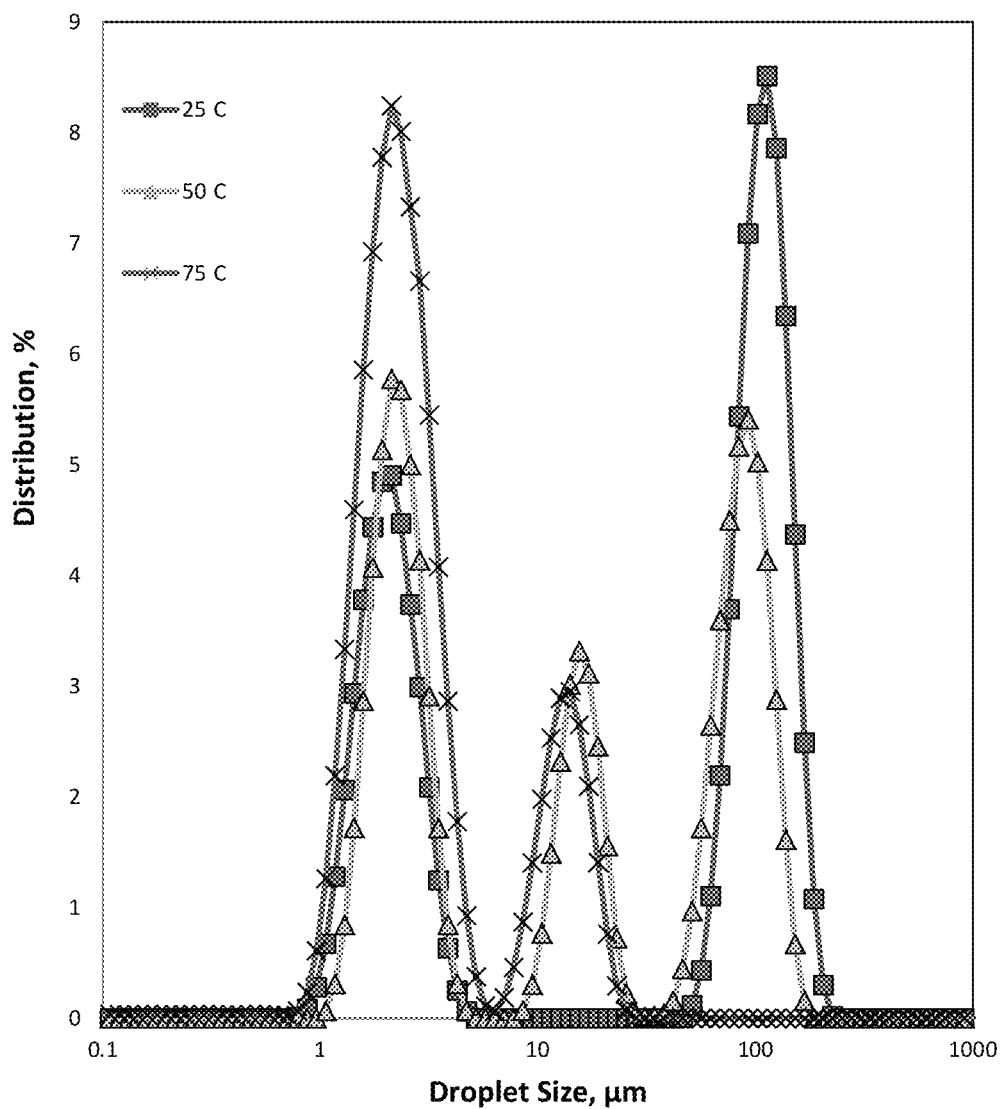
FIG. 39 represents a droplet size distribution of an emulsified acid at various temperatures, wherein the emulsified acid does not include a corrosion inhibitor.
Figure 40:
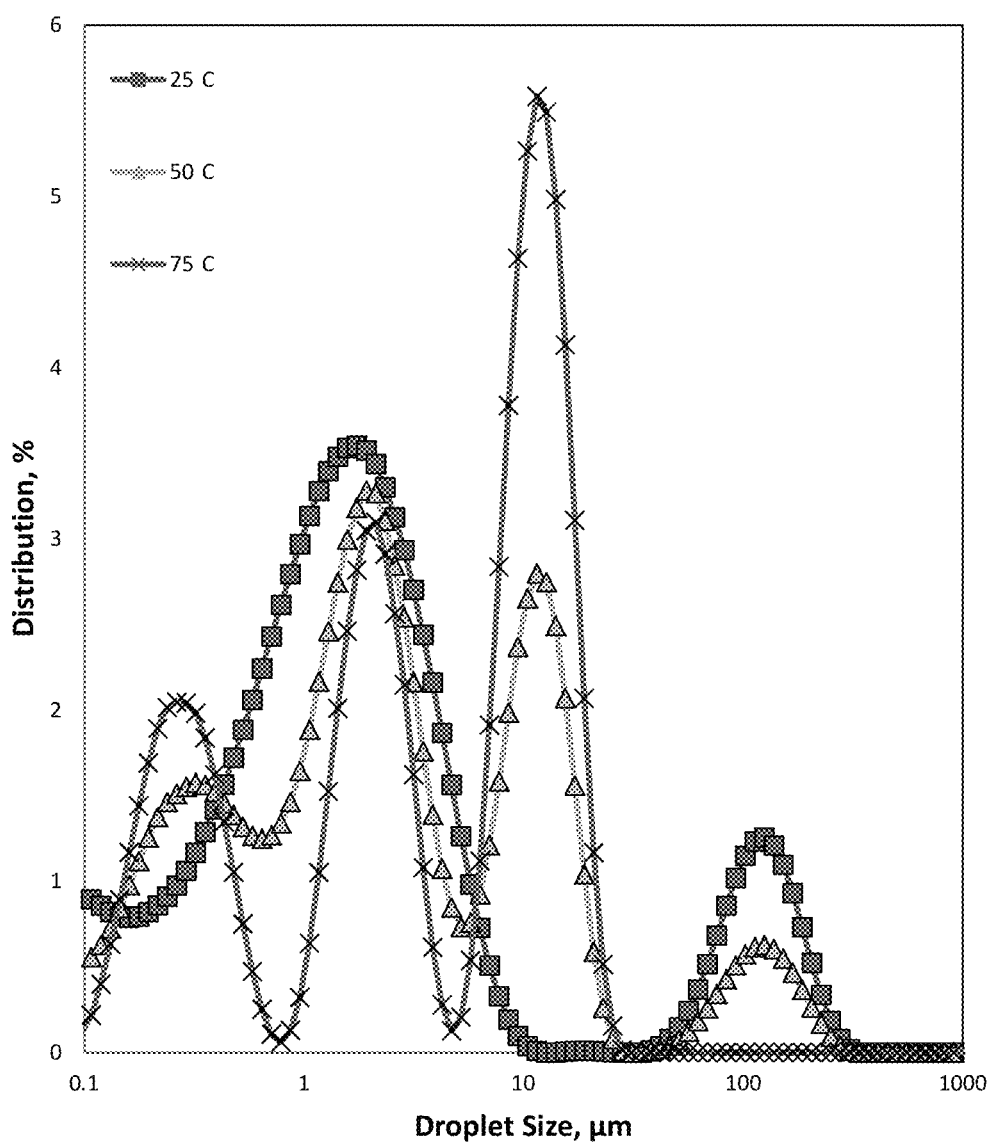
FIG. 40 represents a droplet size distribution of an emulsified acid at various temperatures, wherein the emulsified acid includes a corrosion inhibitor.

As defined here, the term "emulsion" refers to a liquid mixture, wherein at least one liquid is dispersed as droplets in a second liquid. Accordingly, the aqueous phase is dispersed as droplets in the oil phase. Preferably, an average diameter of the droplets in the emulsified acid may vary in the range of 10 nm-100 µm, preferably 100 nm-50 µm, more preferably 1-10 µm, more preferably 1.5-5.0 µm, even more preferably 1.0 to 2.5 µm. In one embodiment, the average diameter of the droplets in the emulsified acid is determined with a droplet analyzer that operates based upon diffraction of electromagnetic waves. A droplet size distribution is calculated using the Lorenz-Mie and the Fraunhofer theory, and results are shown in FIG. 39, FIG. 40, and Table 7. According to the average diameter of the droplets, the emulsified acid may be considered a microemulsion, a nanoemulsion, a miniemulsion, a macroemulsion, or combinations thereof. Microemulsions are thermodynamically stable, macroscopically homogeneous mixtures and are often synonymously used in the art as nanoemulsions. Microemulsions may comprise dispersed droplets with diameters of 1-100 nm, preferably 10-50 nm, while miniemulsions comprise dispersed droplets with diameters of 100 nm-1 µm. Macroemulsions may comprise droplets with diameters of 1-100 µm. Microemulsions form spontaneously and differ markedly from thermodynamically unstable macroemulsions, which depend upon intense mixing energy for their formation.

Figure 4:
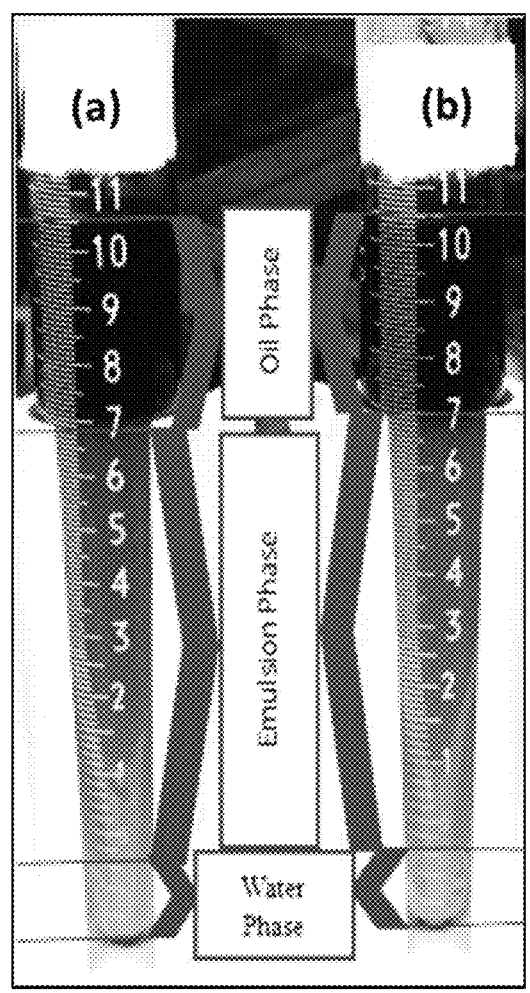
FIG. 4 is an image of the emulsified acid during phase separation at 120° C., wherein the emulsified acid comprises a) 0.7% by volume of an emulsifier, b) 1.0% by volume of the emulsifier, relative to the total volume of the emulsified acid.

The emulsified acid may preferably have a stability of up to 6 hours, preferably 1 to 5 hours, preferably 2 to 4 hours. As used herein, in one embodiment, the "stability" of the emulsified acid refers to a time interval during which at least 50%, or at least 60%, or 70-90% by volume of the emulsified acid is phase separated at a specified temperature (with each percentile being relative to the total volume of the emulsified acid). The stability of the emulsified acid may be affected by a temperature of the emulsified acid, and also the type and the amount of the emulsifier present in the emulsified acid. For example, in one embodiment, the emulsified acid contains 0.5-2.0% by volume, preferably 1.0-1.5% by volume, relative to the total volume of the emulsified acid, wherein a stability of the emulsified acid is 2 to 4 hours, preferably 2.5 to 3.5 hours at a temperature of 100 to 150° C., preferably 110 to 130° C., as shown in FIGS. 5-13. FIG. 4 is an image of the emulsified acid during phase separation at 120° C., wherein the emulsified acid comprises a) 0.7% by volume of an emulsifier, b) 1.0% by volume of the emulsifier, relative to the total volume of the emulsified acid.

Accordingly, a duration of an acidizing operation may vary with respect to the stability of the emulsified acid and a downhole temperature of the wellbore. For example, in one embodiment, the emulsified acid contains 0.5-2.0% by volume, preferably 1.0-1.5% by volume, relative to the total volume of the emulsified acid, and the downhole temperature of the wellbore is 100 to 150° C., preferably 110 to 130° C. Accordingly, a duration of an acidizing operation may be no longer than 5 hours, preferably in the range of 2 to 4 hours, preferably 2.5 to 3.5 hours in a continuous fashion, to ensure the emulsified acid does not phase separated during the acidizing operation. In certain embodiments, a duration of an acidizing operation may be up to 6 hours, preferably for 2 to 5 hours, preferably 3 to 4 hours. The stability of the emulsified acid may further be increased by 1 to 6 hours, preferably 2 to 4 hours by adding a retarder to the emulsified acid.

In a preferred embodiment, the aqueous phase of the emulsified acid at least includes a hydrochloric acid solution. In some embodiments, the hydrochloric acid solution contains hydrochloric acid in an aqueous liquid, e.g. water, brine, seawater, freshwater, etc., wherein the hydrochloric acid is present at a weight percent of 5-30 wt %, preferably 10-20 wt %, more preferably 12-18 wt % relative to a total weight of the hydrochloric acid solution. An aqueous liquid may be supplied from a natural source, such as an aquifer, lake, or ocean, and may be filtered to remove large solids before being mixed with hydrochloric acid to form the hydrochloric acid solution. As used herein, the term "brine" refers to an aqueous mixture of one or more soluble salts, such as sodium chloride, potassium chloride, calcium chloride, calcium bromide, sodium bromide, potassium bromide, or zinc bromide that has at least 30 g of soluble salts per L of a solution. Seawater or water from a salt lake may thus be considered brine. Alternatively, brine may be formed by mixing water or freshwater with soluble salts or a solution comprising soluble salts.

In some embodiments, the aqueous phase further includes at least one mineral acid selected from the group consisting of nitric acid, sulfuric acid, phosphoric acid, perchloric acid, hydrofluoric acid, hydrobromic acid, hydroiodic acid, and boric acid. The aqueous phase may further include one or more organic acids selected from the group consisting of formic acid, acetic acid, propionic acid, butyric acid, valeic acid, caproic acid, oxalic acid, lactic acid, malic acid, citric acid, carbonic acid, benzoic acid, phenolic acid, and uric acid. The aqueous phase may contain mixtures the mineral acid and the organic acid.

A type of acid used in the emulsified acid may vary depending on the type of the subterranean geological formation which is acidized. Also, the abovementioned acids may be mixed at various volumetric concentrations. For example, in a preferred embodiment, the subterranean geological formation is a carbonate formation and the emulsified acid contains hydrochloric acid. In one embodiment, the subterranean geological formation is a carbonate formation and the emulsified acid contains hydrochloric acid, acetic acid, and formic acid. In another embodiment, the subterranean geological formation is a sandstone formation and the emulsified acid contains hydrochloric acid and hydrofluoric acid, wherein volume ratio of hydrochloric acid to hydrofluoric acid may be in the range of 2:1 to 12:1, preferably 4:1 to 9:1, more preferably 5:1 to 7:1. In one embodiment, pH of the aqueous phase of the emulsified acid may be in the range of 0-6.5, preferably 0.5-6, preferably 1-5.

In some embodiments, the aqueous phase of the emulsified acid may further include a corrosion inhibitor with a concentration of 0.1-1.0% by volume, preferably 0.2-0.8% by volume, more preferably about 0.5% by volume relative to the total volume of the emulsified acid. Examples of the corrosion inhibitor that may be utilized include, without limitation, barium borate, benzotriazole, cinnamaldehyde, 1,2-diaminopropane, dibutylamine, diethylhydroxylamine, dimethylethanolamine, 3,5-dinitrobenzoic acid, ethylenediamine, hexamethylenetetramine, hydrazine, lead oxide, lithium nitrite, sodium nitrite, zinc borate, zinc dithiophosphate, zinc oxide, zinc phosphate, etc.

An average diameter of droplets in the emulsified acid in the presence of the corrosion inhibitor may be 10-50%, preferably 20-35% larger relative to the average diameter of droplets in the emulsified acid in the absence of the corrosion inhibitor. For example, in one embodiment, an average diameter of droplets in the emulsified acid in the presence of the corrosion inhibitor is 1-15 µm, more preferably 2-8.0 µm, even more preferably 2.5 to 4.0 µm, more preferably about 3.1 µm, whereas the average diameter of droplets in the emulsified acid in the absence of the corrosion inhibitor is in the range of 1-10 µm, more preferably 1.5-5.0 µm, more preferably 1.0 to 2.5 µm, even more preferably about 2.3 µm. In view of that, the presence of the corrosion inhibitor may reduce the stability of the emulsified acid. Therefore, in some preferred embodiments, the emulsified acid does not include a corrosion inhibitor.

In one embodiment, the emulsified acid has a corrosion rate of 0.00001-0.01 lb/ft$^2$, preferably 0.0001-0.005 lb/ft$^2$, more preferably 0.0005-0.001 lb/ft$^2$ per 6 h in contact with a steel surface at a temperature of 100-200° C., preferably 120-170° C., more preferably 130-160° C. and a pressure of 200-400 psi, preferably 250-350 psi. Here, the corrosion rate uses a unit of lb/ft$^2$ as a measure of the corrosion weight loss in pounds mass per square foot of pre-exposed surface area. The unit may also be written as lbm/ft$^2$, where "lbm" denotes pounds as a mass unit, rather than pounds as a force unit. The corrosion rate may be measured in a controlled environment by weighing a piece of steel, such as a steel coupon, measuring its surface area, contacting it with a corrosive agent for a certain time and at a certain temperature and pressure, removing the corrosive agent, and again weighing the piece of steel in order to find the corrosive weight loss. The coupon may be a strip, a disc, or a cylinder, or may be some other shape designed for a testing cell or a part of a drill pipe, such as a joint between segments. Alternatively, the corrosion rate of the composition in contact with a steel surface may be measured in units of mils/yr, (also denoted as MPY, mils penetration per year) which is a decrease in thickness in mils of a surface due to a corrosion loss over one year. In one embodiment, a corrosion rate of the emulsified acid when brought into a contact with a steel surface for 6 hours at a temperature of 100-200° C., preferably 120-170° C., more preferably 130-160° C. and a pressure of 200-400 psi, preferably 250-350 psi is 10-500 mils/yr, preferably 15-200 mils/yr, more preferably 20-50 mils/yr. In one embodiment, a corrosion rate of the emulsified acid is determined by following ASTM G205-16.

The oil phase of the emulsified acid of the present disclosure includes waste oil. The term "waste oil" as used in this disclosure refers to a hydrocarbon mixture having 45-75% by weight, preferably 46-50% by weight, preferably about 48% by weight of aromatic compounds with carbon contents of 6 to 50, preferably 7 to 40, preferably 8 to 30. In addition, the "waste oil" refers to a hydrocarbon mixture has become unsuitable for its intended applications due to the presence of impurities or loss of original properties. The term "hydrocarbon mixture" as used herein preferably refers to a mixture of at least one organic compound consisting entirely of hydrogen and carbon. For example, in one embodiment, the waste oil is a mixture containing at least one of a used hydraulic oil, a used transmission oil, a used brake oil, a used motor/engine oil, a used crankcase oil, a used gear box oil, a used synthetic oil, a used cutting oil, a used differential oil, a used lubricating oil, a used power steering oil, a used refrigerant oil, a used turbine oil, a used pump oil, a used compressor oil, etc. The waste oil, as used herein, may refer to any oil (or a mixture of oils) that is used to lubricate moving parts in a machine, an equipment, or an engine, and lost original properties and has no usage. In one embodiment, the waste oil is a waste liquid produced by a refinery, a petrochemical, and/or a chemical plant. In some embodiments, the waste oil is a mixture of a heavy fraction of a crude oil distillation tower which is mixed with a residue of a fractionation unit.

In a preferred embodiment, the waste oil does not refer to "crude oil", which is a general term that refers to unrefined petroleum, as known to those skilled in the art. In another embodiment, the waste oil does not refer to "diesel" which is a specific fractional distillate of petroleum, as known to those skilled in the art. A compositional difference between the waste oil and diesel is shown in Table 1. In some other embodiments, the "waste oil" as used here does not refer to any one of kerosene, gas condensate, gas oil, gasoline, reformate, naphthalene, xylene and toluene, etc.

Figure 2:
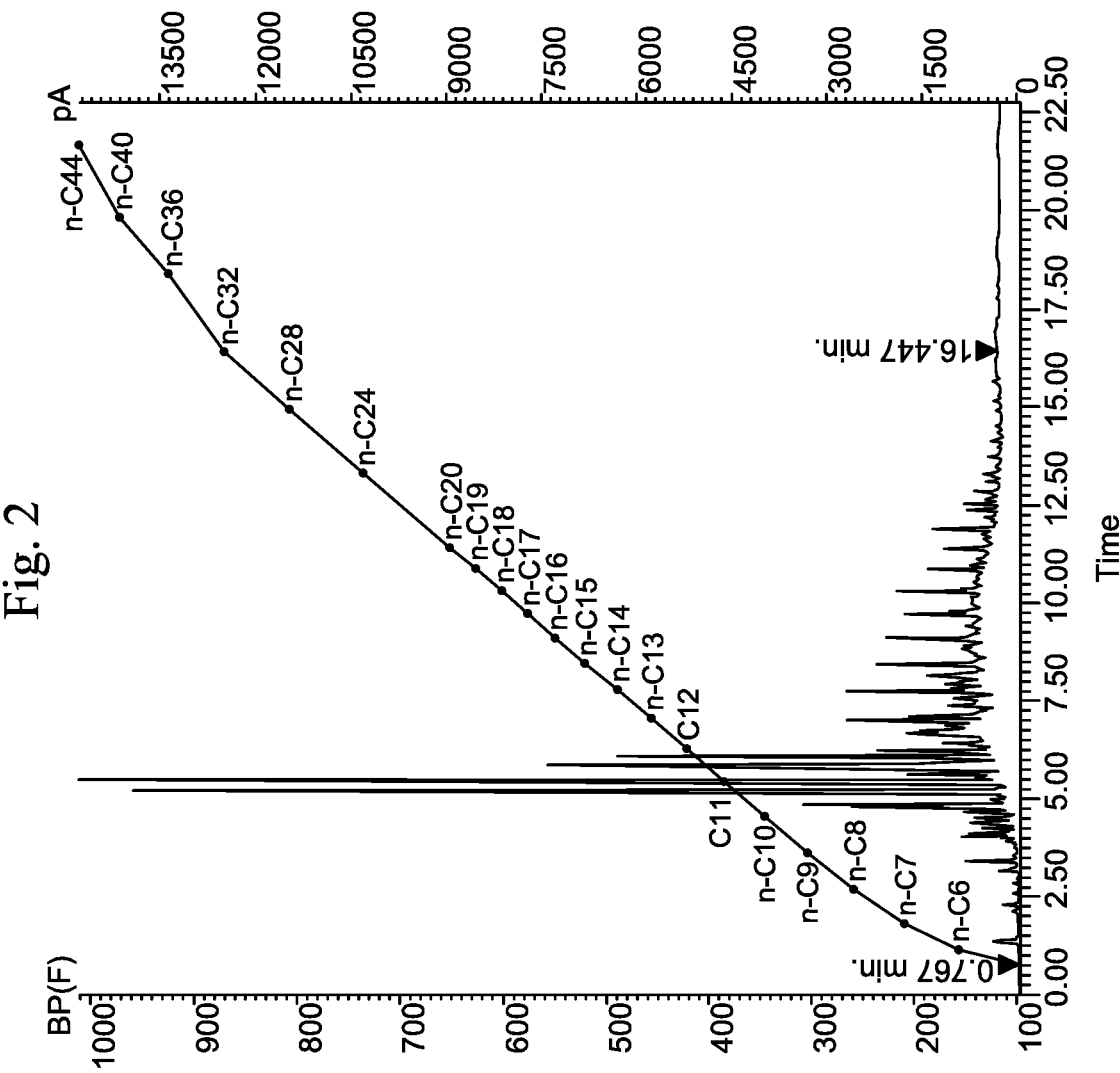
FIG. 2 is a gas chromatography mass spectrum of the waste oil.

The waste oil includes 45-75% by weight, preferably 45-65%, 45-55% or 46-50% by weight, preferably about 48% by weight of one or more aromatic compounds. In addition, the waste oil may further include 20-25% by weight, preferably 21-25% by weight, preferably about 23% by weight of one or more aliphatic compounds; and 25-30% by weight, preferably 26-30% by weight, preferably about 29% by weight of one or more cycloaliphatic compounds (or naphthenes), wherein each weight percentile is relative to the total weight of the waste oil. FIG. 1 represents an approximate amount (in wt %) of aromatic compounds (i.e. monoaromatics, diaromatics, triaromatics, naphthenomonoaromatics, naphthenodiaromatics, and naphthenotriaromatics), aliphatic compounds (i.e. paraffins), and cycloaliphatic compounds (i.e. naphthenes) that are present in the waste oil. Also, FIG. 2 represents a gas chromatography mass spectrum of the waste oil.

As used herein the term "aromatic compound" or arene is a hydrocarbon with sigma bonds and delocalized pi electrons between carbon atoms forming a circle. In contrast, aliphatic hydrocarbons lack this delocalization. The configuration of six carbon atoms in aromatic compounds is known as a phenyl ring. The simplest possible such hydrocarbon is benzene. In terms of the present disclosure, the aromatic compounds may be monocyclic (MAH), polycyclic (PAH), or naphthene aromatic compounds.

In certain embodiments, the aromatic compounds may include a monocyclic aromatic hydrocarbon (MAH) such as benzene or a benzene derivative. As used herein, benzene derivatives refer to from one to six substituents attached to a central benzene core. Exemplary suitable benzene derivatives include, but are not limited to, toluene, ethylbenzene, o-xylene, m-xylene, p-xylene, mixed xylenes, mesitylene, durene, 2-phenylhexane, biphenyl, and the like, preferably toluene.

In certain embodiments, the aromatic compounds may include one or more polycyclic aromatic hydrocarbons (PAH). As used herein a polycyclic aromatic hydrocarbon is an aromatic hydrocarbon that consists of fused aromatic rings and does not contain heteroatoms or carry substituents. Exemplary suitable polycyclic hydrocarbons include, but are not limited to, naphthalene, anthracene, phenathrene, tetracene, chrysene, triphenylene, pyrene, pentacene, benzo[a]pyrene, corannulene, benzo[g,h,i]perylene, coronene, ovalene, benzo[c]fluorene, acenaphthene, acenaphthylene, benzo[a]anthracene, benzo[b]fluoranthene, benzo[f]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoroanthene, fluorene, indeno[1,2,3-c,d]pyrene, 5-methylchrysene and the like.

In certain embodiments, the aromatic compounds may include a naphthene aromatic compound. The term "naphthene aromatic compound" as used herein preferably refers to a compound which constitutes a polycyclic aromatic hydrocarbon (PAH) that is partially saturated. Example of the naphthene aromatic compounds include, without limitation, naphthene monoaromatic compounds such as 1,2,3,4-tetrahydronaphthalene, naphthene diaromatic compounds such as 2,3-dihydro-1H-phenalene, naphthene triaromatic compounds such as 4,5-dihydropyrene, and naphthene polyaromatic compounds such as coronene. For example, in one embodiment, the waste oil includes 8-12% by weight, preferably 10-11% by weight of naphthene monoaromatic compounds, 1-5% by weight, preferably 2-4% by weight of naphthene diaromatic compounds, and 1-5% by weight, preferably 1.5-3.0% by weight of naphthene polyaromatic compounds, relative to the total weight of the waste oil.

The "aromatic compounds" or aromatic moieties of naphthene aromatics may be substituted with one or more of an alkyl (e.g. methyl, trifluoromethyl, ethyl, propyl, isopropyl, cyclopropyl, butyl, isobutyl, t-butyl, etc.), a cycloalkyl (e.g. cyclopropyl, cyclobutyl, cyclopentyl, cyclohexyl, etc.), an aryl (e.g. phenyl, biphenyl, napthyl, thienyl, and indolyl, etc.), or similar moieties of larger and/or more complex compounds.

The aromatic compounds present in the waste oil may provide an emulsifying effect, i.e. to reduce an interfacial surface tension between the aqueous phase and the oil phase of the emulsified acid. Accordingly, in some embodiments, the waste oil comprises 45-75% by weight, preferably 45-65%, 45-55% or 46-50% by weight of one or more aromatic compounds, relative to the total weight of the waste oil, wherein the aromatic compounds are at least one selected from the group consisting of a monocyclic aromatic hydrocarbon, a polycyclic aromatic hydrocarbon, and a naphthene aromatic compound. Accordingly, the polycyclic aromatic hydrocarbon may preferably be a diaromatic compound and/or a triaromatic compound, as described previously. Also, the naphthene aromatic compound may preferably be a naphthene monoaromatic compound, a naphthene diaromatic compound, and/or a naphthene triaromatic compound, as described previously. In view of that, the emulsifier may be present in the emulsified acid at a concentration of no more than 3.0% by volume, preferably no more than 2.0% by volume, preferably 0.5-1.5% by volume, relative to the total volume of the emulsified acid.

As shown in FIG. 1, in a preferred embodiment, the waste oil comprises 23-24% by weight, preferably about 23.5% by weight of paraffins such as alkanes, 9-10% by weight, preferably about 9.5% by weight of naphthenes such as cyclohexane, 18-20% by weight, preferably about 19% by weight of polynaphthenes such as decahydronaphthalene and dodecahydro-1H-phenalene, 18-20% by weight, preferably about 19% by weight of monoaromatics such as hexane, 10-12% by weight, preferably about 11% by weight of naphthenomonoaromatics such as 1,2,3,4-tetrahydronaphthalene, 9-10% by weight, preferably about 9.5% by weight of diaromatics such as naphthalene, 3-4% by weight, preferably about 3.5% by weight of naphthenodiaromatics such as 2,3-dihydro-1H-phenalene, 2-3% by weight, preferably about 2.5% by weight of triaromatics such as 1H-phenalene, 1-3% by weight, preferably about 2% by weight of naphthenotriaromatics such as 1,2,3,3a-tetrahydropyrene, wherein each weight percentile is relative to the total weight of the waste oil.

In a preferred embodiment, an overall cost of producing 1 barrel of the emulsified acid of the present disclosure may be 5% to 80%, preferably 10% to 50%, preferably 15% to 25% of the overall cost of producing 1 barrel of an emulsified acid that contains crude oil, diesel, xylene, etc. in lieu of the waste oil. A substantially lower cost of the emulsified acid that contains waste oil (when compared with an emulsified acid that contains crude oil, diesel, xylene, etc.) may be due to presence of the waste oil, which can be supplied at almost no cost, and may also be due to a reduced amount of the emulsifier used in the emulsified acid.

As used herein, the term "aliphatic compound" may refer to any one of alkane-, alkene-, or alkyne-based hydrocarbon compounds that are not categorized as aromatic compounds and/or naphthenes. As used herein the term "naphthene" or "cycloaliphatic compound" refers to a cyclic hydrocarbon compound (ring compound) that is aliphatic and cyclic. They may contain one or more all-carbon rings which may be either saturated or unsaturated, but do not have aromatic characteristics. Cycloaliphatic compounds may have one or more aliphatic side chains attached, such as for example, methylcyclohexane. In certain embodiments, the cycloaliphatic compound may be a simple alicyclic compound such as a monocyclic cycloalkane. Exemplary suitable monocyclic cycloalkanes include, but are not limited to, cyclopropane, cyclobutane, cyclopentane, cyclohexane, cycloheptane, cyclooctane, cyclotridecane, and the like, preferably cyclohexane. In certain embodiments, the cycloaliphatic compound may be a bicyclic or polycyclic alkane. Exemplary bicyclic or polycyclic alkanes include, but are not limited to, bicycloundecane, norbornane, decalin, cubane, basketane, housane, and the like. In certain embodiments, the cycloaliphatic compound may be a spiro compound. As used herein, spiro compounds have two or more rings that are connected through only one carbon atom. In certain embodiments, the cycloaliphatic compound may be a monocyclic cycloalkene (cycloolefin) or bicyclic cycloalkene. Exemplary monocyclic or bicyclic cycloalkenes include, but are not limited to, cyclopropene, cyclobutene, cyclopentene, cyclohexene, cycloheptene, cyclooctene, 1,3-cyclohexadiene, 1,4-cyclohexadiene, 1,5-cyclooctadiene, norbornene, norbornadiene, methylenecyclohexane, 1-methylcyclohexene, and the like. In certain embodiments, the cycloaliphatic compound may comprise one or more exocyclic double bonds, such as for example, the isotoluenes.

In certain embodiments, the waste oil is at least partially oxidized. "Partially oxidized" waste oil refers to an oil in which aromatic, cycloaliphatic, and/or paraffin compounds are at least partially substituted with oxygen. The oxygen may be in the form of hydroxyl groups, ether groups, ketone groups, carboxylic acid groups, or other oxygen-containing groups which substitute either paraffinic, aliphatic, and/or aromatic portions of the waste oil. Partial oxidation of the waste oil may occur when the waste oil is thermally or physically stressed. For example, heating the waste oil at high temperature in the presence of oxygen (for example oxygen in air) may lead to partial oxidation. Likewise, exposing the waste oil to high physical stress such as shear stress in the presence of oxygen or an oxygen-containing compound such as water may result in partial oxidation of the hydrocarbon compounds. In some embodiments, the waste oil includes up to 5.0% by weight, preferably no more than 2% by weight, preferably no more than 2% by weight of oxidized asphaltene, relative to the total weight of the waste oil.

In some embodiments, the waste oil contains more than 5% by weight of the one or more non-hydrocarbon compounds, and therefore the waste oil may preferably be treated with methods known to those skilled in the art, e.g. adsorptive denitrogenation, adsorptive desulfurization, hydrodesulfurization, hydrodenitrogenation, deoxygenation, etc. to reduce a concentration of the non-hydrocarbon compounds to a value below 0.5% by weight, preferably below 0.3% by weight, preferably below 0.1% by weight relative to the total weight of the waste oil, before using the waste oil for preparation of the emulsified acid. In a preferred embodiment, the waste oil is substantially free from the non-hydrocarbon compounds.

In some other embodiments, the waste oil may be may include up to 0.5% by weight, preferably no more than 0.3% by weight, preferably no more than 0.1% by weight of at least one non-hydrocarbon compound, relative to the total weight of the waste oil. As used here, the term "non-hydrocarbon compound" refers to a compound that has constituent elements (atoms) other than hydrogen and carbon. Example of such constituent elements (atoms) include, but are not limited to sulfur, nitrogen, oxygen, vanadium, nickel, sodium, potassium, boron, etc. Accordingly, in a preferred embodiment, the non-hydrocarbon compounds are one or more compounds selected from the group consisting of a sulfur compound, a nitrogen compound, an oxygen compound, and asphaltene.

Examples of the sulfur compounds may include, without limitation, mercaptans, sulfides, disulfides, polysulfides, thiols, thiophenes, thioethers, thioesters, thioacetals, sulfoxides, sulfones, thiosulfonates, sulfimides, sulfoximines, sulfonediimines, s-nitrosothiols, sulfur halides, thioketones, thioaldehydes, thiocarbonyls, sulfur oxides, thiocarboxylic acids, thioamides, sulfonic acid, sulfinic acid, sulfenic acids, sulfonium, oxosulfonium, sulfuranes, persulfuranes, and derivatives and combinations thereof. Examples of the nitrogen compounds may include, without limitation, compounds having amides, amines, imines, imides, azides, azo diimides, cyanates, nitrates, nitriles, nitrites, nitro compounds, nitroso compounds, oximes, pyridines, and derivatives and combinations thereof. Examples of the oxygen compounds may include, without limitation, alcohols, ketones, aldehydes, acyl halides, carbonates, carboxylates, esters, carboxylic acid, methoxies, hydroperoxides, peroxides, ethers, hemiacetals, hemiketals, acetals, ketals, orthoesters, and derivatives and combinations thereof.

In one embodiment, the emulsified acid comprises 0.1-3.0% by volume, preferably 0.2-2.5% by volume, preferably 0.3-2.0% by volume, preferably 0.5-1.5% by volume of the emulsifier, relative to the total volume of the emulsified acid. As defined here, an emulsifier is a compound added to two or more immiscible fluids, e.g., between two liquids or between a liquid and a gas, in order to disperse one fluid within the other by lowering a surface tension (or an interfacial surface tension) between the immiscible fluids.

In one embodiment, the emulsifier is at least one compound selected from the group consisting of an ethoxylated glycol, an ethoxylated phenol, a propoxylated glycol, a propoxylated phenol, an ethoxylated and propoxylated glycol, and an ethoxylated and propoxylated phenol. The emulsifier may comprise an ethoxylated (polyethylene oxide-like) sequence that is inserted to increase a hydrophilic character of the emulsifier. Alternatively, a propoxylated (polypropylene oxide-like) sequence is inserted to increase a lipophilic character of the emulsifier.

In some embodiments, the emulsifier is a surfactant selected from the group consisting of a cationic surfactant, an anionic surfactant, a nonionic surfactant, a dendritic surfactant, a gemini surfactant, a viscoelastic surfactant, and a zwitterionic surfactant. For example, in a preferred embodiment, the emulsifier is a cationic surfactant selected from Armostim H-Mul™ or Armovis EHS™ provided by AkzoNobel.

As used here, a surfactant refers to a molecule (or molecules) comprises a hydrophilic head unit attached to one or more hydrophobic tails. The tail of the surfactant may comprise a hydrocarbon chain, which can be branched, linear, or aromatic. For example, fluoro-surfactant molecules have fluorocarbon chains. Siloxane surfactant molecules have siloxane chains. Many surfactant molecules include a polyether chain terminating in a highly polar anionic group. The polyether chain often comprises ethoxylated (polyethylene oxide-like) sequences inserted to increase a hydrophilic character of the surfactant, or propoxylated (polypropylene oxide-like) sequences inserted to increase a lipophilic character of the surfactant.

As used here, a cationic surfactant refers to a molecule having cationic functional groups, e.g. primary and/or secondary amines, at each head. Examples of the cationic surfactant that may be utilized here include, but are not limited to octenidine dihydrochloride, cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

As used here, an anionic surfactant refers to a molecule having anionic functional groups, e.g. sulfonate, phosphate, and/or carboxylate, on at least one head. Examples of the anionic surfactant that may be utilized here include, but are not limited to an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol salt, an ethoxylated and propoxylated sulfated nonyl phenol salt, a sulfated octyl phenol salt, an ethoxylated and propoxylated sulfated octyl phenol salt, a sulfated dodecyl phenol salt, and an ethoxylated and propoxylated sulfated dodecyl phenol salt. Other anionic surfactants that may be used as the emulsifier include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

As used here, a nonionic surfactant refers to a molecule with a polar group that does not have a charge. Examples of the nonionic surfactant that may be utilized here include, but are not limited to long chain alcohols that exhibit surfactant properties, such as cetyl alcohol, stearyl alcohol, cetostearyl alcohol, oleyl alcohol, polyethylene glycol alkyl ethers having the formula $CH_3-(CH_2)_{10-16}-(O-C_2H_4)_{1-25}-OH$, such as octaethylene glycol monododecyl ether and pentaethylene glycol monododecyl ether; polypropylene glycol alkyl ethers having the formula: $CH_3-(CH_2)_{10-16}-(O-C_3H_6)_{1-25}-OH$; glucoside alkyl ethers having the formula $CH_3-(CH_2)_{10-16}-(O\text{-glucoside})_{1-3}-OH$, such as decyl glucoside, lauryl glucoside, octyl glucoside; polyethylene glycol octylphenyl ethers having the formula $C_8H_{17}-(C_6H_4)-(O-C_2H_4)_{1-25}-OH$, such as Triton X-100™; polyethylene glycol alkylphenyl ethers having the formula $C_9H_{19}-(C_6H_4)-(O-C_2H_4)_{1-25}-OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

As used here, a dendritic surfactant refers to a molecule that includes at least two lipophilic chains that have been joined at a hydrophilic center and thus forming a hyperbranched molecular structure. The dendritic surfactant may have better repulsion effect as a stabilizer at an interface and/or better interaction with a polar oil, as compared with other types of surfactants.

As used here, a gemini surfactant refers to a molecule that includes two hydrophilic heads and two hydrophobic tails.

As used here, a viscoelastic surfactant is a surfactant with molecules that are aggregated into worm-like micelles, differentiating them from non-viscoelastic surfactant molecules that are characterized by having one long hydrocarbon chain per surfactant head-group and do not forming micelles. Examples of the viscoelastic surfactant that may be used here include, without limitation N-erucyl-N,N-bis(2-hydroxyethyl)-N-methyl ammonium chloride and potassium oleate.

As used here, a zwitterionic (or amphoteric) surfactant refers to a molecule that includes both cationic and anionic groups attached to the molecule. Examples of the zwitterionic surfactants that may be used here include, but are not limited to CHAPS (3-[(3-cholamidopropyl)dimethylammonio]-1-propanesulfonate), cocamidopropyl hydroxysultaine, ocamidopropyl betaine, phospholipids, and sphingomyelins.

In certain embodiments, the emulsifier may be one or more of sodium salts of citrate, gelling agents, cellulose, guar gum, sodium alginate, sodium phosphate, and glycoproteins. In one embodiment, the emulsifier is N-cis-13-docosenoic-N,N-bis(2-hydroxymethyl)-N-methyl ammonium chloride, and/or a combination of an alkyl polyglycoside, an ethoxylated alcohol, and a triethyleneglycol monobutyl ether. In another embodiment, the emulsifier is selected from the group consisting of an ethylene oxide propylene oxide block copolymer, a fatty amine, a fatty polyamine, a hydrophilically modified amine, an ethoxylated derivative of hydrophilically modified amine, an ethoxylated derivative of a polyamine, a propoxylated derivative of hydrophilically modified amine, a propoxylated derivative of a polyamine, an ethoxylated tallow triamine, an ethoxylated oleyl amine, a soya ethylenediamine, a tallow diethylene triamine, a soya amine, an ethoxylated soya amine, and derivatives or combinations thereof. Yet in another embodiment, the emulsifier is a betaine surfactant such as erucic amidopropyl dimethyl betaine or oleoylamidopropyl dimethyl betaine.

In the emulsified acid, the emulsifier may further serve as a complexing agent, a crystallization inhibitor, an aerating agent, a water-wetting agent, a defoamer, a foamer, a detergent, a dispersant, a corrosion inhibitor, or a lubricant.

In one embodiment, the emulsified acid may further include one or more additives selected from an alcohol, a glycol, an organic solvent, a soap, a fragrance, a dye, a dispersant, a pH control additive, a buffer, a water softener, a bleaching agent, an antifouling agent, an antifoaming agent, an anti-sludge agent, a catalyst, a corrosion inhibitor intensifier, a viscosifier, a diverting agent, an oxygen scavenger, a fluid loss control additive, a friction reducer, a stabilizer, a rheology modifier, a retarder, a gelling agent, a scale inhibitor, a breaker, a salt, a crosslinker, a salt substitute, a permeability modifier, a sulfide scavenger, a bridging agent, a shale stabilizing agent (such as ammonium chloride, tetramethyl ammonium chloride, or cationic polymers), an anti-foaming agent, a clay treating additive, a polyelectrolyte, a freezing point depressant, an iron-reducing agent, a biocide/bactericide, fibers, microparticles, nanoparticles, etc. The aforementioned additives, when present, may have a mass concentration independently of 0.01-5 wt %, preferably 0.5-3 wt %, more preferably 0.8-2 wt %, relative to a total weight of the emulsified acid. For example, in a preferred embodiment, the emulsified acid contains a fluid loss control additive at a mass concentration of 0.01-2 wt %, preferably 0.5-1.5 wt %, more preferably 0.8-1.2 wt %, relative to a total weight of the emulsified acid. In view of that, a percent loss of the emulsified acid having the fluid loss control additive during an acidizing operation may preferably be no more than 5.0 vol %, preferably no more than 2.0 vol %, preferably no more than 1.0 vol %, preferably no more than 0.5 vol %, preferably no more than 0.1 vol %, relative to the total volume of the emulsified acid that is injected. The term "percent loss" as used herein refers to a volume percentile of a leaked emulsified acid relative to the total volume of the emulsified acid that is injected. In one embodiment, the emulsified acid is biodegradable.

In one embodiment, the emulsified acid has an apparent viscosity of 500 to 10,000 cP, preferably 1,000 to 5,000 cP, preferably 1,200 to 4,000 cP at a temperature of 20 to 100° C., preferably 25 to 80° C., under a shear rate of 0.1 to 10 $s^{-1}$, preferably 0.5 to 1.5 $s^{-1}$. In one embodiment, the apparent viscosity of the emulsified acid is determined with an acid-resistant rheometer following a bob/cup set, as known to those skilled in the art. In one embodiment, the emulsified acid is a shear-thinning fluid, meaning that the apparent viscosity of the emulsified acid decreases with increasing shear-stress and/or shear strain rate. In view of the apparent viscosity of the emulsified acid at the above-mentioned temperatures, the emulsified acid may be a preferable, reliable, and inexpensive stimulation fluid for acidizing a subterranean geological formation. In addition, the emulsified acid may preferably be utilized in a drilling operation as a drilling fluid.

According to a second aspect, the present disclosure relates to a method of drilling the subterranean geological formation. Accordingly, the subterranean geological formation is drilled, e.g. by driving a drill bit, to form a wellbore in the subterranean geological formation followed by circulating the emulsified acid, which is provided as a drilling fluid, in the wellbore.

In some embodiments, the drilling comprises identifying a site of interest, and then creating a starter hole in the ground at that site. Then, the drill bit, which may be coupled to a hydraulic pump, is driven through the starter hole. The drill bit and the hydraulic pump are not meant to be limiting and various types of drill bits and hydraulic pumps, as known to those skilled in the art, may be utilized here. The wellbore may be drilled to a depth of at least 20 m, preferably at least 100 m, preferably at least 500 m, preferably 1,000 m to 3,000 m, preferably 1,500 m to 2,500 m. A formation fluid may be produced during or after the drilling. The formation fluid may be one or more of a sour and/or sweet natural gas, a sour and/or sweet crude oil, gas condensate, water, etc.

During the drilling, the emulsified acid may preferably be circulated in the subterranean geological formation through the wellbore to lubricate and/or cool the drill bit and to remove drilling cuttings. In some embodiments, the emulsified acid is circulated at a flow rate ranging from 1 to 50 L/s, preferably 5 to 40 L/s, preferably 12 to 26 L/s, preferably 15 to 22 L/s, more preferably 17 to 20 L/s.

The subterranean geological formation may be drilled using different protocols, as known to those skilled in the art, to form a vertical wellbore, a horizontal wellbore, a multi-lateral wellbore, or a maximum reservoir contact (MRC) wellbore. As used here, a horizontal wellbore refers to a wellbore that has a vertical section and a horizontal lateral section with an inclination angle (an angle between the vertical section and the horizontal lateral section) of at least 70°, or at least 80°, or in the range of 85° to 90° with the. The horizontal wellbore may enhance a reservoir performance due to an increased reservoir contact provided by the horizontal lateral section. As used here, a multilateral wellbore refers to a wellbore that has a main/central borehole and a plurality of laterals extend outwardly therefrom. As used here, a maximum reservoir contact wellbore is one type of directional wellbore that provides an aggregate reservoir contact of at least 2 km, or at least 5 km, or preferably about 6 to about 8 km, through a single or a multi-lateral configuration.

In one embodiment, a downhole temperature of the wellbore is no more than 200° C., preferably from about 100 to 150° C., preferably 110 to 140° C., more preferably 120 to 130° C. In some embodiments, the wellbore is a horizontal wellbore and the temperature may not vary significantly along a horizontal lateral section of the wellbore. Accordingly, the emulsified acid may preferably serve as intended at the abovementioned downhole temperatures, while preserving its stability and apparent viscosity. In one embodiment, the downhole temperature in the wellbore may be adjusted by heating or cooling the emulsified acid before circulating to the wellbore. Accordingly, a temperature of the emulsified acid may be adjusted to a value in the range of 40 to 80° C., preferably 50 to 70° C. Alternatively, the temperature of the emulsified acid may be lowered to 2 to 20° C., preferably 5 to 10° C. A person having ordinary skill in the art may be able to determine appropriate temperatures for the emulsified acid before drilling operations.

In some embodiments, for economic and environmental reasons, the emulsified acid may be cleaned and recirculated. In view of that, large drill cuttings are removed via a sieving process, for example, by passing the emulsified acid through one or more vibrating screens, and optionally fine cuttings are removed by passing the emulsified acid through centrifuges or screens with small mesh sizes. Then, the emulsified acid may preferably be recirculated to the wellbore.

Duration of a drilling operation with the emulsified acid may vary with respect to the stability of the emulsified acid. For example, in one embodiment, a stability of the emulsified acid is 2 to 4 hours, preferably 2.5 to 3.5 hours, and therefore the emulsified acid is circulated within the wellbore for at least 30 minutes, preferably at least 1 hour but no more than 6 hours, preferably 2 to 4 hours, preferably 2.5 to 3.5 hours.

In some embodiments, the emulsified acid contains a fluid loss control additive at a mass concentration of 0.01-2 wt %, preferably 0.5-1.5 wt %, more preferably 0.8-1.2 wt %, relative to a total weight of the emulsified acid. In view of that, a percent loss of the emulsified acid having the fluid loss control additive during the drilling may preferably be no more than 5.0 vol %, preferably no more than 2.0 vol %, preferably no more than 1.0 vol %, preferably no more than 0.5 vol %, preferably no more than 0.1 vol %, relative to the total volume of the emulsified acid that is circulated.

According to a third aspect, the present disclosure relates to a method of forming the emulsified acid. Accordingly, in one embodiment, a first mixture is prepared by mixing the waste oil with the emulsifier and optionally agitating, e.g., stirring, for 2 to 30 minutes, preferably 3 to 10 minutes, preferably 4 to 6 minutes, at a temperature of 20 to 30° C., preferably 22 to 26° C., and with a rotational speed of 400 to 2,000 rpm, preferably 600 to 1,400 rpm. A volume ratio of the emulsifier to the waste oil in the first mixture may preferably be in the range of 1:400 to 1:10, preferably 1:300 to 1:50, preferably 1:200 to 1:100. Once the first mixture is prepared, in one embodiment, the hydrochloric acid solution is preferably added to the first mixture and stirred for 2 to 30 minutes, preferably 3 to 10 minutes, preferably 4 to 6 minutes at a temperature of 20 to 30° C., preferably 22 to 26° C., and with a rotational speed of 400 to 2,000 rpm, preferably 600 to 1,400 rpm to form the emulsified acid.

Figure 14:
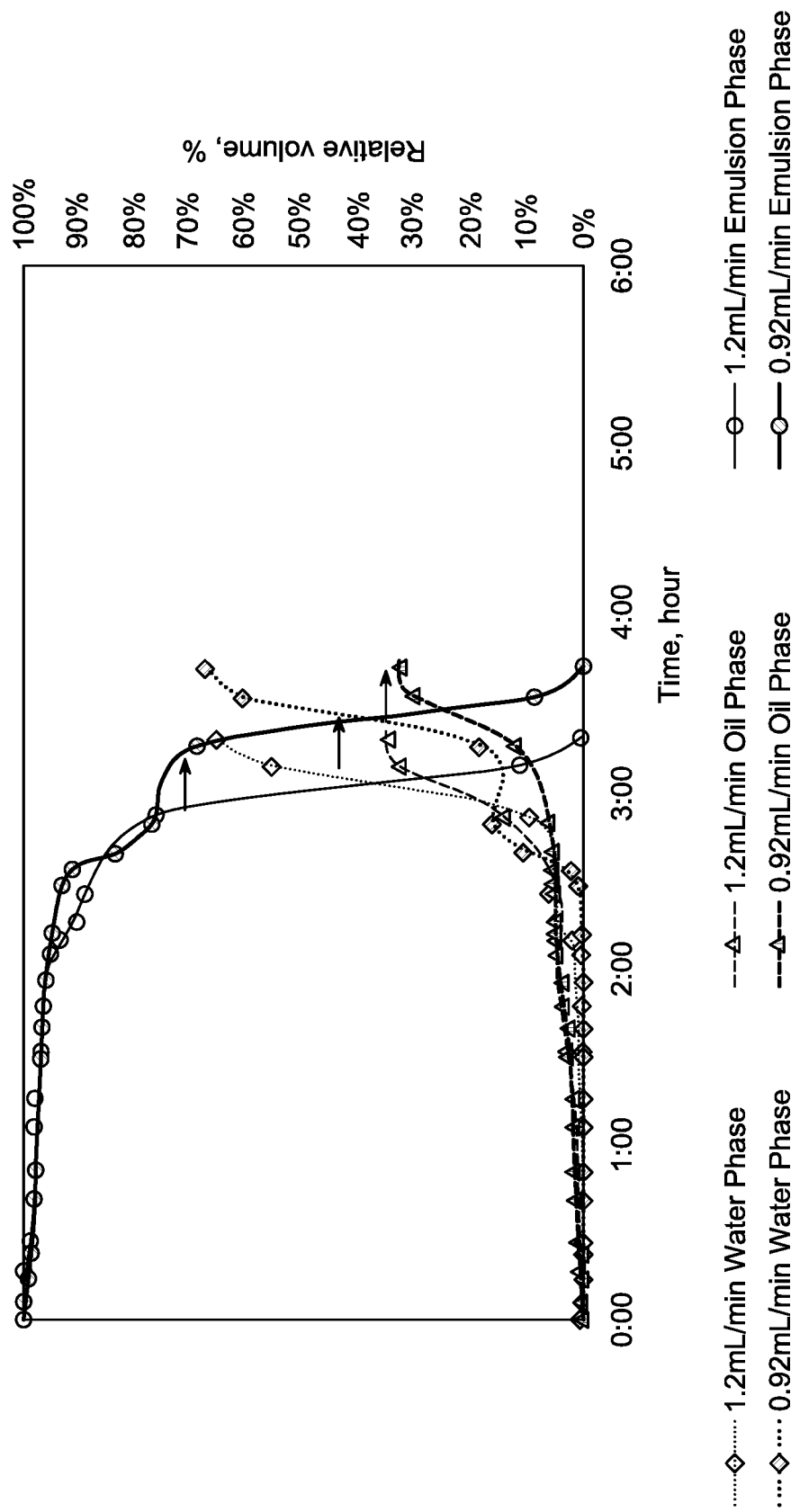
FIG. 14 represents relative volume of an emulsion phase, an aqueous phase (or water phase), and an oil phase of an emulsified acid during phase separation vs. time at 120° C., wherein the emulsified acid is prepared at a mixing rate of 0.92 mL/min and 1.2 mL/min.

In a preferred embodiment, the hydrochloric acid solution is added to the first mixture in a drop-wise manner with a mixing rate of 0.5 mL/min to 1.5 mL/min, preferably 0.7 mL/min to 1.2 mL/min, preferably 0.8 mL/min to 1.0 mL/min. The mixing rate may affect the stability of the emulsified acid, as shown in FIG. 14. Accordingly, the stability of an emulsified acid may be elongated by at least 20 minutes, preferably 30 to 60 minutes, when the mixing rate is reduced by 0.2 mL/min to 0.4 mL/min, preferably about 0.3 mL/min. The mixing rate is not limited to the abovementioned ranges, and in large-scale applications, a mixing rate of at least 0.1 L/min, preferably in the range of 0.1 L/min to 50 L/min, preferably 0.2 L/min to 40 L/min, preferably 0.3 L/min to 30 L/min may be utilized.

In certain embodiments, a second mixture is prepared by mixing the hydrochloric acid solution with the corrosion inhibitor and optionally stirred for 2 to 30 minutes, preferably 3 to 10 minutes, preferably 4 to 6 minutes, at a temperature of 20 to 30° C., preferably 22 to 26° C., and with a rotational speed of 400 to 2,000 rpm, preferably 600 to 1,400 rpm. A volume ratio of the corrosion inhibitor to the hydrochloric acid solution in the second mixture may be preferably 1:1,000 to 1:100, preferably 1:500 to 1:150, preferably 1:400 to 1:200. Once the second mixture is prepared, in one embodiment, the second mixture is added to the first mixture in a drop-wise manner with a mixing rate of 0.5 mL/min to 1.5 mL/min, preferably 0.7 mL/min to 1.2 mL/min, preferably 0.8 mL/min to 1.0 mL/min. In one embodiment, mixing the first mixture and the second mixture may be carried out using a pump and a syringe. In large scale applications, the mixing rate of the first mixture with the second mixture may be at least 0.1 L/min, preferably in the range of 0.1 to 50 L/min, preferably 0.2 L/min to 40 L/min, preferably 0.3 L/min to 30 L/min.

The one or more additives, as described previously, may be present in the first mixture and/or the second mixture, depending on whether the additive is miscible in water or oil. Accordingly, the additive may be mixed with the second mixture, when the additive is miscible in water. Alternatively, the additive may be mixed with the first mixture, when the additive is miscible in oil.

In some embodiments, the emulsified acid may be formed by adding and/or mixing components (i.e. the waste oil, the emulsifier, the hydrochloric acid solution, etc.) in any order, and then continuing to mix until a stable and uniform mixture is formed. In one embodiment, the emulsified acid may be heated to a temperature of 50 to 80° C., preferably 60 to 70° C. while mixing in order to more quickly form an emulsion. The mixing may be performed by a static mixer or through some other forms of agitation or blending e.g. a turbine, an impeller, a drum mixer, a stir bar, a paddle, etc.

In certain embodiments, the waste oil includes suspended solid particles and therefore the waste oil is passed through a filter with a mesh size of up to 0.5 µm, preferably 0.1 to 0.4 µm, to remove the suspended solid particles before mixing with the emulsifier. The waste oil may preferably be treated with coarse filters (i.e. filters with a mesh size of above 1.0 µm, preferably above 1.0 mm) to remove sands and other coarse particulate present in the waste oil.

In certain embodiments, the waste oil contains more than 0.5% by weight, or more than 1.0% by weight, of non-hydrocarbon compounds relative to the total weight of the waste oil. Therefore, the waste oil is treated by methods known to those skilled in the art to remove at least a portion of the non-hydrocarbon compounds from the waste oil before mixing with the emulsifier. Example of such methods include, without limitation, adsorptive denitrogenation, adsorptive desulfurization, hydrodesulfurization, hydrodenitrogenation, and deoxygenation.

Due to a large aromatic content of the waste oil, i.e. about 45-75% by weight, preferably 46-50% by weight, preferably about 48% by weight relative to the total weight of the waste oil, in certain embodiments, the emulsified acid is formed by adding the hydrochloric acid solution to the waste oil, wherein the waste oil is not previously mixed with an emulsifier.

In one embodiment, the emulsified acid is stored (or aged) at a condition with a temperature of no more than 40° C., preferably no more than 30° C., for no more than 20 days, preferably no more than 15 days, wherein the apparent viscosity and the stability of the emulsified acid remains relatively unchanged, when compared with the emulsified acid without being stored (or aged).

The examples below are intended to further illustrate protocols for the emulsified acid the method of forming thereof, and are not intended to limit the scope of the claims.

Example 1

The following examples investigate the properties of an emulsified acid that includes waste oil and hydrochloric acid. The waste oil is supplied from a refinery, as an extra hydrocarbon that remained unused. The chemical composition of waste oil is studied using Gas Chromatography (GC), and the result is shown in FIG. 2.

The following examples investigate the effects of some variables on thermal stability and rheological properties of the emulsified acid. These variables include emulsifier concentrations, mixing speeds, mixing rates, and the presence of a corrosion inhibitor. All experiments are conducted at high temperatures, around 120° C. To assess the quality of the emulsified acid was also determined by measuring droplet sizes as a function of temperature (up to 100° C.).

Example 2—Materials and Preparation

A cationic emulsifier (Armostim H-Mul) and a corrosion inhibitor (Sanjal AI-8) are supplied from AkzoNobel. The HCl used is of American Chemical Society (ACS) grade with a concentration of about 36.9 wt %. Distilled water is used to dilute the concentrated HCl to 15 wt %. The waste oil is collected from a local refinery and has a composition as illustrated in Table 1, FIG. 1, and FIG. 2.

TABLE 1

A composition of the waste oil

| Hydrocarbon Family | Waste oil, % | Diesel, % |
|---|---|---|
| Paraffins | 23.30 | 44.8 |
| Naphtenes | 9.70 | 21.8 |
| Polynaphtenes | 19.10 | 10.4 |
| Monoaromatics | 19.10 | 9.8 |
| Naphtenomonoaromatics | 10.90 | 7.0 |
| Diaromatics | 9.60 | 3.4 |
| Naphtenodiaromatics | 3.60 | 1.5 |
| Triaromatics | 2.7 | 1.0 |
| Naphtenotriaromatics | 2 | 0.3 |

In all the experiments conducted in this study, the acid-to-oil ratio was kept at 70:30 and the emulsion (i.e. the emulsified acid) was prepared at room temperature. Since the emulsion composed of two separate phases, two beakers were used to prepare each phase. The hydrocarbon phase (oil phase) was prepared by mixing waste oil with the emulsifier acid at a specific concentration. Then, the oil phase was stirred at a specific mixing speed for 5 minutes. In a separate beaker the water phase was prepared. Accordingly, HCl diluted with distilled water (15 wt %) was poured in a separate beaker with the corrosion inhibitor of 0.3 vol % and then stirred for 5 minutes at the same speed used for the oil phase. While mixing the oil phase, the water phase was added to the oil phase using a syringe and a syringe pump, in a drop-wise manner. After the last drop of the water phase, the two phases stirred thoroughly for 5 minutes until a brownish color emulsion was obtained.

Example 3—Characterization

The mixer used in this study has a wide range of mixing speeds (600-10,000) rpm with 200 rpm increment and a speed deviation of 1%. Also, it is equipped with an acid-resistant dispersion element so it can be used to prepare emulsified acid. This mixer has 1100 W of power input which is provided by IKA®, model T 50 digital ULTRA-TURRAX®.

All rheological experiments were conducted with the use of an acid-resistant rheometer, manufactured by REOLOGICA®, model STRESSTECH. This rheometer has a range of $3.0 \times 10^{-8}$ to $2.0 \times 10^{-1}$ N·m of torque and a temperature range of −20 to 150° C. In this study, the bob/cup set was used with a volume of 15.9 mL of the emulsion for testing.

When measuring the droplet size distribution, FRITSCH® ANALYSETTE 22 MicroTec plus of 0.1-600 μm of measuring range was used. This droplet analyzer works based on diffraction of electromagnetic waves principle. The droplet size distribution was calculated using the Lorenz-Mie or the Fraunhofer theory.

Figure 3:
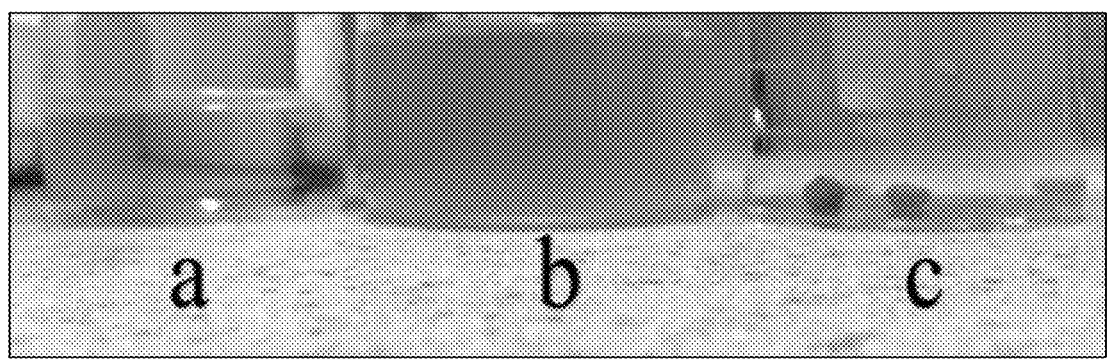
FIG. 3 is an image of a) pure oil, b) an emulsified acid dispersed in the pure oil, c) the emulsified acid mixed with water.

The emulsion type was determined by dilution test. Accordingly, a small amount of the emulsion was mixed with the content of the two separate beakers, one having pure water and the other pure oil. FIG. 3 shows that the emulsion dispersed in pure oil but not in pure water indicating that the emulsion is a water-in-oil emulsion.

In order to investigate the thermal stability of the emulsion, graduated glass tubes were used to monitor the phase separation at a constant temperature. The thermal stability test was carried out at 120° C. and for 6 hour period. During that period, relative volumes of the three phases (emulsion, water and oil) were recorded. FIG. 4 shows a waste oil emulsion while being heated at 120° C. during a phase separation test.

The rheology test was also conducted on a 15.9 mL of the emulsion to measure the apparent viscosity and oscillating properties at temperatures of 25, 40 and 60° C.

The emulsion quality was determined by measuring droplet size. The emulsion was heated and then droplet size distribution was measured. For consistency, all sampling was done at the same time for all emulsions.

Example 4—Thermal Stability

The type and concentration of the emulsifier used are important in formulating a stable emulsion [Nasr-El-Din, Hisham A, Saad M Al-Driweesh, Arthur S Metcalf et al. 2008b. Fracture acidizing: what role does formation softening play in production response, *SPE Production & Operations* 23 (02): 184-191]. At a temperature of 120° C., both the effect of emulsifier concentration and the effect of mixing speed (rpm) were studied.

Accordingly, two sets of emulsions were prepared, one with a corrosion inhibitor and the other without a corrosion inhibitor. For both sets, four different emulsifier concentrations were used to study the effect on the thermal stability namely, 0.5, 0.7, 1.0 and 1.5 vol %. All the emulsions were prepared with those concentrations separately at a mixing speed of 600 rpm. The relative volume the three phases was recorded using the graduated glass test tubes at 120° C. for 6 hours.

Figure 5:
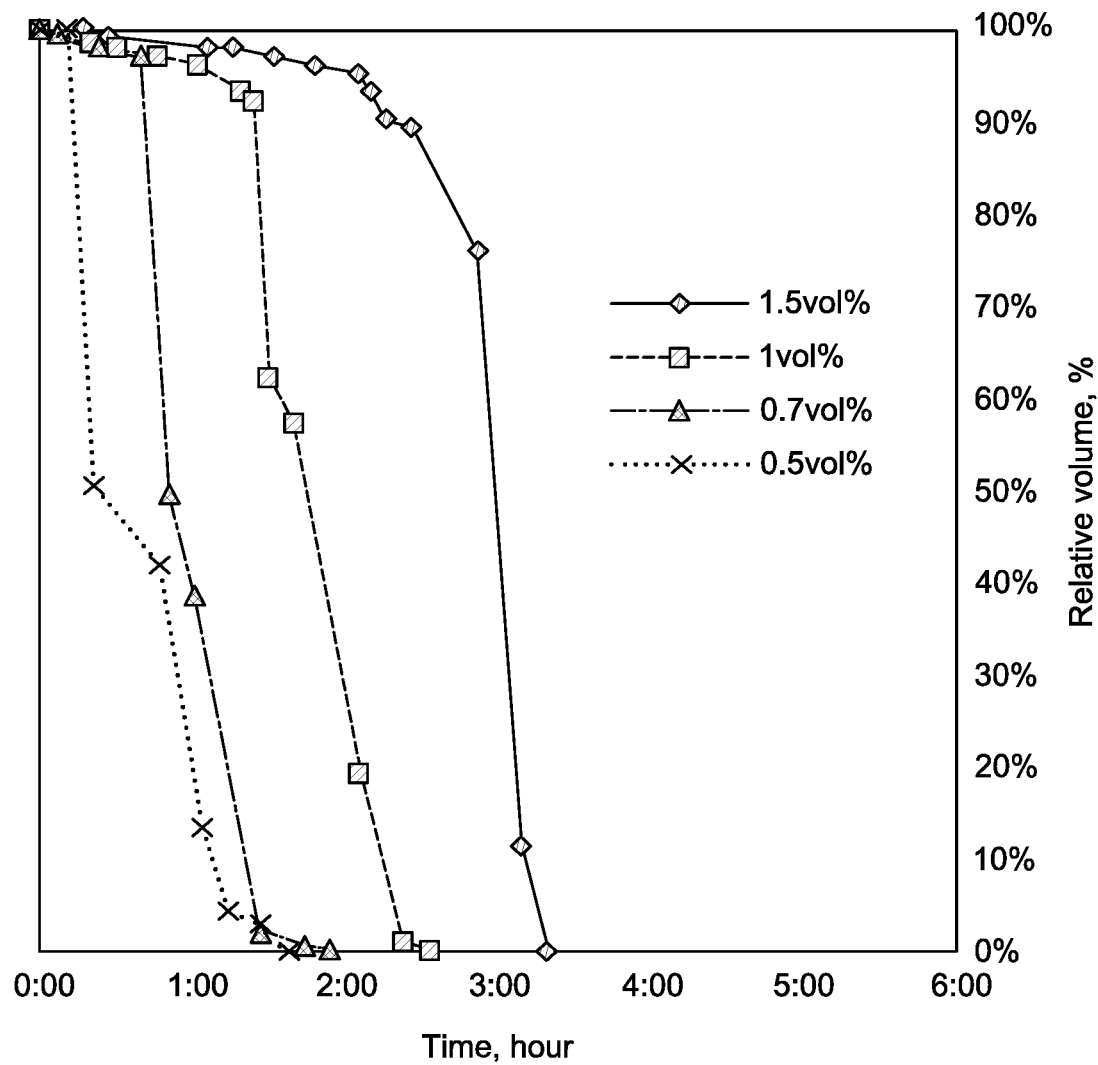
FIG. 5 represents relative volume of an emulsion phase of an emulsified acid during phase separation vs. time at 120° C., wherein the emulsified acid contains a corrosion inhibitor and an emulsifier at various concentrations.
Figure 6:
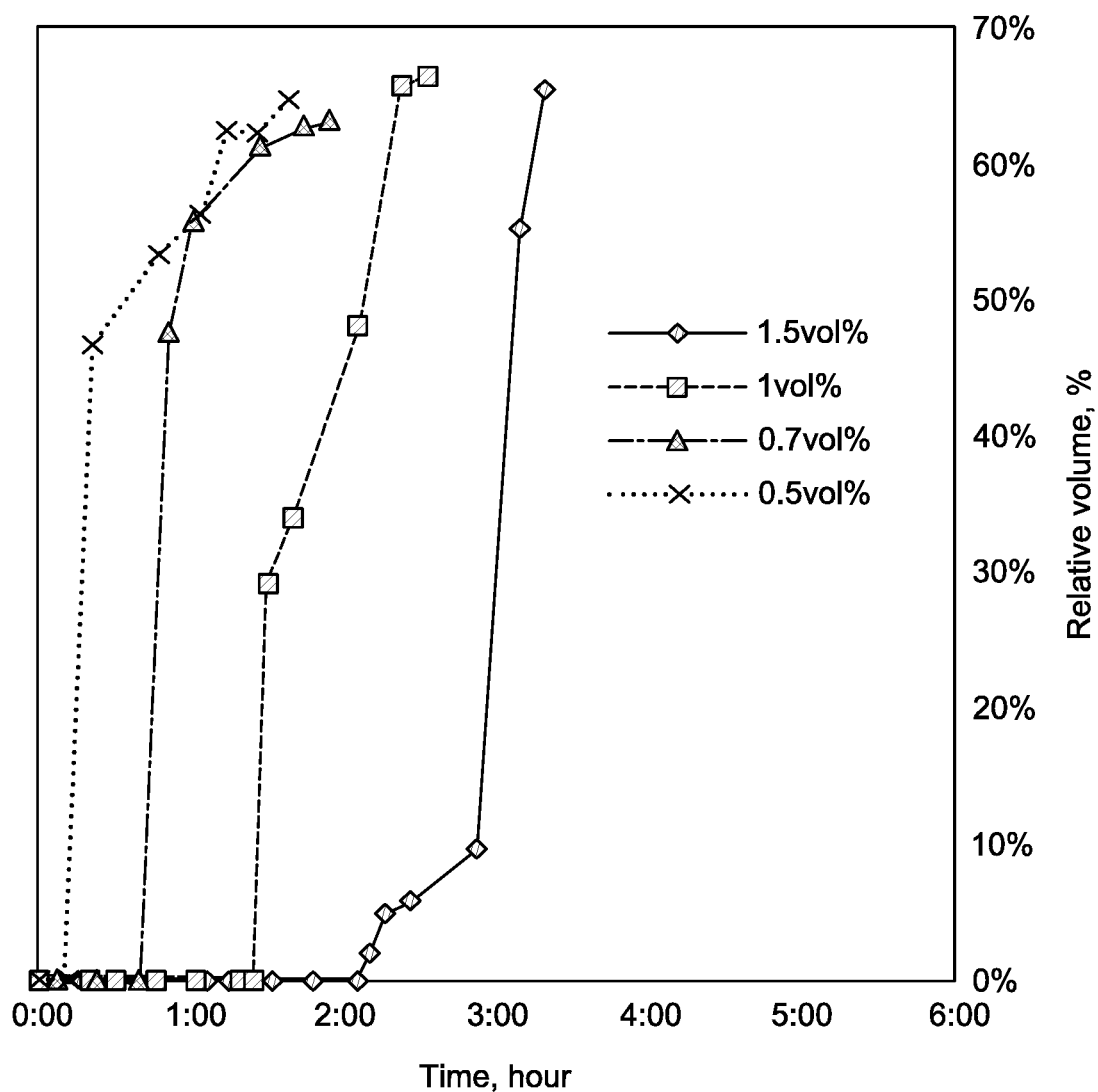
FIG. 6 represents relative volume of an aqueous phase (or water phase) of an emulsified acid during phase separation vs. time at 120° C., wherein the emulsified acid contains a corrosion inhibitor and an emulsifier at various concentrations.
Figure 7:
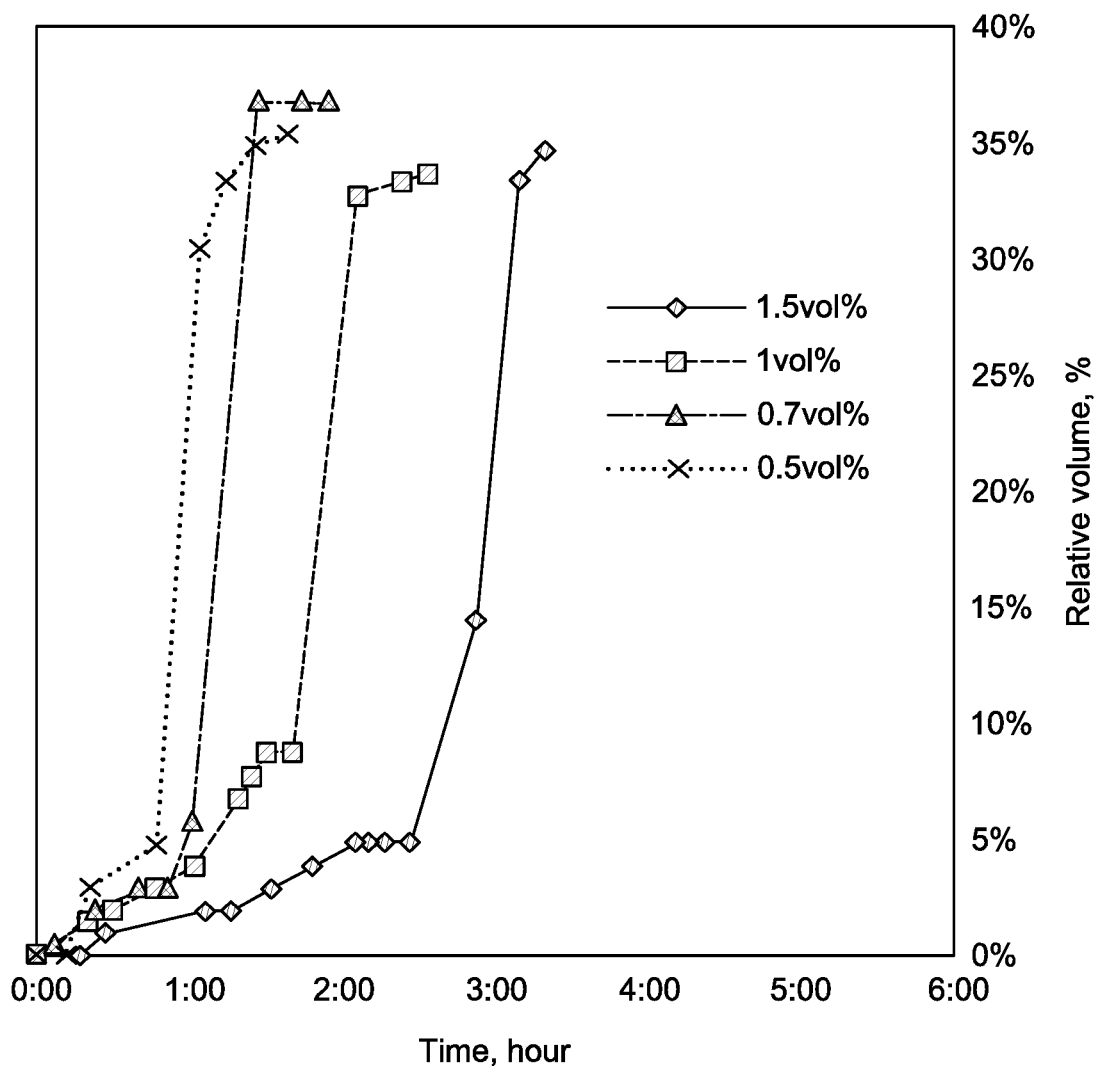
FIG. 7 represents relative volume of an oil phase of an emulsified acid during phase separation vs. time at 120° C., wherein the emulsified acid contains a corrosion inhibitor and an emulsifier at various concentrations.

FIG. 5, FIG. 6, and FIG. 7 represent the results of emulsion, water and oil phases, respectively, for waste oil emulsion prepared with corrosion inhibitor. The overall trend is that the increase of emulsifier concentration results in forming more stable emulsions even at a high temperature, i.e. at 120° C.

Initially, all of the emulsions were in an emulsion phase. For concentration of 0.5 vol %, the emulsion—after just 21 minutes of heating—starts to break into water phase which happens very rapidly, and within 98 minutes the emulsion completely breaks into its original two phases. Increasing the emulsifier concentration to 0.7, 1.0 and 1.5 vol % results in a delay of the start time to breaking into water phase to 51, 90 and 130 minutes, respectively. Nevertheless, all of the emulsions break completely within 3 hours of heating at 120° C.

Figure 8:
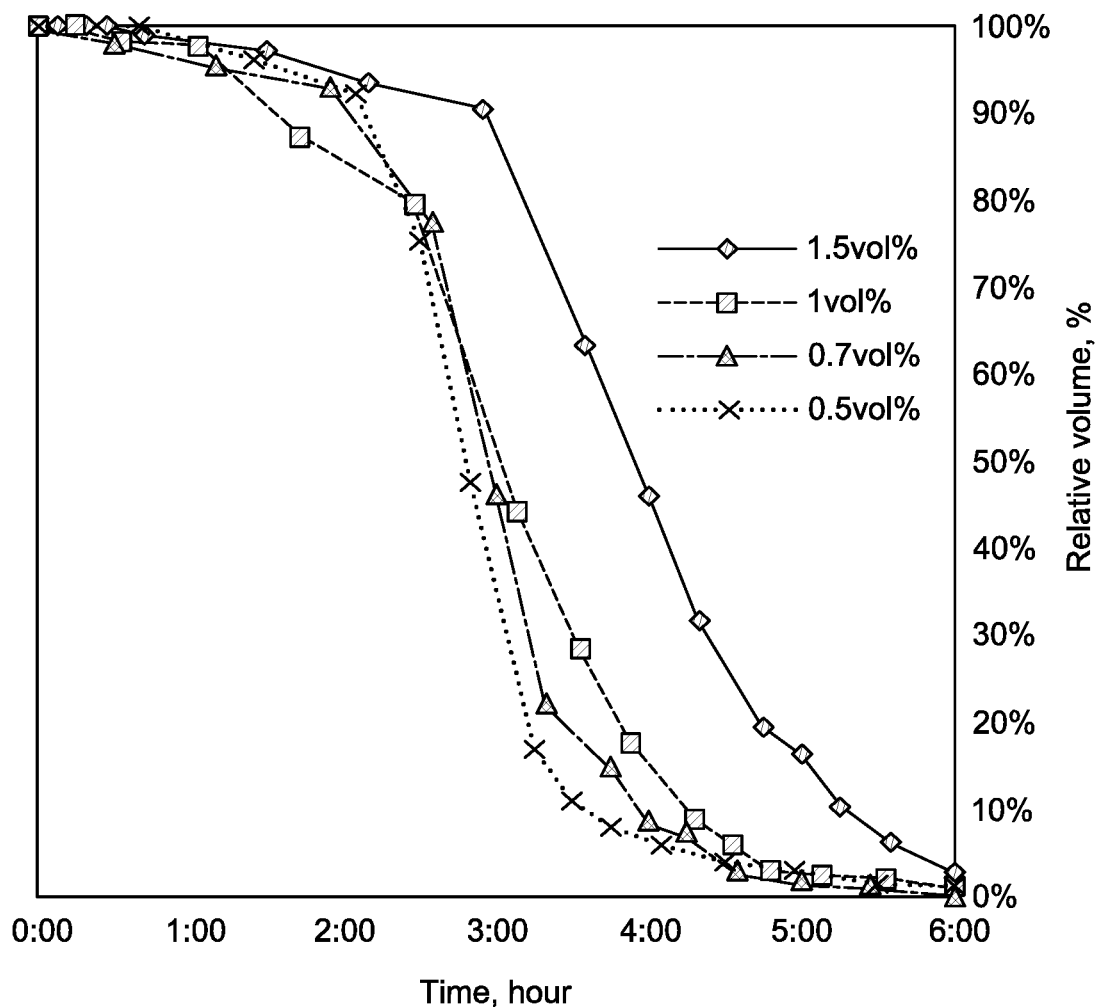
FIG. 8 represents relative volume of an emulsion phase of an emulsified acid during phase separation vs. time at 120° C., wherein the emulsified acid contains an emulsifier at various concentrations and does not include a corrosion inhibitor.
Figure 9:
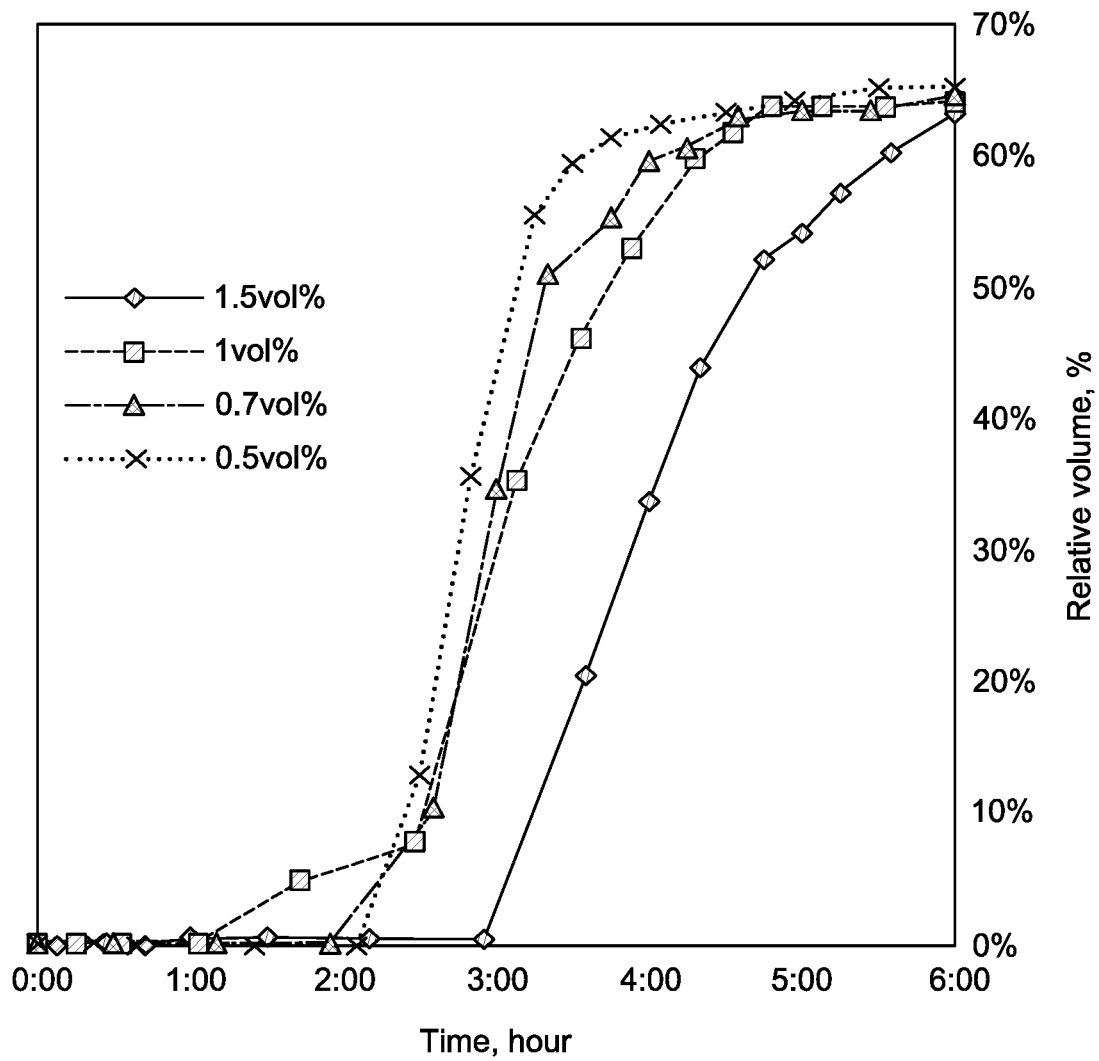
FIG. 9 represents relative volume of an aqueous phase (or water phase) of an emulsified acid during phase separation vs. time at 120° C., wherein the emulsified acid contains an emulsifier at various concentrations and does not include a corrosion inhibitor.
Figure 10:
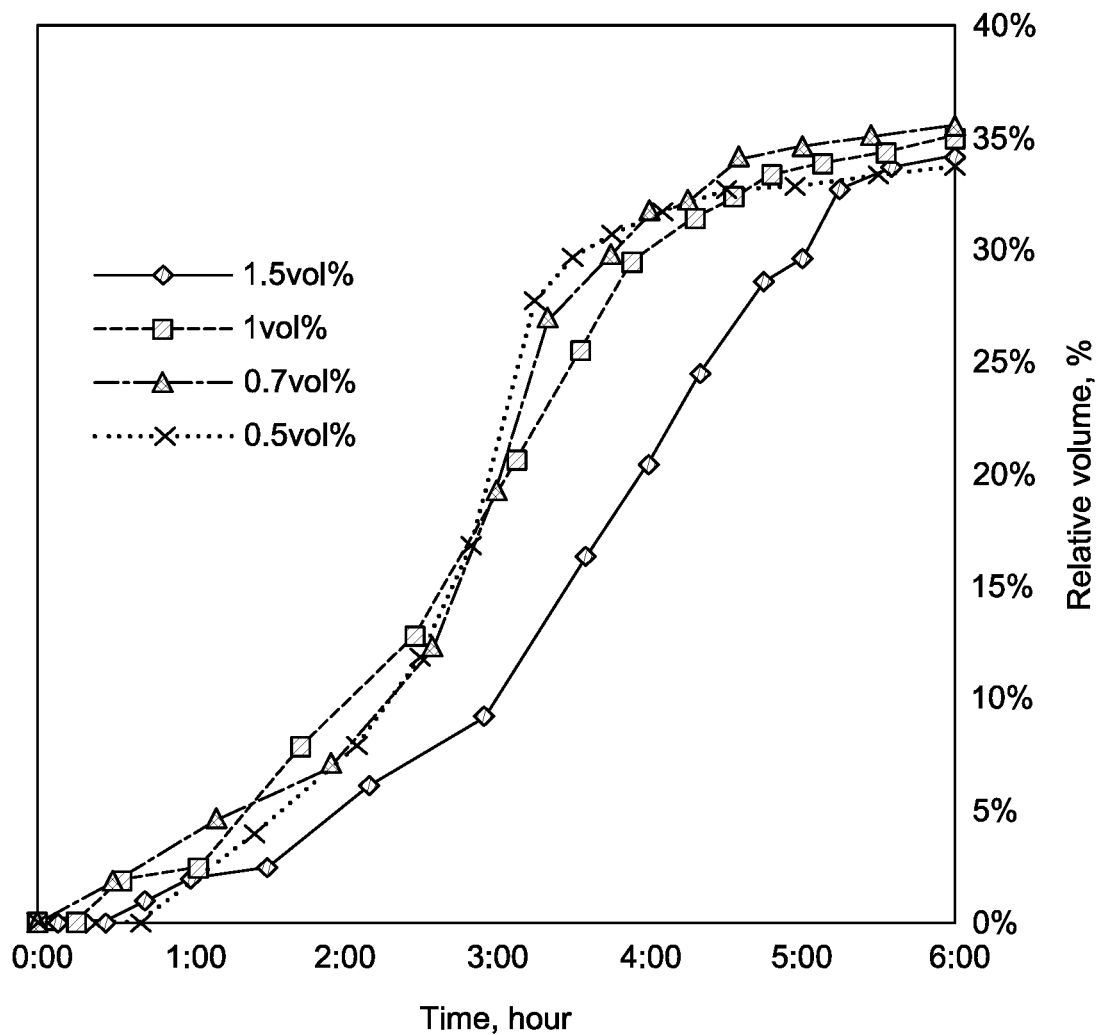
FIG. 10 represents relative volume of an oil phase of an emulsified acid during phase separation vs. time at 120° C., wherein the emulsified acid contains an emulsifier at various concentrations and does not include a corrosion inhibitor.

On the other hand, relative volume of each phase of the waste oil emulsion prepared without corrosion inhibitor is presented in FIG. 8, FIG. 9, and FIG. 10. These figures show a plot of the emulsion, water and oil phases, respectively, of the 4 concentrations as a function of time for 6 hour period at 120° C. From those figures it clearly can be seen that the emulsifier concentration of 1.5 vol % is the most stable one. Also, after 120 minutes the emulsion phases of all concentrations start to break into water and oil phases. In terms of water phase, the emulsion with 1.0 vol % concentration starts to break early compared to others and it is considered as the least stable emulsion for the first 3 hours of heating. However, after the beginning of the second 3 hours, the emulsion becomes the second most stable after the 1.5% —as expected. During the stability test time (6 hours) all of the emulsions break down completely into oil and water phases. Overall, the difference between 0.5, 0.7 and 1.0 vol % is not that significant and a slight difference is observed with the 1.5 vol % emulsion. Hence, the optimum condition for emulsifier concentration is selected to be 0.5 vol %.

Two experiments were designed at the same conditions but the emulsions were prepared at difference mixing rates, one with a mixing rate of 0.92 mL/min and the other with a mixing rate of 1.2 mL/min. FIG. 14 shows the relative volume of each phase during phase separation of the emulsions prepared at difference mixing rates. It clearly can be seen the significance of the mixing rate, even if the difference is small as in this case ~0.3 mL/min. Such difference in the mixing rate delayed the break of the water phase by 20 minutes. Since the corrosion inhibitor reduced the stability of the emulsions, all of the emulsions afterwards were prepared without the presence of a corrosion inhibitor.

Figure 11:
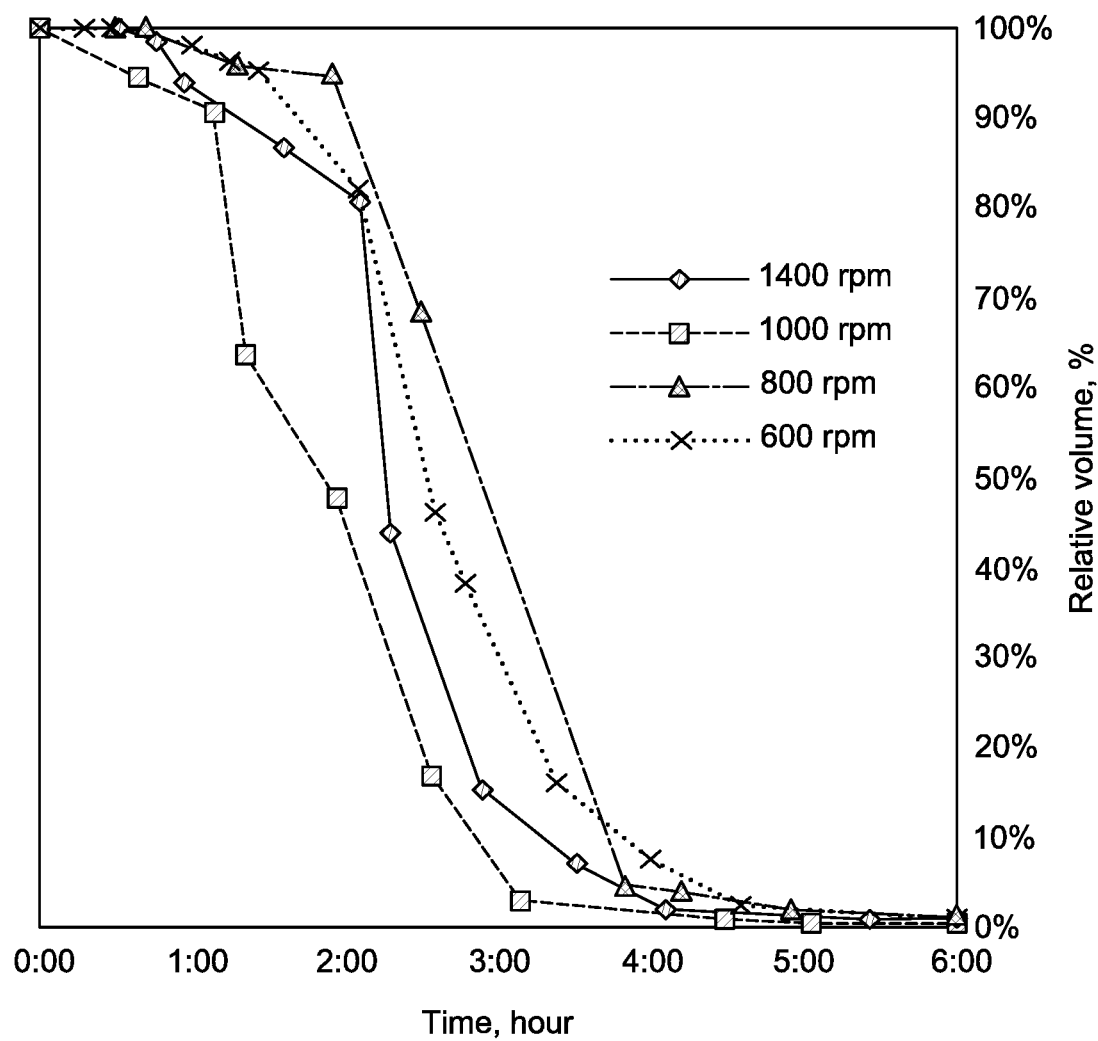
FIG. 11 represents relative volume of an emulsion phase of an emulsified acid during phase separation vs. time at 120° C., wherein the emulsified acid is prepared at various mixing speeds.
Figure 12:
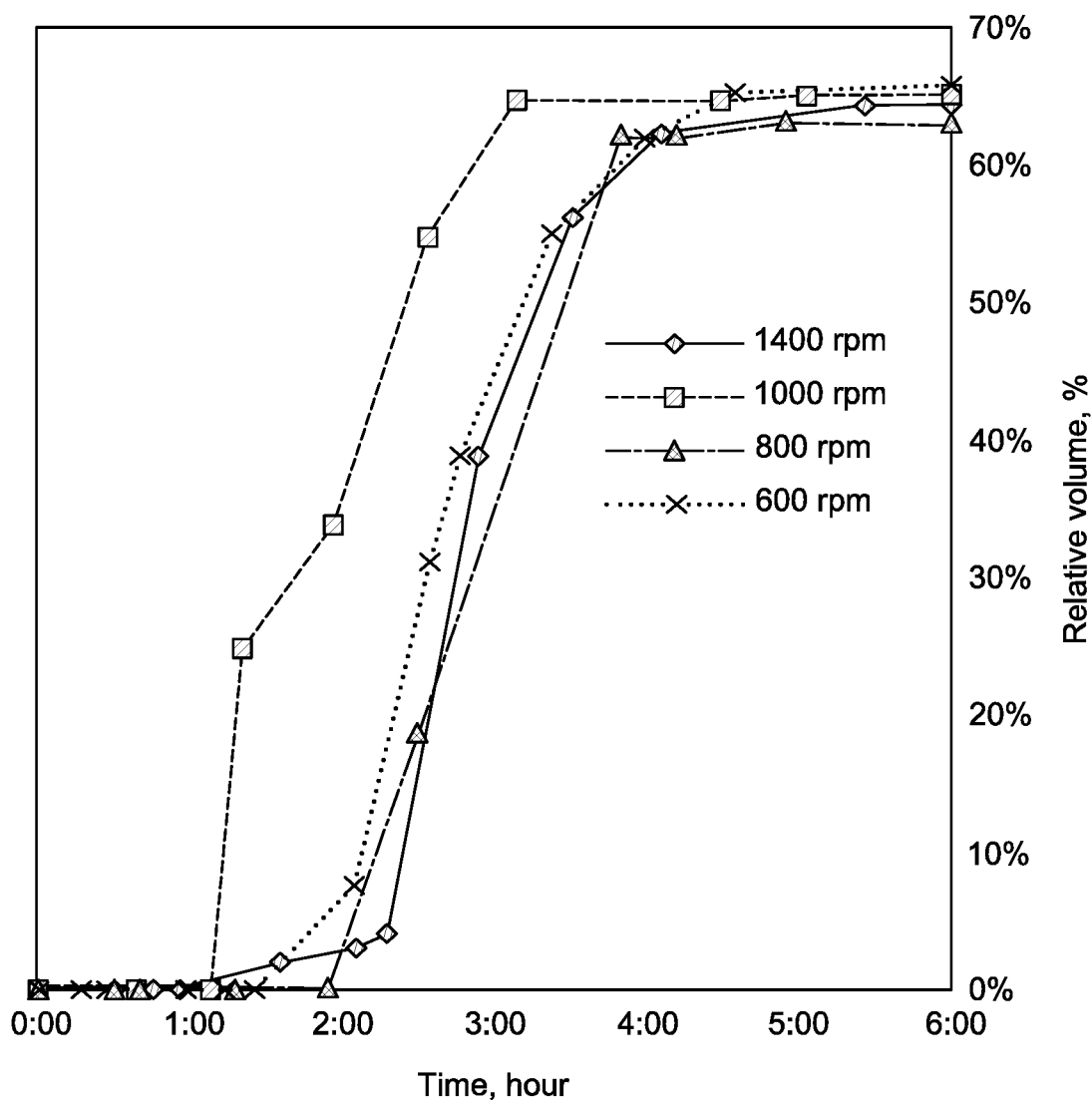
FIG. 12 represents relative volume of an aqueous phase (or water phase) of an emulsified acid during phase separation vs. time at 120° C., wherein the emulsified acid is prepared at various mixing speeds.
Figure 13:
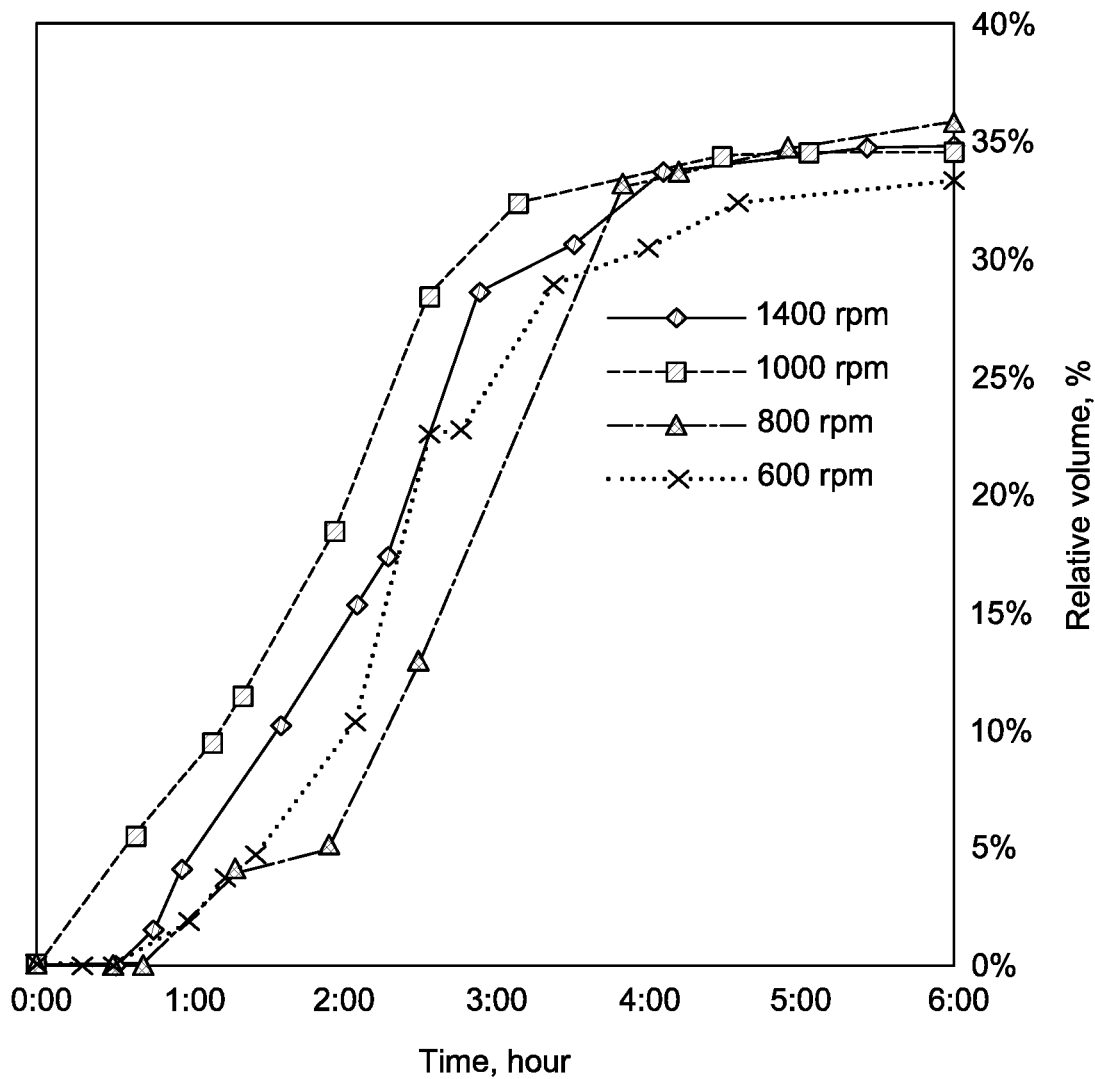
FIG. 13 represents relative volume of an oil phase of an emulsified acid during phase separation vs. time at 120° C., wherein the emulsified acid is prepared at various mixing speeds.

Four emulsions were prepared with the same emulsifier concentration (0.5% by volume) and various mixing speeds (rpm) of 600, 800, 1000 and 1400 rpm. FIG. 11, FIG. 12 and FIG. 13 show the effect of the mixing speed on the stability of the emulsions. Generally, all of the mixing speeds have similar trends except for the 1000 rpm which is the least stable. It is very difficult to pinpoint one speed and say it is a preferred mixing speed since the other three rpm speeds are very close to each other. However, to save energy a mixing speed of around 600 rpm was used.

Example 5—Rheological Properties

Figure 15:
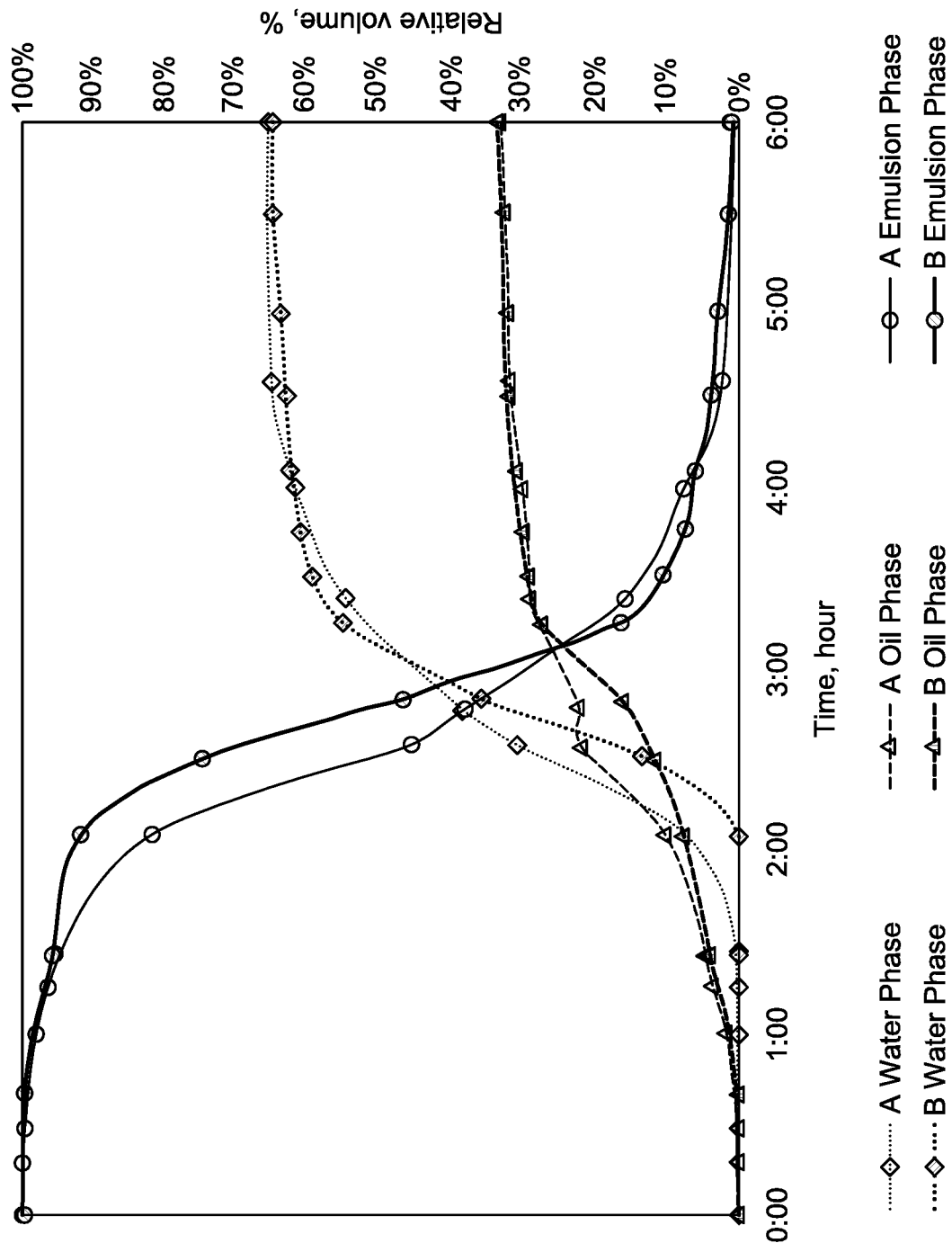
FIG. 15 represents relative volume of an emulsion phase, an aqueous phase (or water phase), and an oil phase of a first and a second emulsified acid during phase separation vs. time at 120° C., wherein the first and the second emulsified acids are prepared with the same methods to examine a reproducibility of data.

After stability tests, rheological properties of the emulsions were measured. In order to conduct the rheological measurements, fresh samples were prepared to reduce aging effects of the results. In addition, a second batch of the emulsions were prepared and tested to evaluate the reproducibility of the measurement. FIG. 15 shows the results of two emulsions that were prepared at different times but at the same conditions (0.5 vol %, 600 rpm and 120° C.) using the same protocol to confirm the reproducibility of the measurement.

To conduct the rheological measurements, a fresh sample of emulsion is prepared at various emulsifier concentrations and various mixing speeds. The emulsifier concentrations were 0.5, 0.7, 1.0 and 1.5 vol %. The effect of changing the emulsifier concentration on apparent viscosity of the emulsion was also studied.

Figure 16:
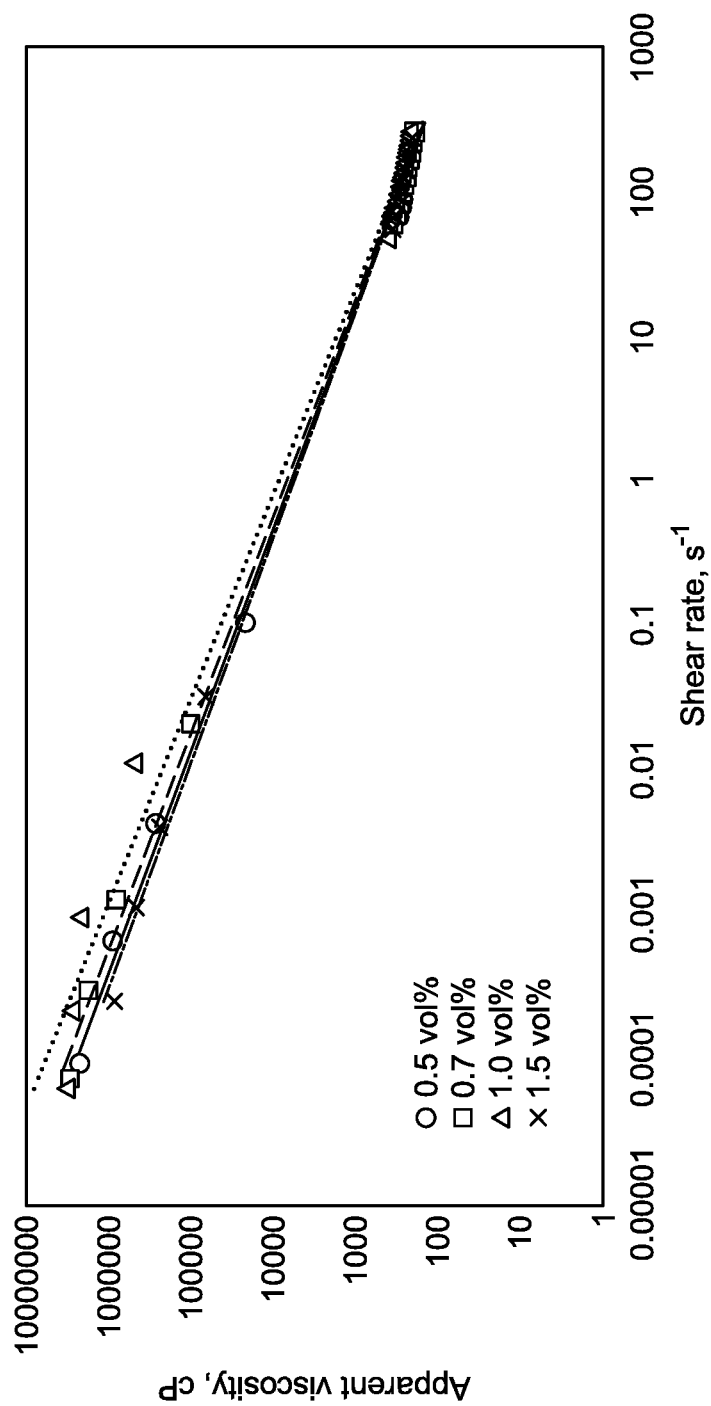
FIG. 16 represents an apparent viscosity of an emulsified acid over a range of shear rates at 25° C., wherein the emulsified acid contains an emulsifier at various concentrations.
Figure 17:
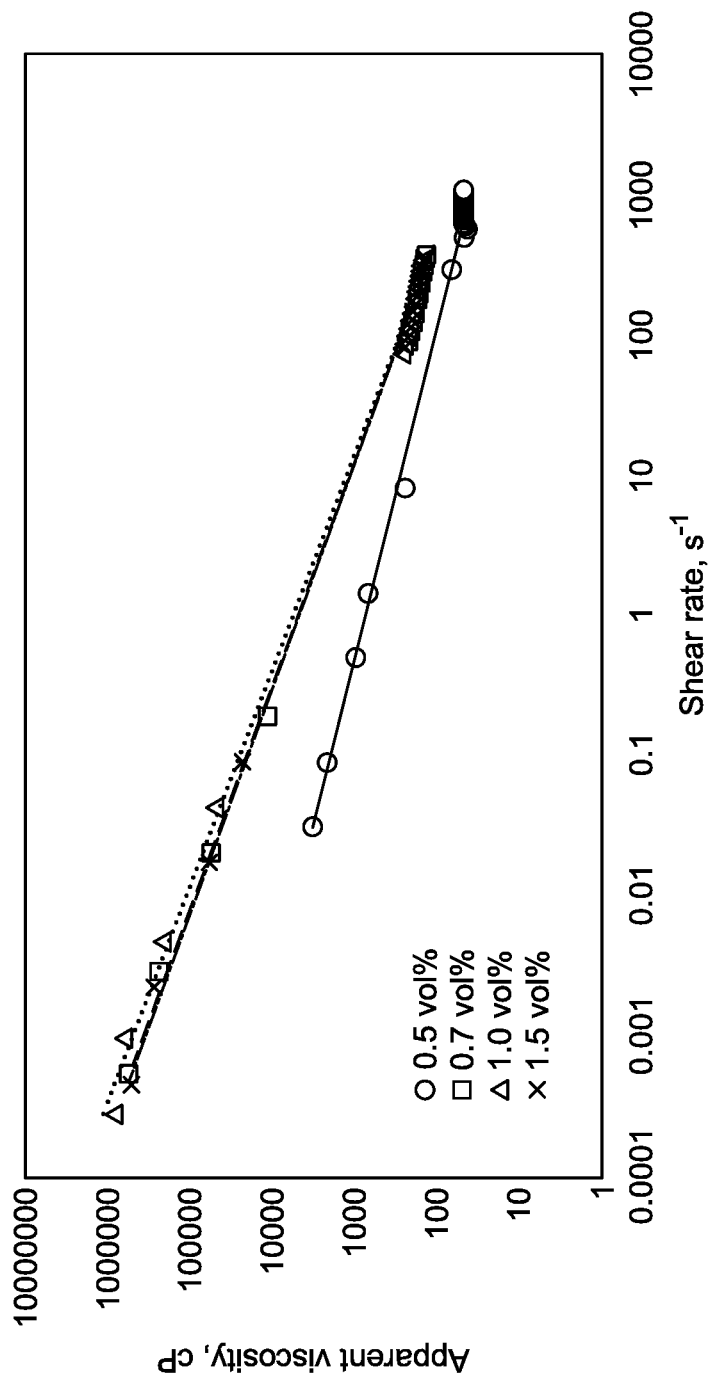
FIG. 17 represents an apparent viscosity of an emulsified acid over a range of shear rates at 40° C., wherein the emulsified acid contains an emulsifier at various concentrations.
Figure 18:
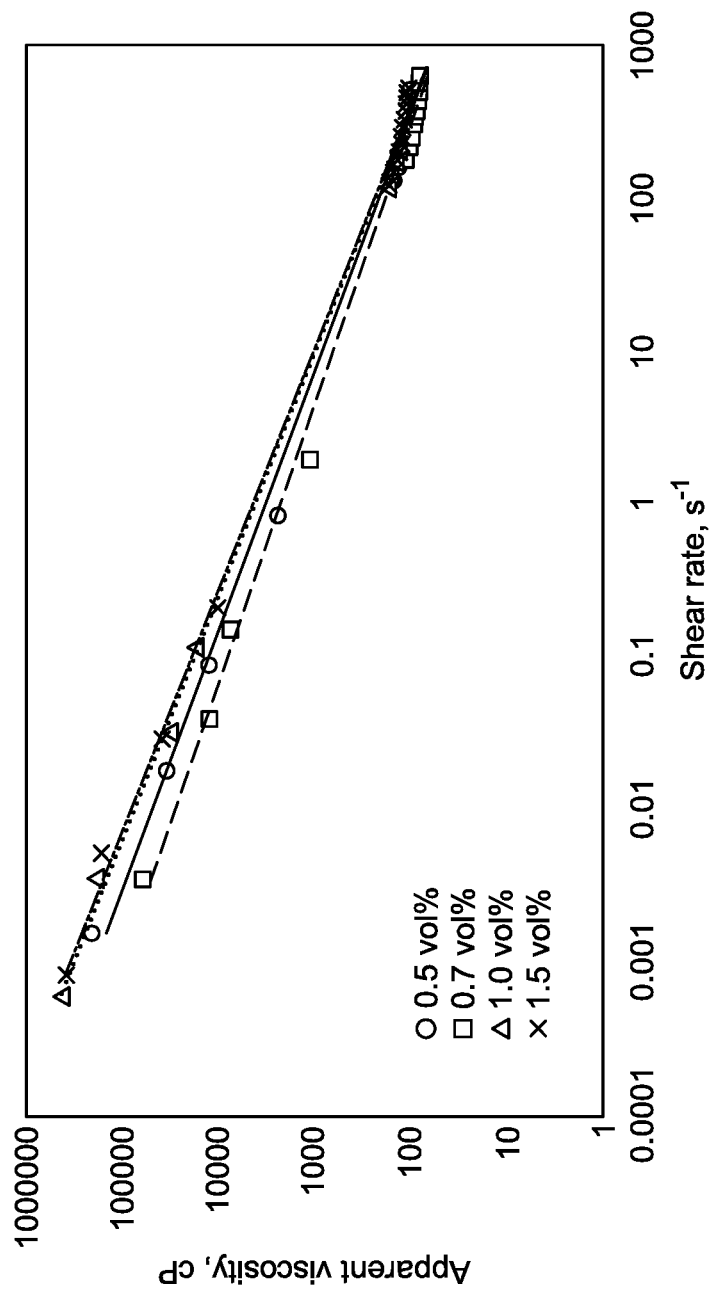
FIG. 18 represents an apparent viscosity of an emulsified acid over a range of shear rates at 60° C., wherein the emulsified acid contains an emulsifier at various concentrations.

FIG. 16, FIG. 17 and FIG. 18 show the effect of the emulsifier concentrations on the apparent viscosity at 25, 40 and 60° C., respectively. The results indicate that the change of emulsifier concentration has no significant effect on the apparent viscosity. The apparent viscosity data are fitted in power-law model and the parameter of the model are presented in Table 2. The results show that the emulsifier concentration is directly related to the power law constant, K, and inversely related to the power law index, n.

TABLE 2

Summary of power-law model for emulsifier concentration for waste oil emulsion

| Temperature ° C. | Emulsifier Concentration vol % | Power Law Constant, K mPa · s$^n$ | Power Law Index, n | Correlating Coefficient, $R^2$ |
|---|---|---|---|---|
| 25 | 0.5 | 6029.3 | 0.344 | 0.998 |
|  | 0.7 | 6699.1 | 0.327 | 0.998 |
|  | 1 | 8476.0 | 0.291 | 0.991 |
|  | 1.5 | 5757.9 | 0.360 | 0.998 |
| 40 | 0.5 | 736.4 | 0.581 | 0.994 |
|  | 0.7 | 4747.7 | 0.366 | 0.998 |
|  | 1 | 5632.4 | 0.347 | 0.998 |
|  | 1.5 | 4795.6 | 0.372 | 0.998 |
| 60 | 0.5 | 3287.7 | 0.408 | 0.995 |
|  | 0.7 | 2304.7 | 0.451 | 0.995 |
|  | 1 | 4241.8 | 0.368 | 0.998 |
|  | 1.5 | 4351.5 | 0.360 | 0.998 |

Figure 28:
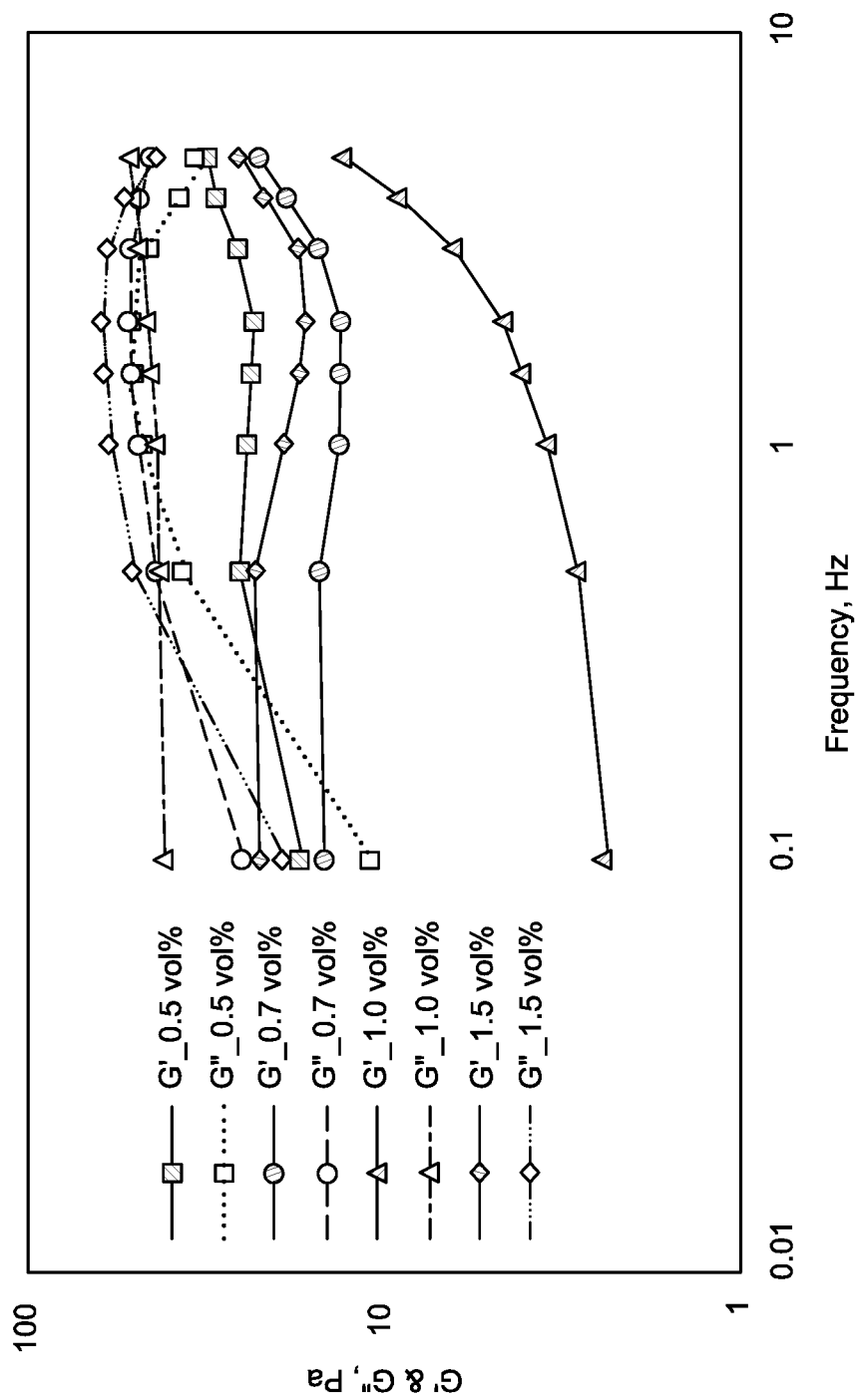
FIG. 28 represents shear storage and shear loss modulus curves of an emulsified acid at 25° C., wherein the emulsified acid contains an emulsifier at various concentrations.
Figure 29:
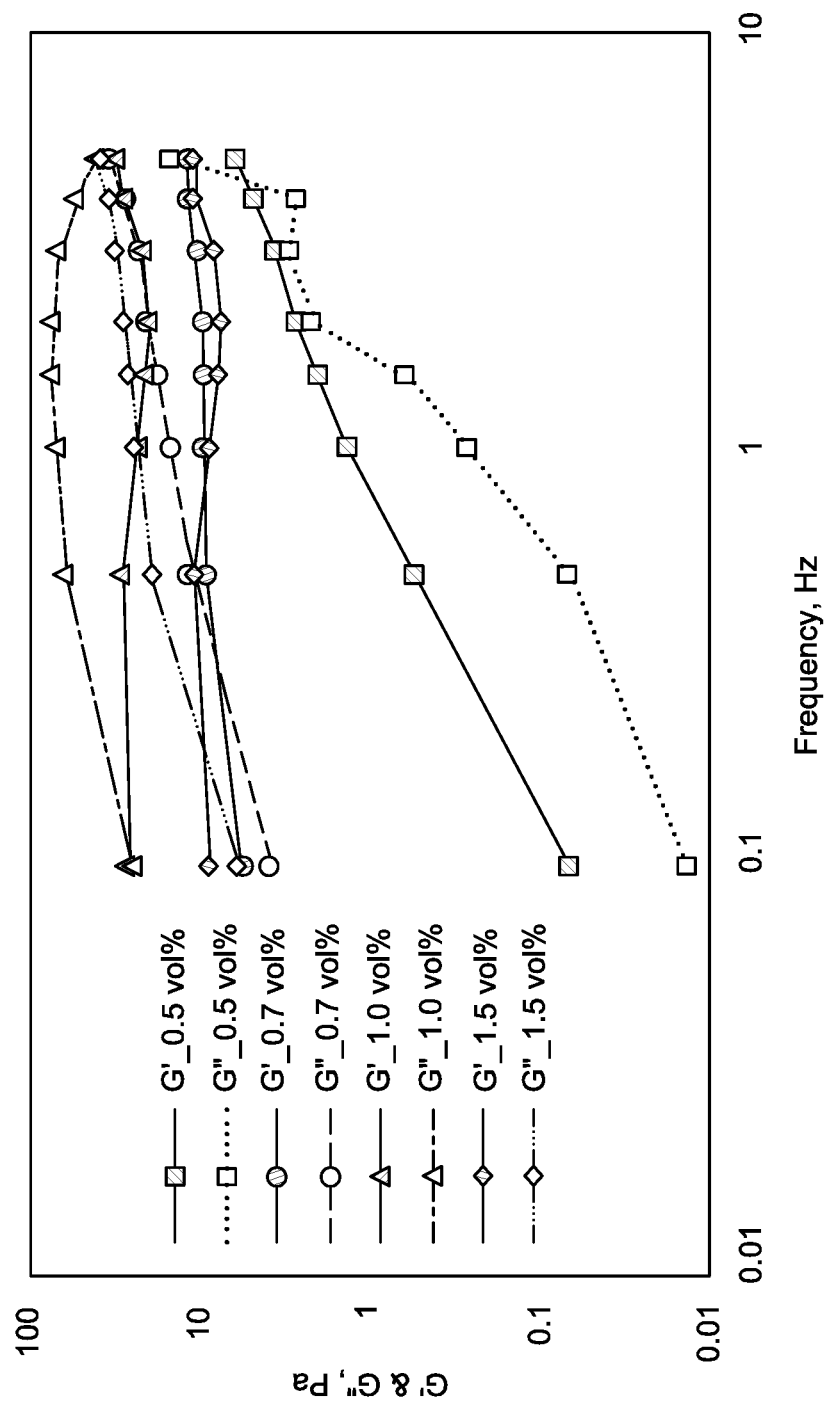
FIG. 29 represents shear storage and shear loss modulus curves of an emulsified acid at 40° C., wherein the emulsified acid contains an emulsifier at various concentrations.
Figure 30:
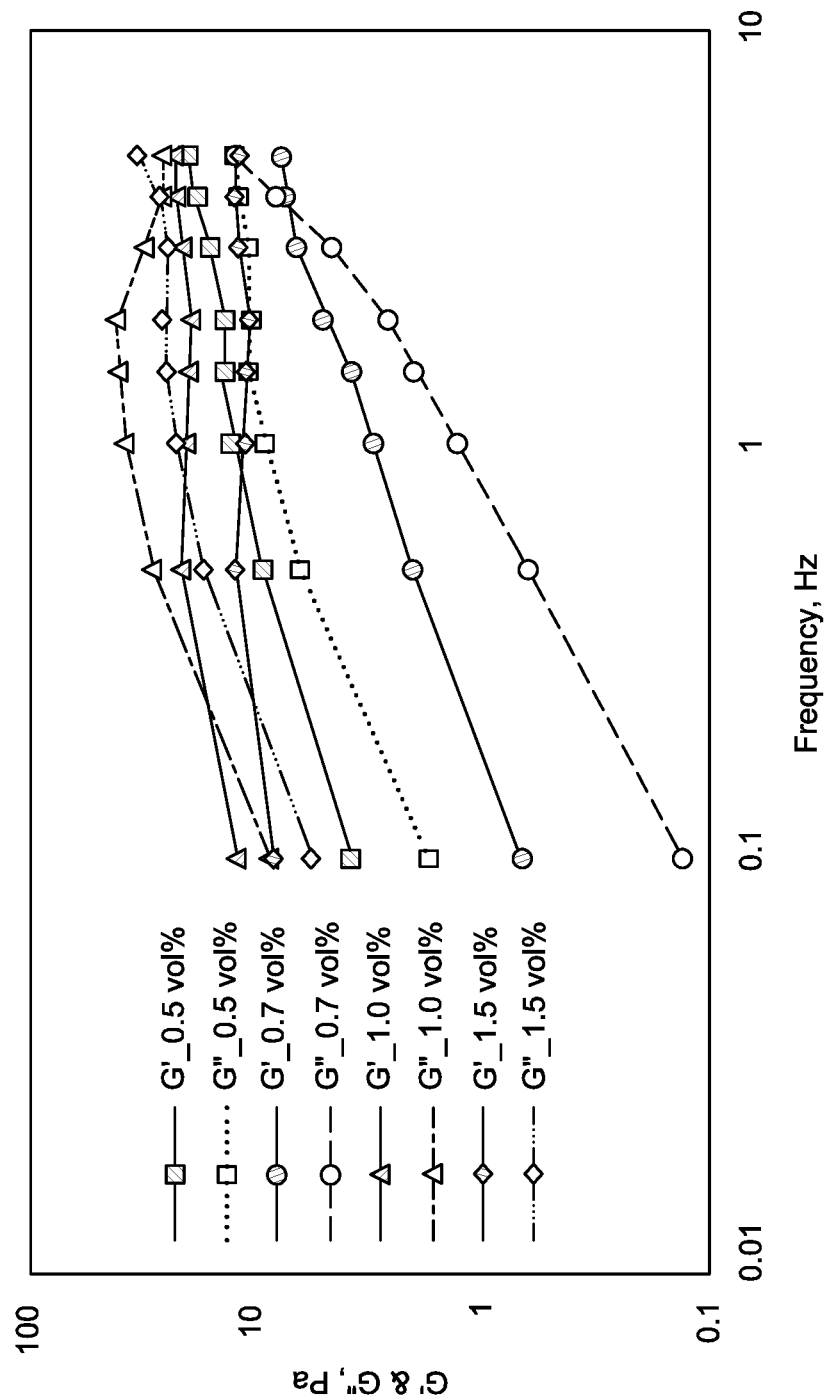
FIG. 30 represents shear storage and shear loss modulus curves of an emulsified acid at 60° C., wherein the emulsified acid contains an emulsifier at various concentrations.

Furthermore, the effect of these concentrations on viscoelastic properties was studied. FIG. 28, FIG. 29 and FIG. 30 depict the shear storage modulus G' and shear loss modulus G" in a frequency sweep for different emulsifier concentrations. At 25° C. (FIG. 28), the emulsifier concentration of 0.5 vol % behaves elastically at low frequency, but at a frequency of 0.25 Hz, the viscous modulus G" crosses over the elastic modulus G' indicating the presence of a viscous behavior. In contrast, 0.7, 1 and 1.5 vol % of emulsifier concentration result in no crossover point and G" is always dominant. At 40° C. (FIG. 29), G' is higher at low frequencies, for emulsions containing 0.7, 1 and 1.5 vol % of emulsifier. Furthermore, at 60° C. (FIG. 30), 0.5 vol % behaves as a solid-like material over the entire frequency range. Also, 0.7 vol % behaves as a solid material over a wide range of frequency, a sudden rise in G" takes place reflecting the dominance of the viscous-like material. However, G' and G" of emulsions containing 1.0 and 1.5 vol % behave similarly similar to that of 40° C.

Figure 19:
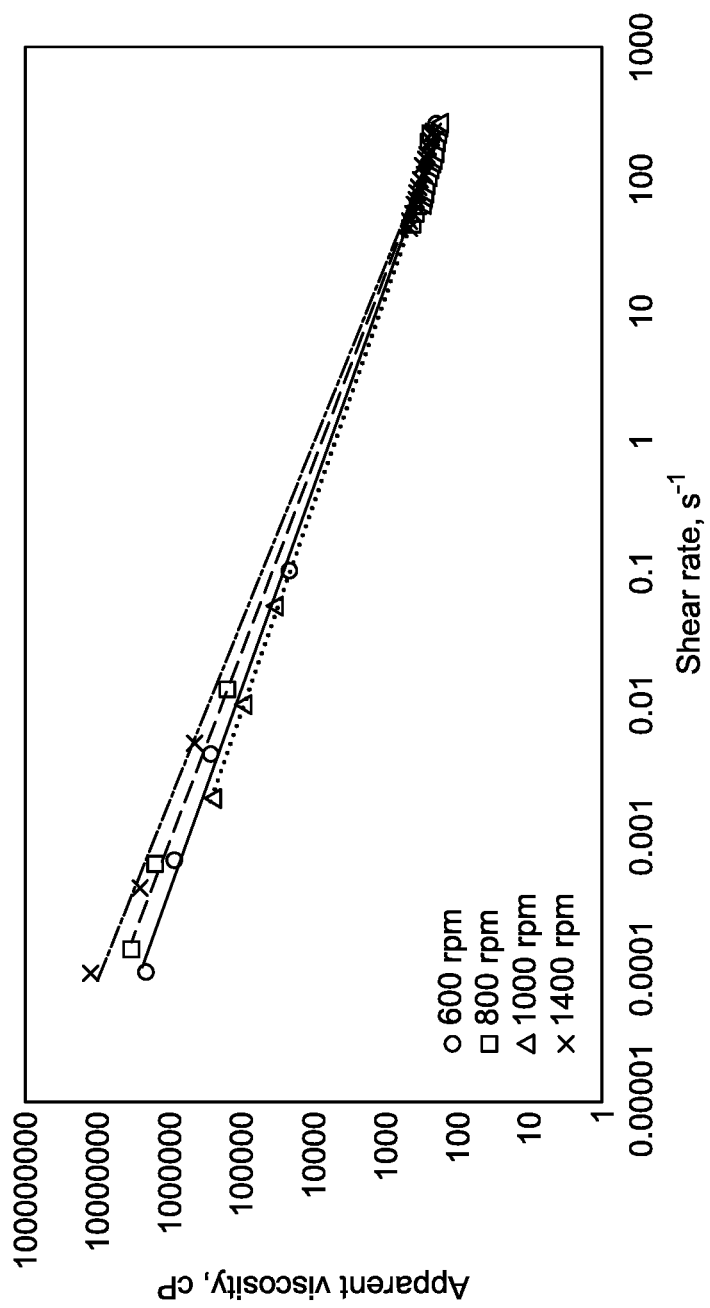
FIG. 19 represents an apparent viscosity of an emulsified acid over a range of shear rates at 25° C., wherein the emulsified acid is prepared at various mixing speeds.
Figure 20:
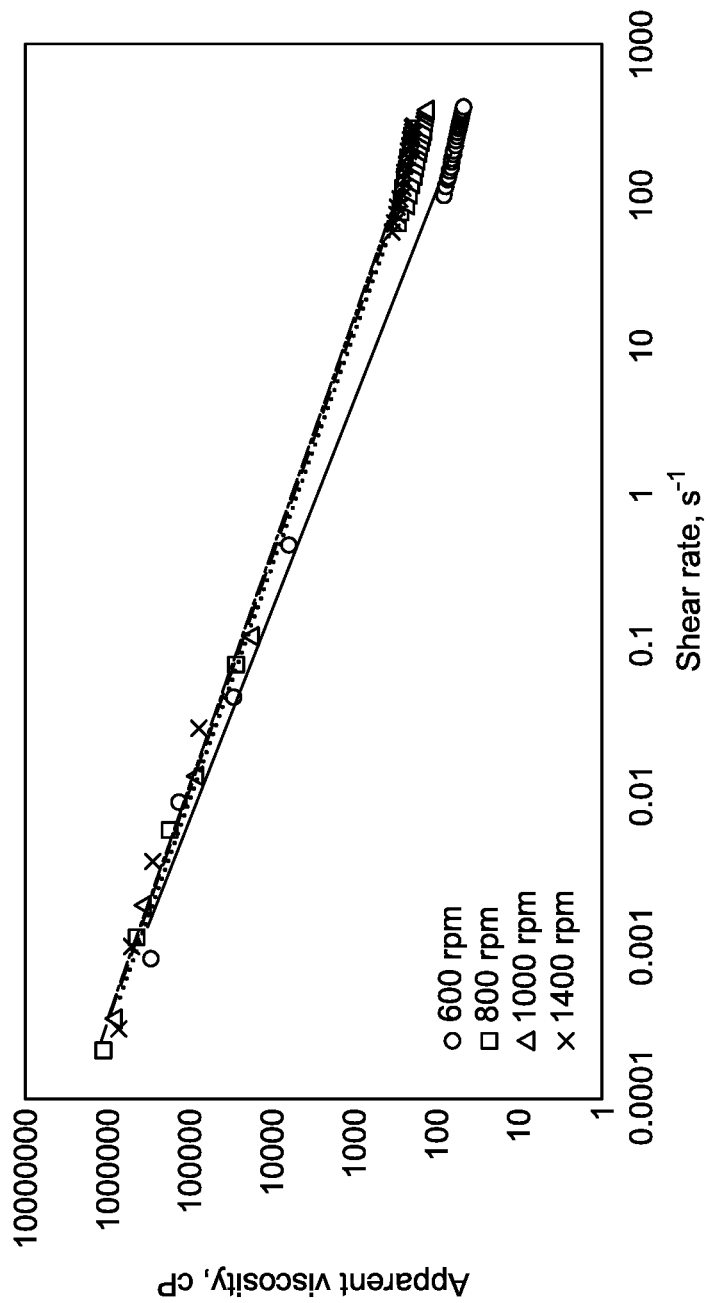
FIG. 20 represents an apparent viscosity of an emulsified acid over a range of shear rates at 40° C., wherein the emulsified acid is prepared at various mixing speeds.
Figure 21:
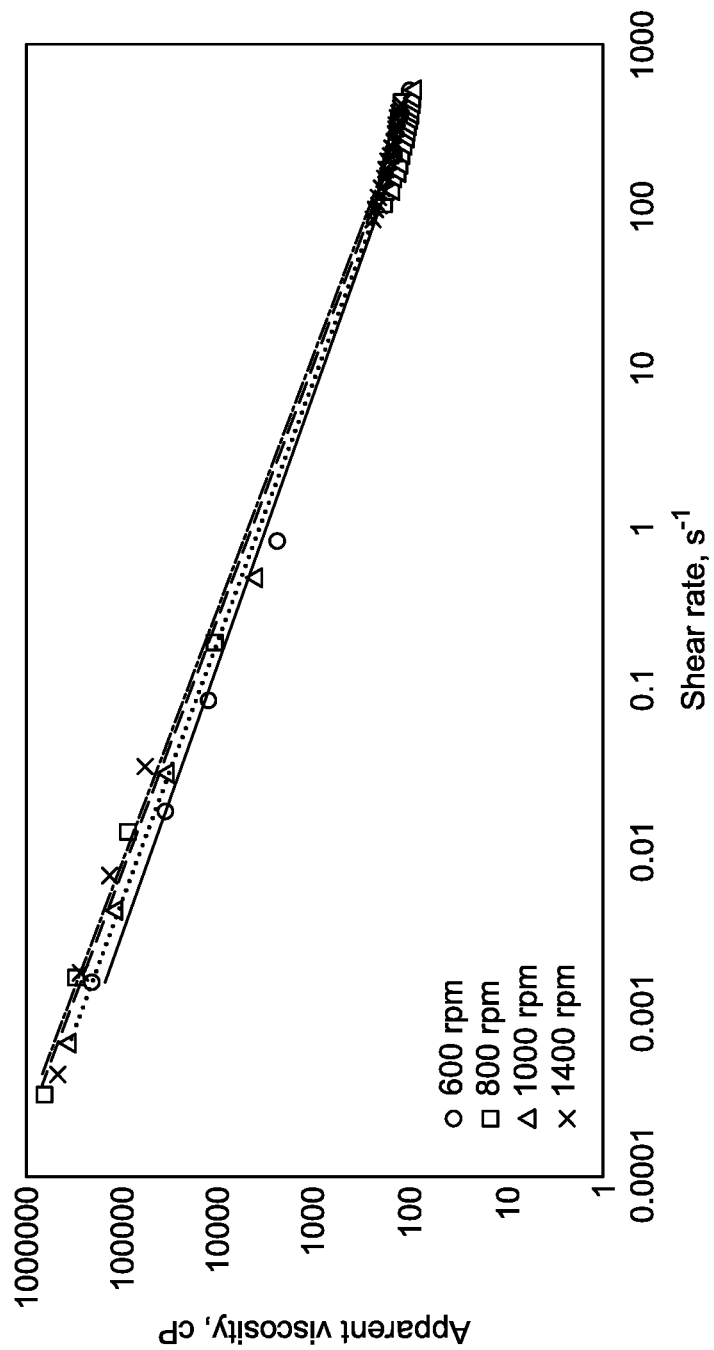
FIG. 21 represents an apparent viscosity of an emulsified acid over a range of shear rates at 60° C., wherein the emulsified acid is prepared at various mixing speeds.

The effect of mixing speed on the apparent viscosity is shown in FIG. 19, FIG. 20, and FIG. 21. From these figures, the mixing speed has no significant effect on the apparent viscosity for all temperature ranges used in this study. The power-law model data, as shown in Table 3, indicates that there is no clear trend for mixing speed with power-law model parameters. This is in agreement with the results from diesel-based emulsions.

TABLE 3

Summary of power-law model for mixing speed for waste oil emulsion

| Temperature °C | Mixing Speed rpm | Power Law Constant, K mPa · s$^n$ | Power Law Index, n | Correlating Coefficient, R$^2$ |
|---|---|---|---|---|
| 25 | 600 | 6029.3 | 0.344 | 0.998 |
|  | 800 | 7930.9 | 0.304 | 0.998 |
|  | 1000 | 5201.8 | 0.372 | 0.998 |
|  | 1400 | 9765.9 | 0.262 | 0.998 |
| 40 | 600 | 2864.0 | 0.286 | 0.995 |
|  | 800 | 5402.7 | 0.364 | 0.998 |
|  | 1000 | 5071.9 | 0.358 | 0.998 |
|  | 1400 | 5675.2 | 0.359 | 0.997 |
| 60 | 600 | 3287.7 | 0.408 | 0.995 |
|  | 800 | 4502.4 | 0.367 | 0.998 |
|  | 1000 | 3801.8 | 0.381 | 0.998 |
|  | 1400 | 4858.5 | 0.366 | 0.997 |

Figure 31:
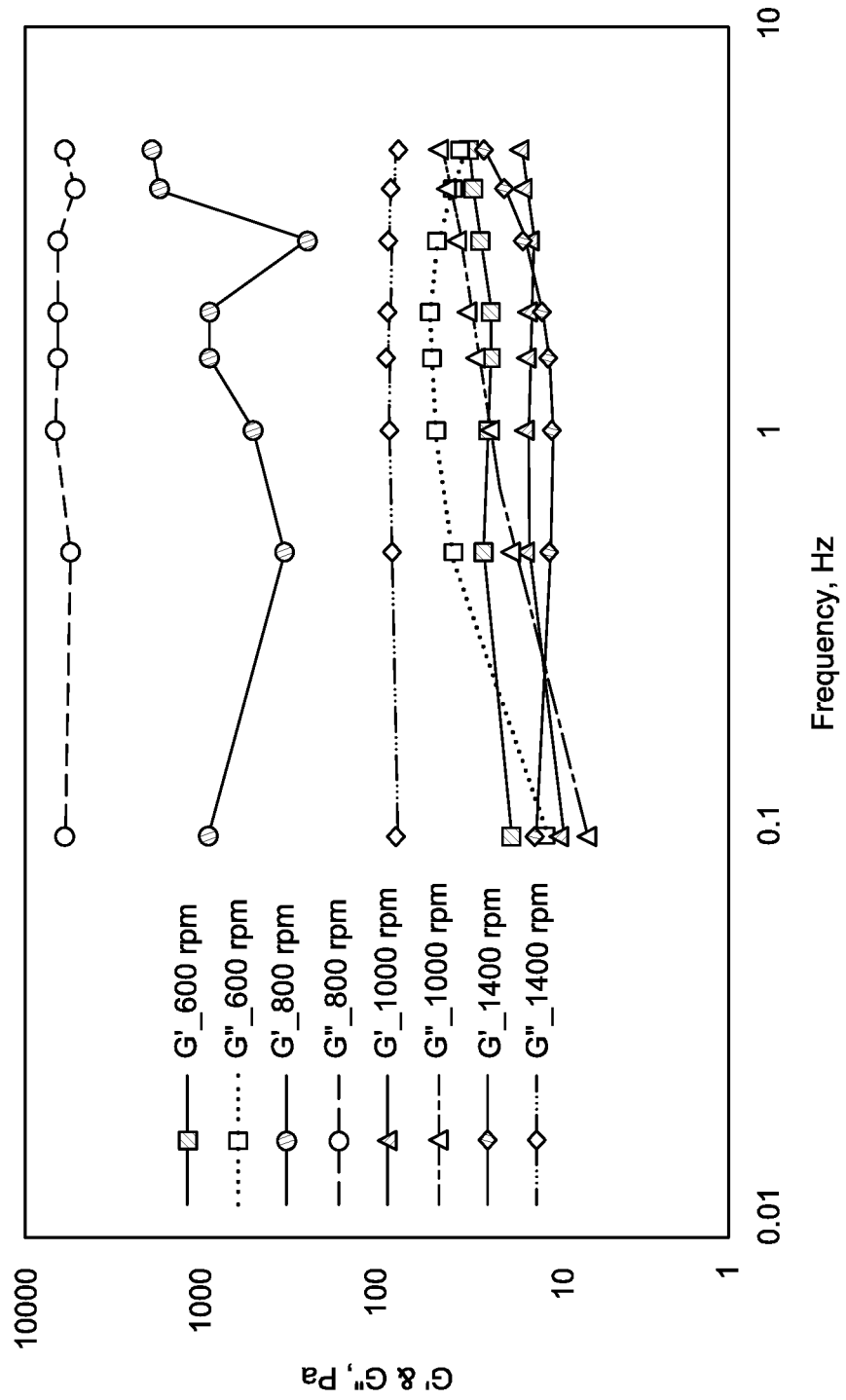
FIG. 31 represents shear storage and shear loss modulus curves of an emulsified acid at 25° C., wherein the emulsified acid is prepared at various mixing speeds.
Figure 32:
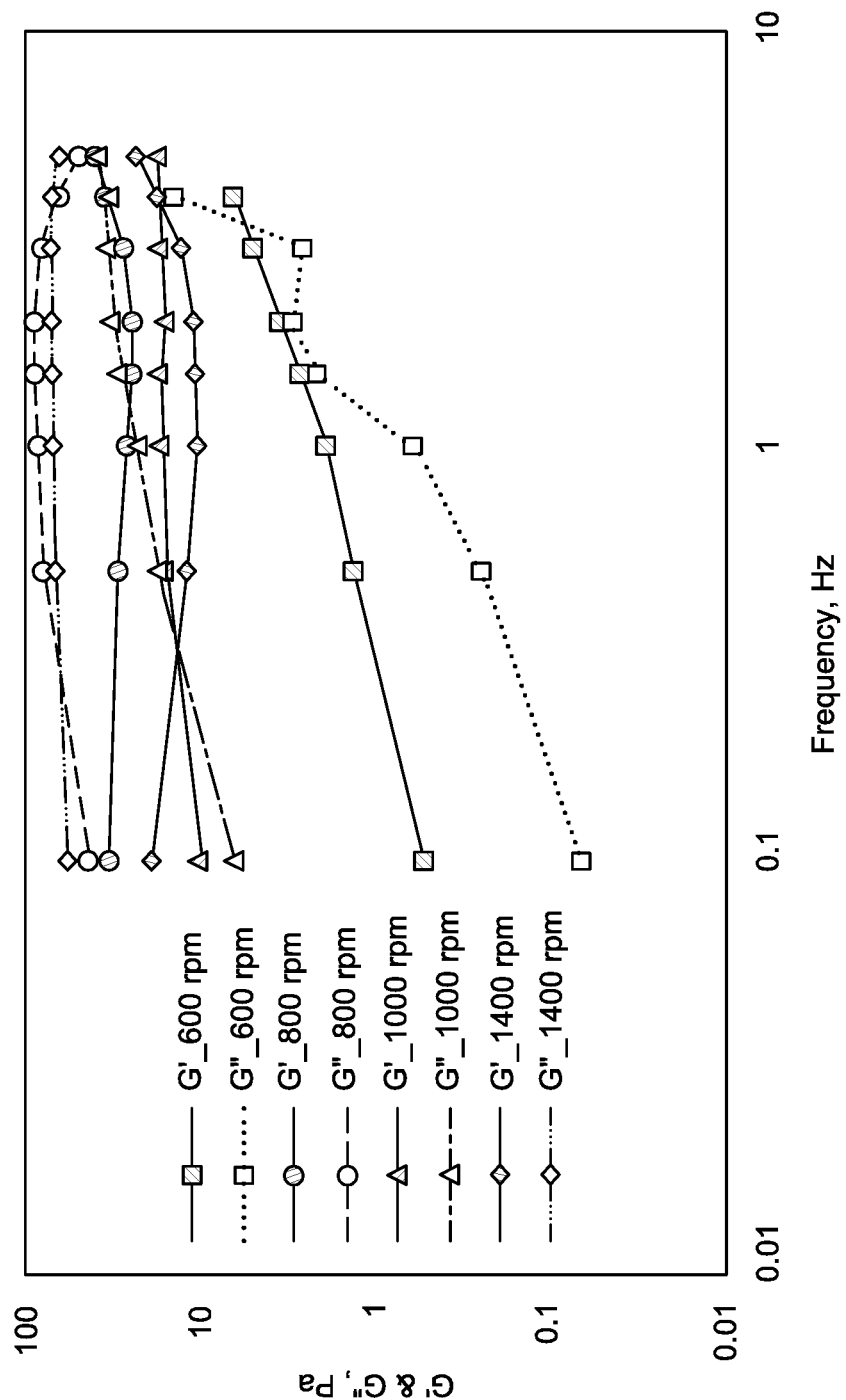
FIG. 32 represents shear storage and shear loss modulus curves of an emulsified acid at 40° C., wherein the emulsified acid is prepared at various mixing speeds.
Figure 33:
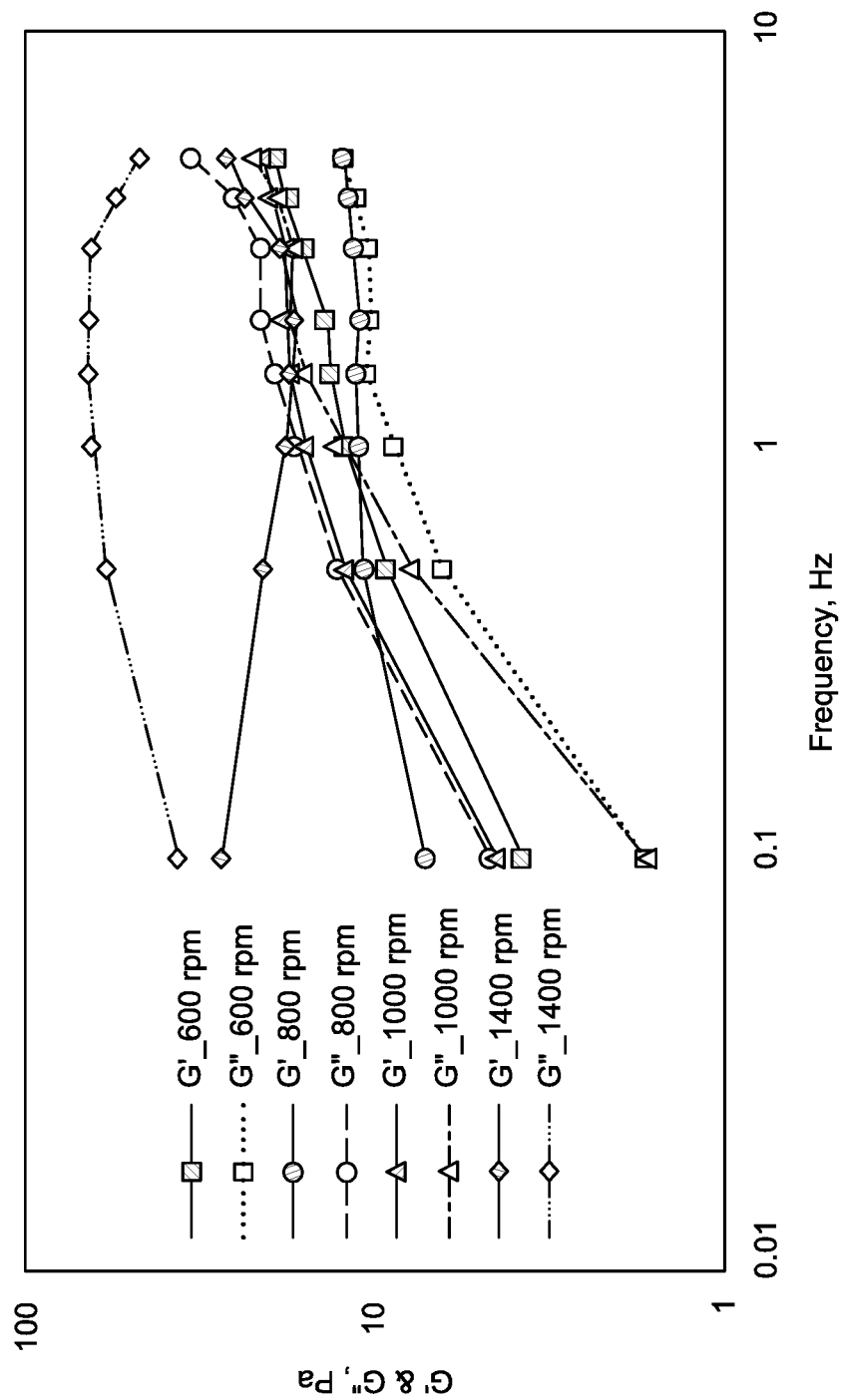
FIG. 33 represents shear storage and shear loss modulus curves of an emulsified acid at 60° C., wherein the emulsified acid is prepared at various mixing speeds.

Moreover, the effect of mixing speed on the viscoelastic properties is shown in FIG. 31, FIG. 32, and FIG. 33 at temperatures of 25, 40 and 60° C., respectively. At 25° C. (FIG. 31), the viscous modulus is always higher at all mixing speeds. Although, at low frequencies the elastic modulus is found to be higher and a crossover occurs in the emulsions prepared with mixing speeds of 600 and 1000 rpm. The same scenario holds for the 1000 rpm when the temperature is raised to 40° C. (FIG. 32). Furthermore, FIG. 32 indicates that the 800 and 1400 speeds continue to show the same behavior regardless of the temperature. However, when the emulsions heated to 60° C. (FIG. 33), no crossover was observed except in the emulsion that was prepared at a mixing speed of 800 rpm.

Figure 22:
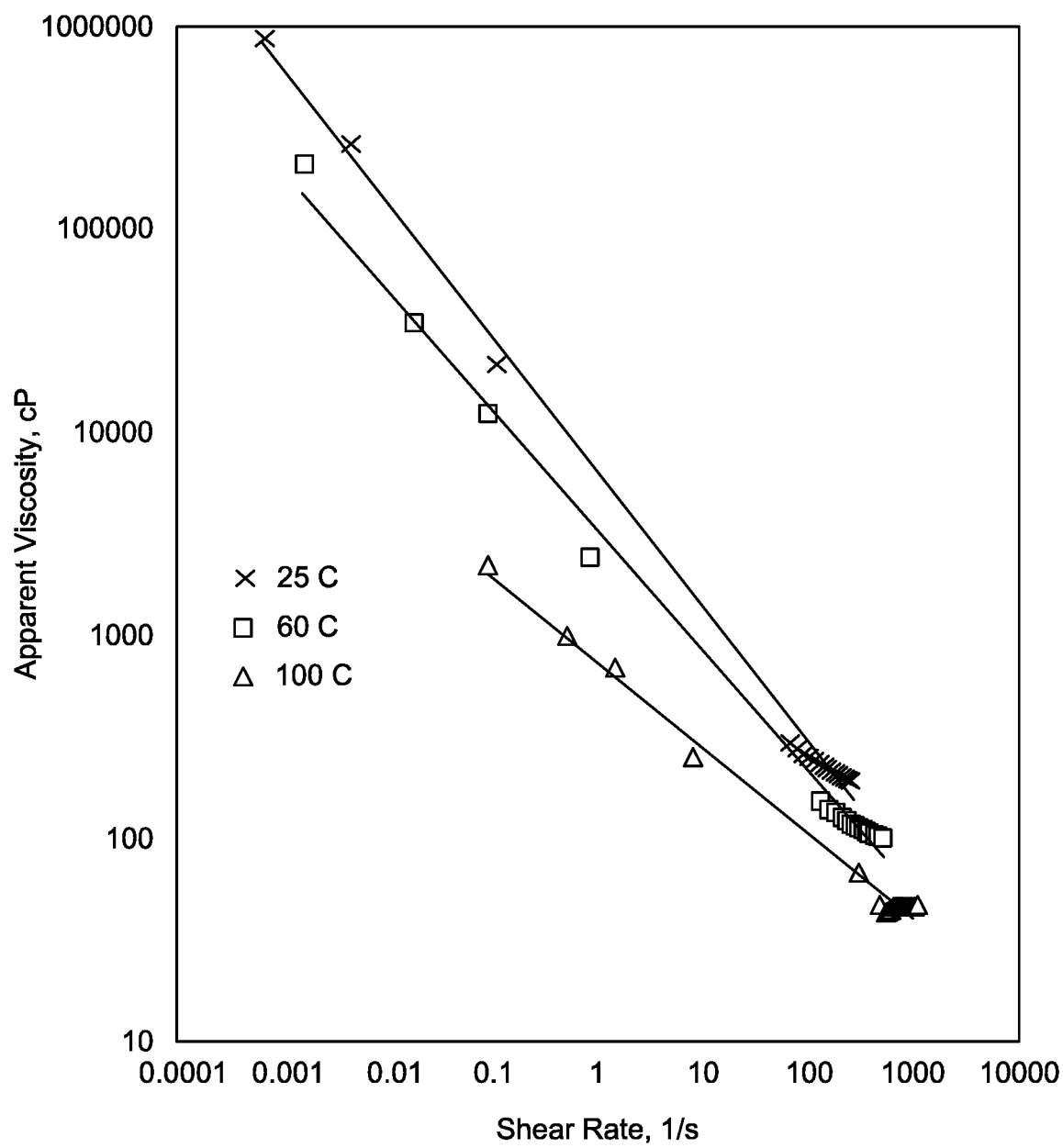
FIG. 22 represents an apparent viscosity of an emulsified acid over a range of shear rates at various temperatures.
Figure 27:
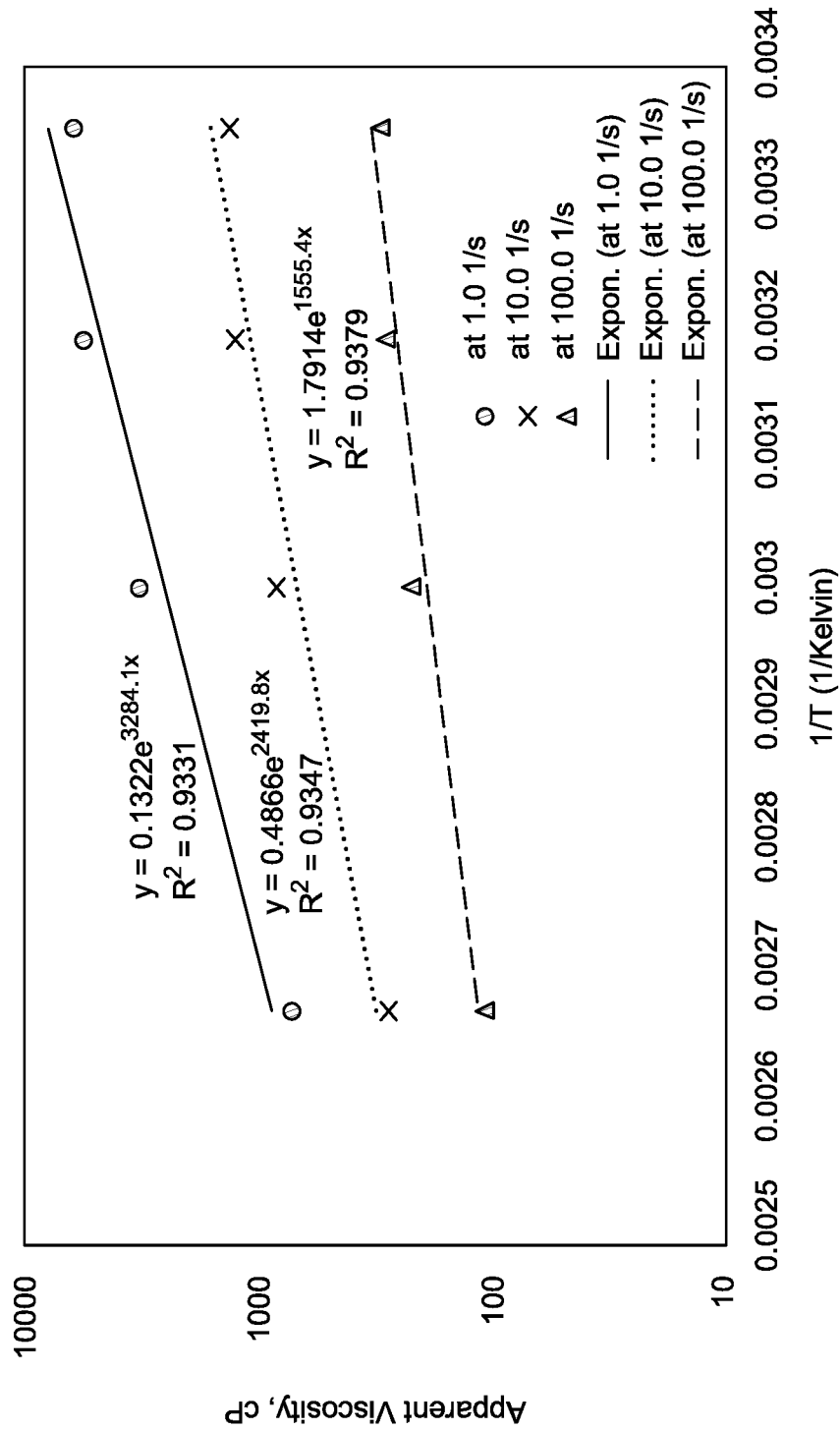
FIG. 27 represents an apparent viscosity of an emulsified acid vs. a reciprocal of temperature, at various shear rates.
Figure 34:
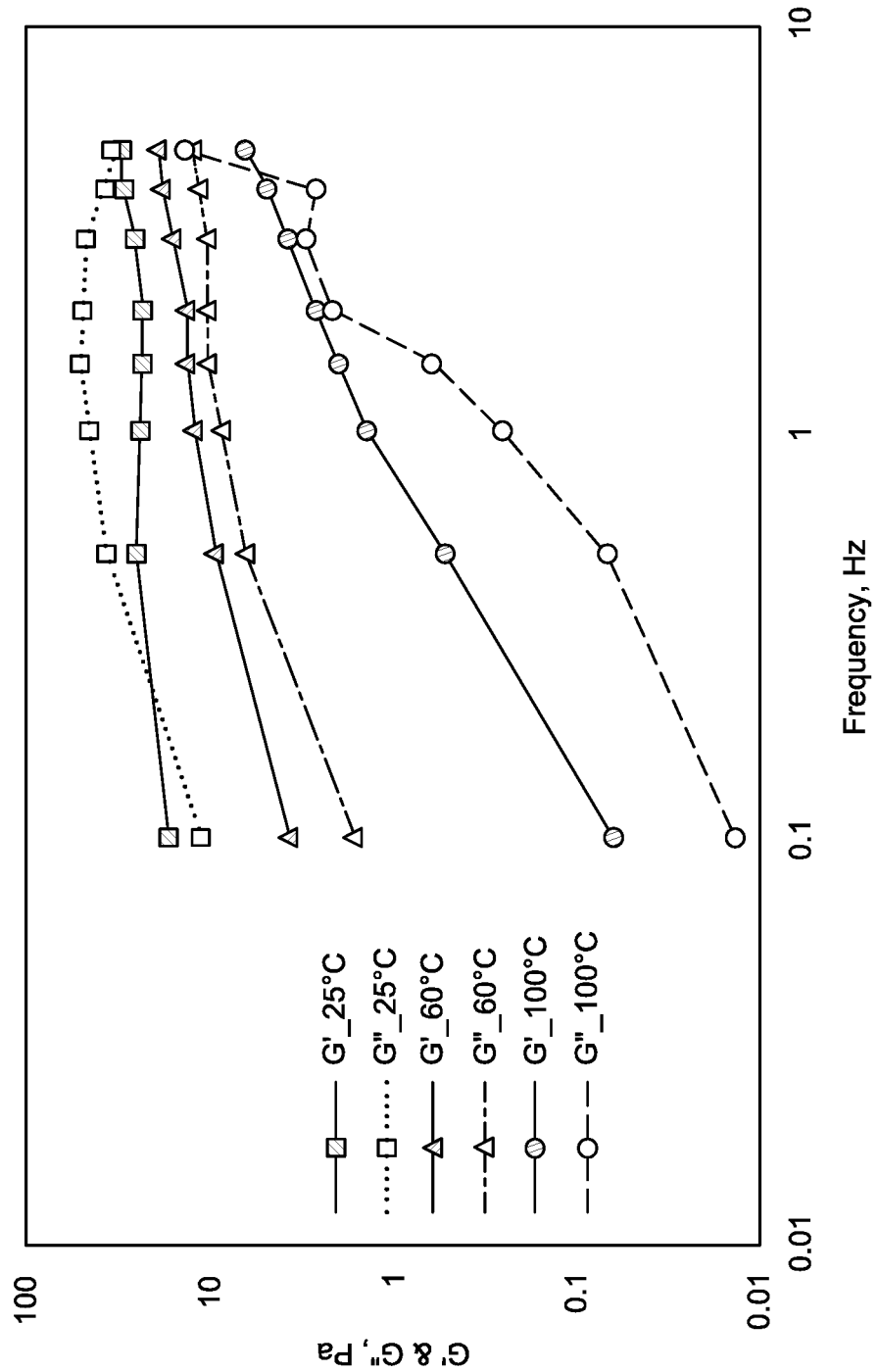
FIG. 34 represents shear storage and shear loss modulus curves of an emulsified acid at various temperatures.

In certain aspects, the temperatures of the emulsions were increased from 25° C. to 100° C. to study the rheological behavior of the emulsions with respect to temperature. FIG. 22 and FIG. 34 show the rheological properties at different temperatures. FIG. 22 indicates that an increase in temperature results in a decrease in the apparent viscosity. FIG. 34 shows that at low temperatures, G" is dominant but increasing the temperature makes G' dominant. Table 4 shows the parameters of the power-law model indicating that increasing the temperature results in decreasing K and in increasing n, hence decreasing the apparent viscosity. In addition, FIG. 27 shows the apparent viscosity plotted on semi-log graph as a function of temperature and the data are fitted to the Arrhenius equation.

TABLE 4

Summary of power-law model for temperature effect for waste oil emulsion

| Temperature °C | Power Law Constant, K mPa · s$^n$ | Power Law Index, n | Correlating Coefficient, R$^2$ |
|---|---|---|---|
| 25 | 6233.6 | 0.337 | 0.997 |
| 60 | 3287.7 | 0.408 | 0.995 |
| 100 | 735.6 | 0.581 | 0.991 |

Two different samples were prepared freshly and then are aged for different time periods. The rheological behavior of the two samples was investigated when the samples made fresh, when they are aged. All samples were aged at room temperature. Then, rheological tests were conducted at 25, 40 and 60° C.

Figure 23:
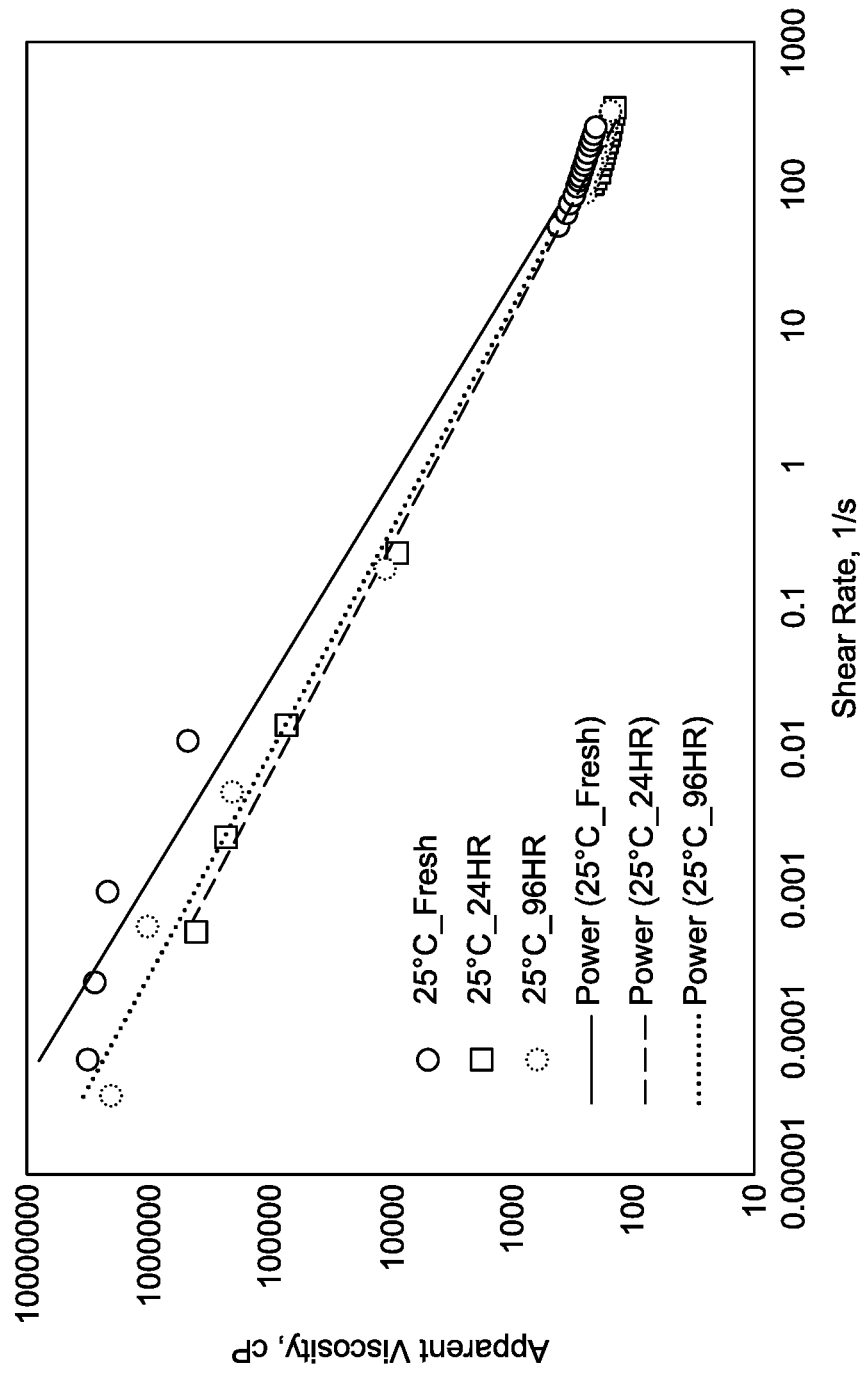
FIG. 23 represents an apparent viscosity of an emulsified acid over a range of shear rates at 25° C., wherein the emulsified acid is aged at 25° C. for 0, 24, and 96 hours.
Figure 24:
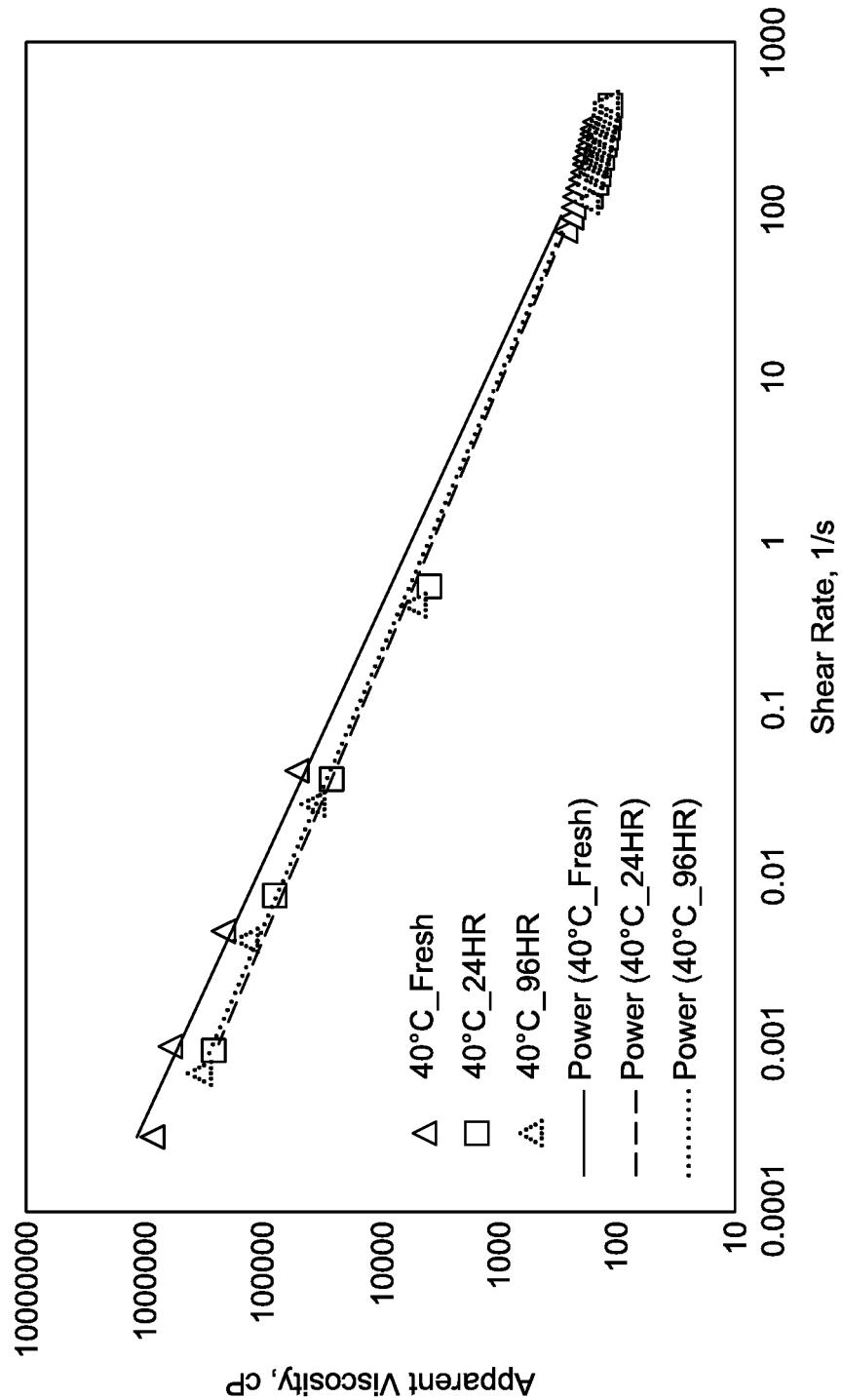
FIG. 24 represents an apparent viscosity of an emulsified acid over a range of shear rates at 40° C., wherein the emulsified acid is aged at 40° C. for 0, 24, and 96 hours.
Figure 25:
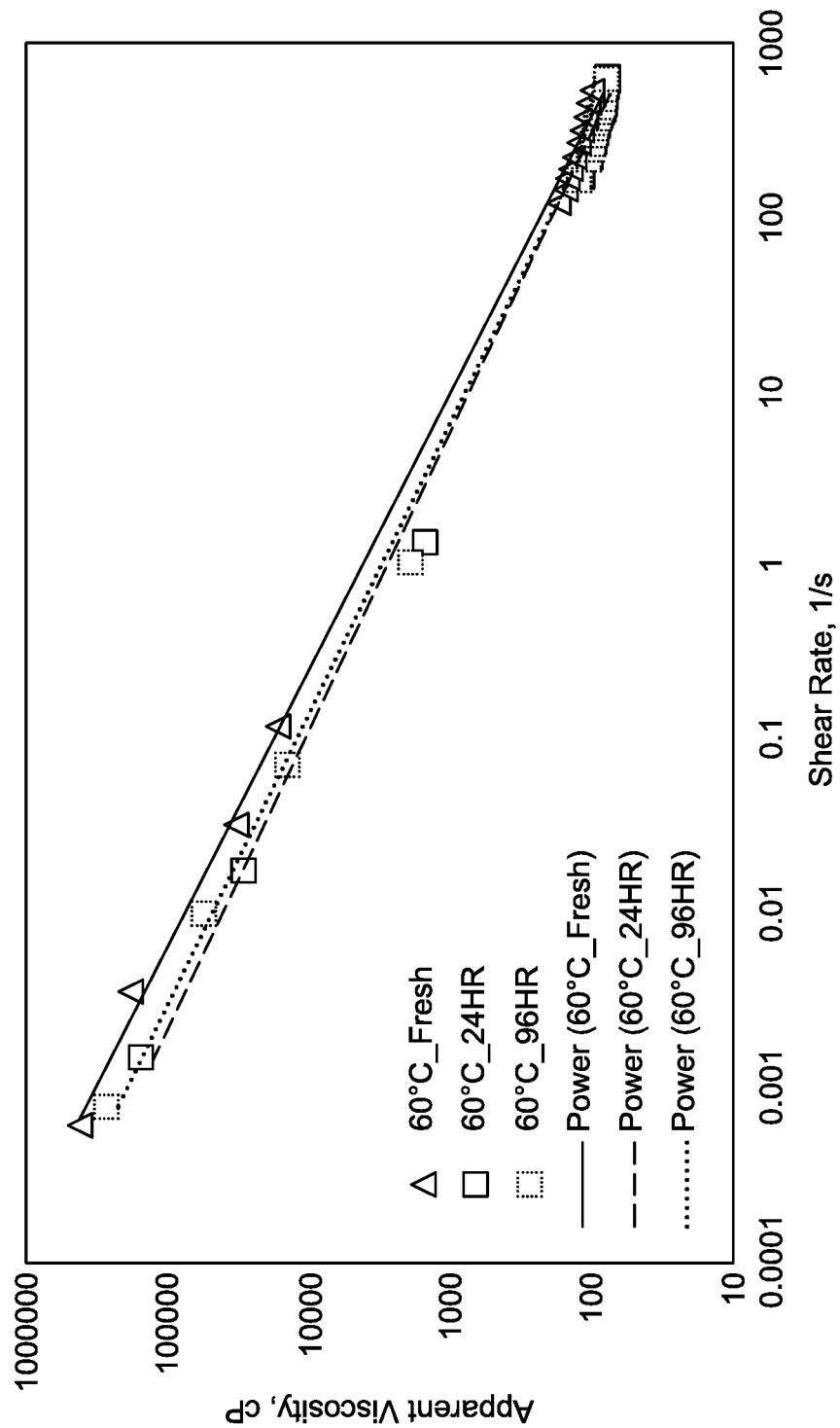
FIG. 25 represents an apparent viscosity of an emulsified acid over a range of shear rates at 60° C., wherein the emulsified acid is aged at 60° C. for 0, 24, and 96 hours.
Figure 35:
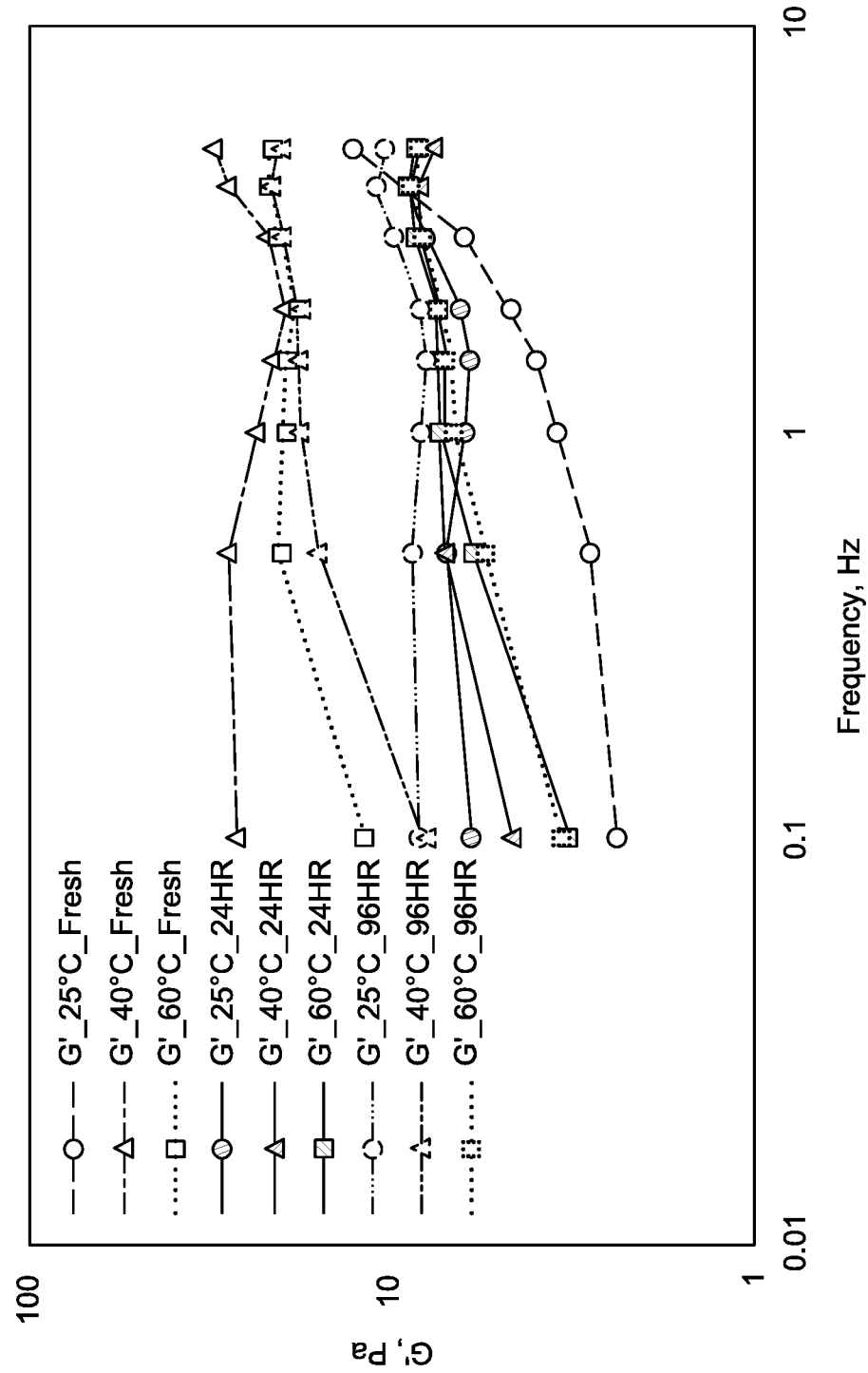
FIG. 35 represents shear storage modulus curves of an emulsified acid at 25° C., 40° C., and 60° C., wherein the emulsified acid is aged at 25° C., 40° C., and 60° C. for 0, 24, and 96 hours.
Figure 36:
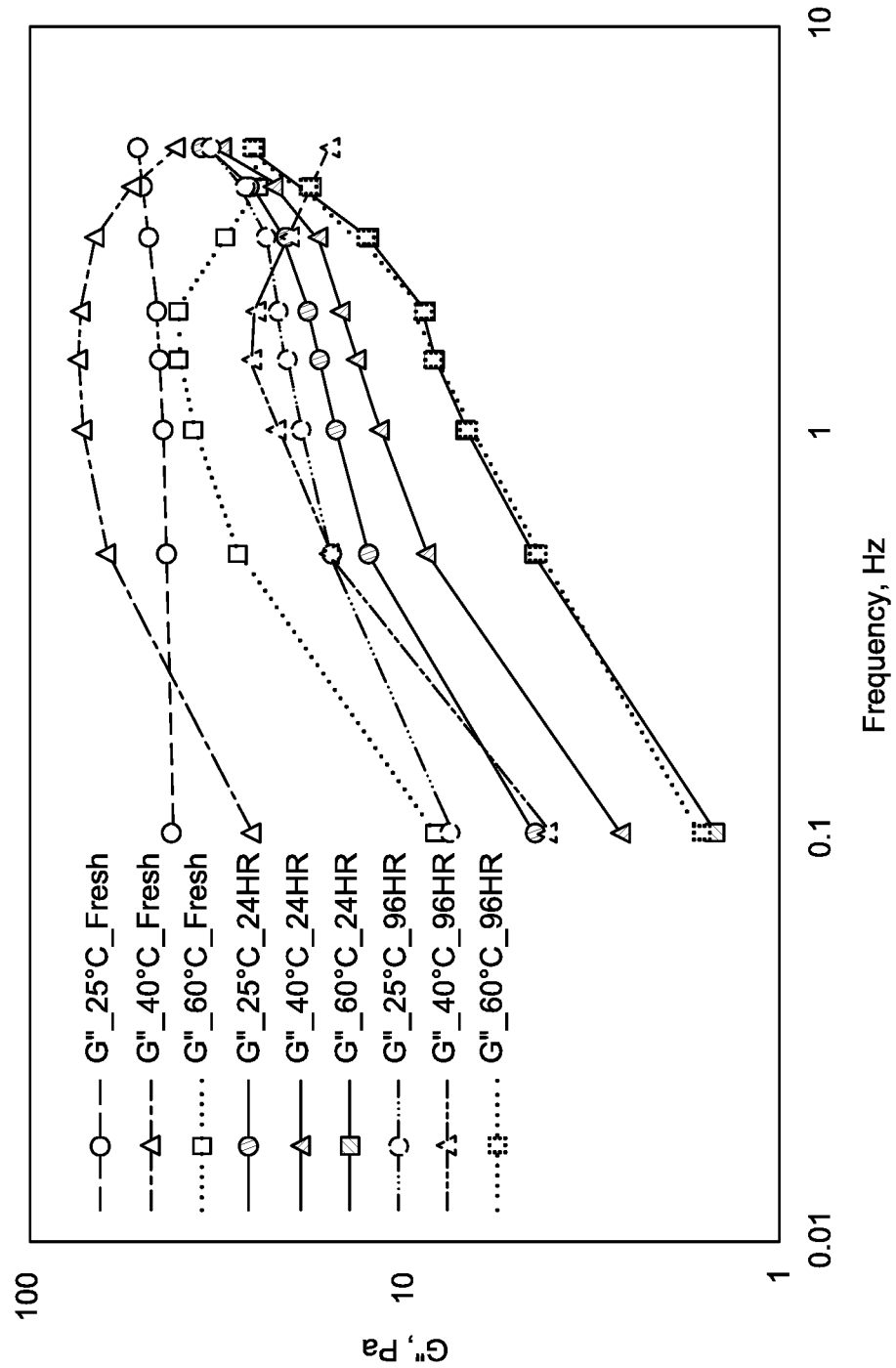
FIG. 36 represents shear loss modulus curves of an emulsified acid at 25° C., 40° C., and 60° C., wherein the emulsified acid is aged at 25° C., 40° C., and 60° C. for 0, 24, and 96 hours.

In one aspect, the samples were aged for 24 and 96 hours. FIG. 23, FIG. 24 and FIG. 25 indicate that aging the emulsion decreased the apparent viscosity. Also, FIG. 35 and FIG. 36 indicate that G' tends to increase with aging at 25° C. On the other hand, for tests done at 40° C. and 60° C., G' tends to decrease. The parameters of a power-law model are shown in Table 5.

TABLE 5

Summary of power-law model for effect of aging for waste oil emulsion

| Temperature °C | Aged time at room temperature hour | Power Law Constant, K mPa · s$^n$ | Power Law Index, n | Correlating Coefficient, R$^2$ |
|---|---|---|---|---|
| 25 | 0 | 8476.0 | 0.291 | 0.991 |
|  | 24 | 4500.0 | 0.380 | 0.997 |
|  | 96 | 5082.5 | 0.363 | 0.994 |
| 40 | 0 | 5632.4 | 0.347 | 0.998 |
|  | 24 | 3718.1 | 0.397 | 0.997 |
|  | 96 | 3917.1 | 0.390 | 0.997 |
| 60 | 0 | 4241.8 | 0.368 | 0.998 |
|  | 24 | 2837.5 | 0.416 | 0.995 |
|  | 96 | 3137.7 | 0.400 | 0.996 |

Figure 26:
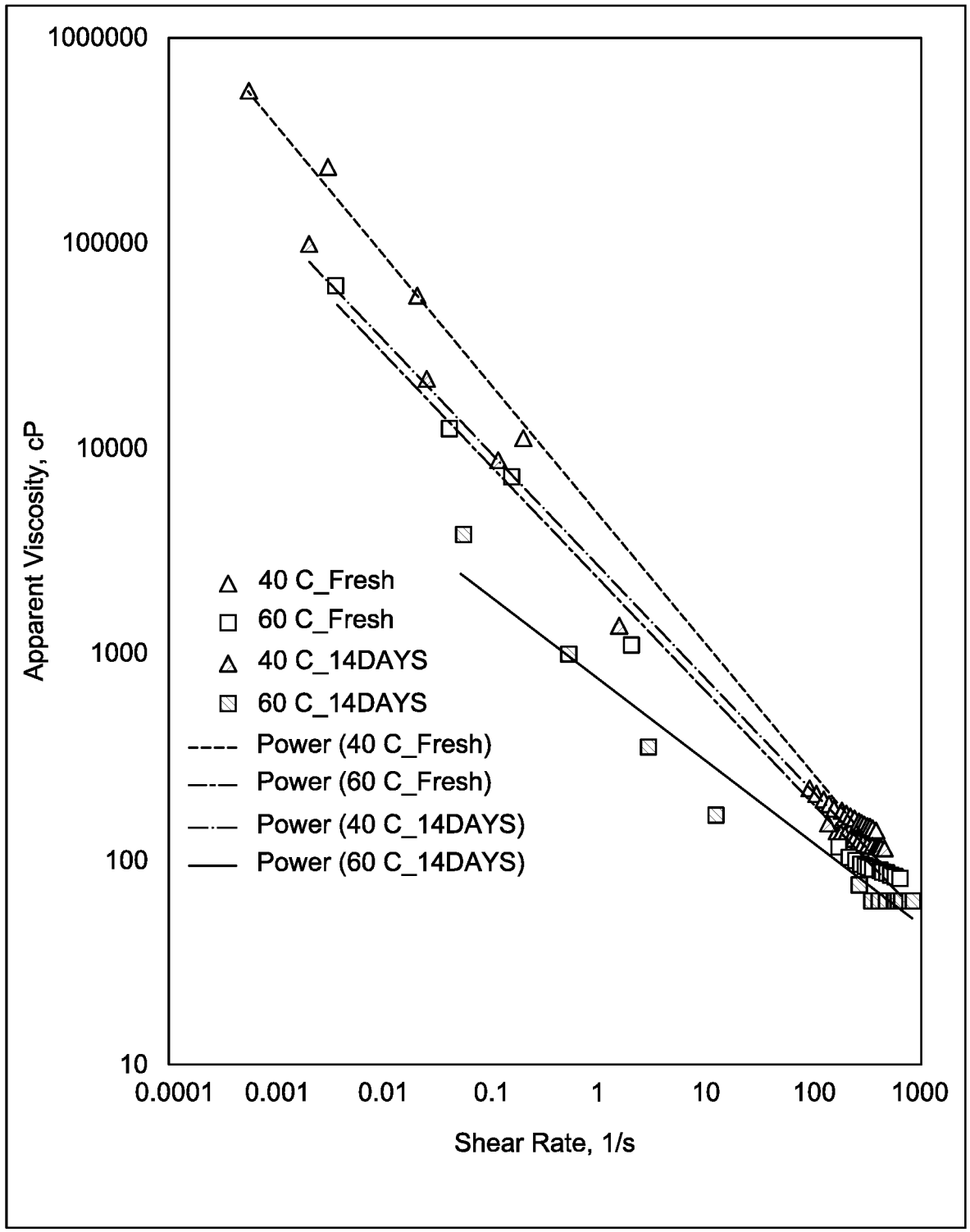
FIG. 26 represents an apparent viscosity of an emulsified acid over a range of shear rates at 40° C. and 60° C., wherein the emulsified acid is aged at 40° C. and 60° C. for 0 and 14 days.
Figure 37:
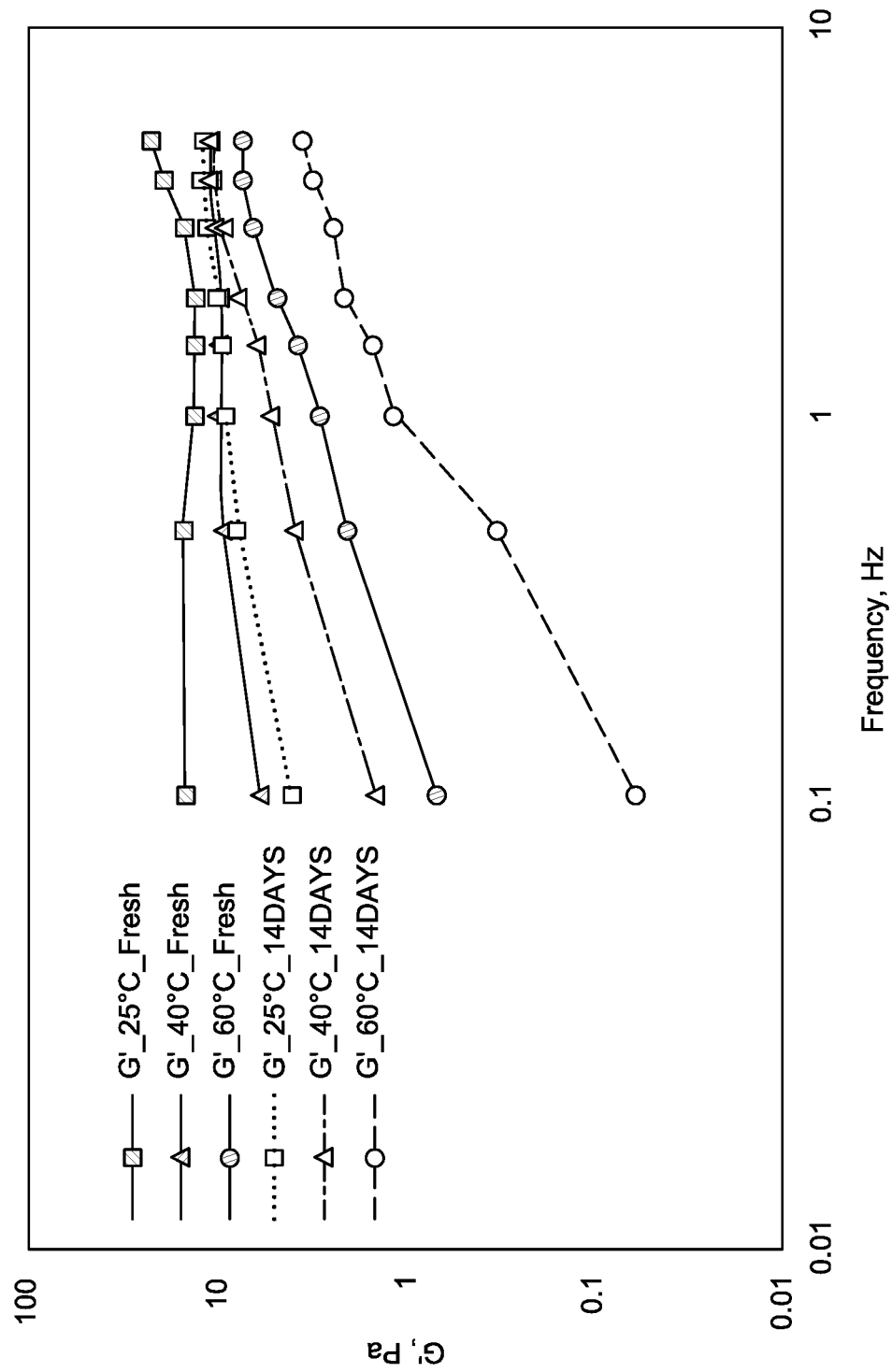
FIG. 37 represents shear storage modulus curves of an emulsified acid at 25° C., 40° C., and 60° C., wherein the emulsified acid is aged at 25° C., 40° C., and 60° C. for 0 and 14 days.
Figure 38:
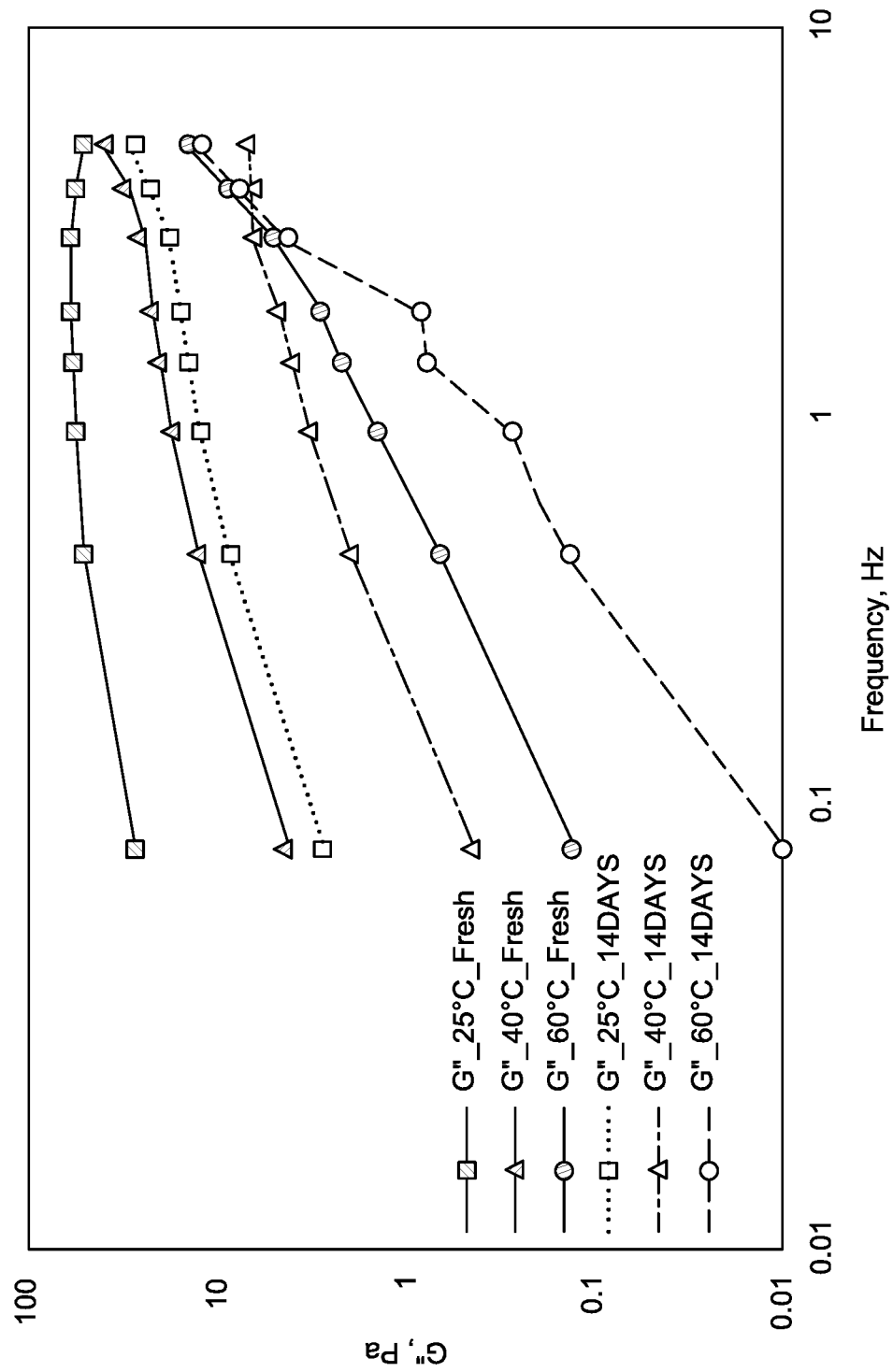
FIG. 38 represents shear loss modulus curves of an emulsified acid at 25° C., 40° C., and 60° C., wherein the emulsified acid is aged at 25° C., 40° C., and 60° C. for 0 and 14 days.

In another aspect, one sample was aged for longer time, i.e. 14 days. FIG. 26 shows that when the test is done at higher temperature such as 40° C. and 60° C., a decrease in apparent viscosity is observed. Interestingly, the 14-day-aged emulsion at 40° C. rheologically behaved the same as the fresh 60° C. emulsion. Also, FIG. 37 and FIG. 38 show a decrease in both G' and G" when the emulsion is aged. Moreover, Table 6 shows the power-law model parameters for aging for 14 days indicting that aging is directly related to n and inversely related to K.

TABLE 6

Summary of power-law model for effect of aging (14 days) for waste oil emulsion

| Temperature °C | Aged time at room temperature day | Power Law Constant, K mPa · s$^n$ | Power Law Index, n | Correlating Coefficient, R$^2$ |
|---|---|---|---|---|
| 40 | 0 | 4797.7 | 0.366 | 0.998 |
|  | 14 | 2673.7 | 0.454 | 0.994 |
| 60 | 0 | 2304.7 | 0.449 | 0.995 |
|  | 14 | 760.4 | 0.600 | 0.967 |

Example 6—Droplet Size Measurement

Droplet size distribution was also measured for both sets of the emulsions; i.e. the ones with a corrosion inhibitor and the ones without a corrosion inhibitor. FIG. 39 and FIG. 40 show the effect of heating on the droplet size distribution of waste oil emulsion without and with corrosion inhibitor, respectively. It can be concluded from these graphs that emulsions of higher temperatures tend to have smaller droplet size compared to those of lower temperatures. Moreover, the addition of corrosion inhibitor tends to distribute the emulsion droplets over a wider range. It is noted that emulsions prepared without corrosion inhibitor have narrow size distribution, which is considered favorable for emulsion stability [Ganguli, Dibyendu, Munia Ganguli. 2003. Inorganic Particle Synthesis via Macro and Microemulsions: A Micrometer to Nanometer Landscape, Springer Science & Business Media]. In addition, the $10^{th}$, $50^{th}$ and $90^{th}$ percentiles along with D[4,3] and D[3,2] means of the emulsions are presented in Table 7.

TABLE 7

Summary of droplet size distribution for waste oil emulsion with and without corrosion inhibitor

| System | Temperature ° C. | $10^{th}$ percentile μm | $50^{th}$ percentile μm | $90^{th}$ percentile μm | D[4, 3] μm | D[3, 2] μm |
|---|---|---|---|---|---|---|
| Waste oil emulsion without corrosion inhibitor | 25 | 1.53 | 78.5 | 134.49 | 178.35 | 158.67 |
| | 50 | 1.75 | 14.3 | 101.42 | 132.38 | 117.76 |
| | 75 | 1.34 | 2.35 | 12.83 | 24.44 | 21.74 |
| Waste oil emulsion with corrosion inhibitor | 25 | 0.25 | 1.47 | 81.87 | 240.30 | 213.77 |
| | 50 | 0.24 | 2.75 | 30.1 | 142.93 | 127.17 |
| | 75 | 0.23 | 3.09 | 14.46 | 22.13 | 19.69 |

The emulsions which are prepared with corrosion inhibitor turn out to be less stable compared to the ones without it. The addition of corrosion inhibitor tends to generate polydispersed emulsions with a wider distribution of droplets, compared to the emulsions prepared without corrosion inhibitor. Droplet size measurements show a median size of 2.35 and 3.09 μm for emulsions without and with corrosion inhibitor, respectively.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as wellbore as other claims. The disclosure, including any readily discernible variants of the teachings herein, defines, in part, the scope of the foregoing claim terminology such that no inventive subject matter is dedicated to the public.

The invention claimed is:

1. A method of acidizing and fracturing a subterranean geological formation surrounding a wellbore, comprising:
injecting an emulsified acid into the wellbore to acidize the subterranean geological formation,
acid fracturing the geological formation by injecting the emulsified acid into the wellbore at a pressure of 5,000-30,000 psi, wherein the injecting radially disperses the emulsified acid into the subterranean geological formation through an end of a capped coiled tubing disposed downhole in the wellbore;
wherein the emulsified acid comprises
60-72% by volume of an aqueous phase comprising hydrochloric acid,
25-35% by volume of an oil phase comprising a waste oil, and
0.1-3.0% by volume of an emulsifier, relative to a total volume of the emulsified acid, and
wherein the waste oil comprises 23-24% by weight paraffins, 9-10% by weight naphthenes, 18-20% by weight polynaphthenes, 18-20% by weight monoaromatics, 10-12% by weight naphthenomonoaromatics, 9-10% by weight diaromatics, 3-4% by weight naphthenodiaromatics, 2-3% by weight triaromatics, and 1-3% by weight naphthenotriaromatics, each relative to a total weight of the waste oil.

2. The method of claim 1, wherein the emulsified acid has an apparent viscosity of 500 to 10,000 cP at a temperature of 20 to 100° C.

3. The method of claim 1, wherein the emulsified acid contains droplets with an average diameter of 1.0 to 2.5 μm.

4. The method of claim 1, wherein the emulsified acid comprises 0.5-1.5% by volume of the emulsifier, relative to the total volume of the emulsified acid.

5. The method of claim 1, wherein the hydrochloric acid is present in the aqueous phase at a concentration of 5-30% by weight, relative to a total weight of the aqueous phase.

6. The method of claim 1, wherein the aqueous phase further comprises at least one mineral acid selected from the group consisting of nitric acid, sulfuric acid, phosphoric acid, perchloric acid, hydrofluoric acid, hydrobromic acid, hydroiodic acid, and boric acid.

7. The method of claim 1, wherein the emulsifier is at least one selected from the group consisting of an ethoxylated glycol, an ethoxylated phenol, a propoxylated glycol, and a propoxylated phenol.

8. The method of claim 1, wherein the emulsified acid contains droplets with an average diameter of 2.5 to 4.0 μm.

* * * * *